(12) United States Patent
Ohashi

(10) Patent No.: US 7,038,858 B2
(45) Date of Patent: May 2, 2006

(54) DOWNSIZE, HIGH PERFORMANCE, AND WIDE RANGE MAGNIFICATION ZOOM LENS AND CAMERA APPARATUS

(75) Inventor: Kazuyasu Ohashi, Funabashi (JP)

(73) Assignee: Ricoh Company, Ltd., Tokyo (JP)

( * ) Notice: Subject to any disclaimer, the term of this patent is extended or adjusted under 35 U.S.C. 154(b) by 375 days.

(21) Appl. No.: 09/988,793

(22) Filed: Nov. 20, 2001

(65) Prior Publication Data

US 2002/0060855 A1 May 23, 2002

(30) Foreign Application Priority Data

Nov. 20, 2000 (JP) .......................... 2000-352498
Feb. 14, 2001 (JP) .......................... 2001-037445

(51) Int. Cl.
*G02B 15/02* (2006.01)

(52) U.S. Cl. .................. 359/685; 359/684; 359/693

(58) Field of Classification Search .............. 359/676, 359/683, 684, 685, 739, 649, 695, 745, 751–753, 359/763, 693

See application file for complete search history.

(56) References Cited

U.S. PATENT DOCUMENTS

| 5,537,255 | A | * | 7/1996 | Tochigi | 359/684 |
| 5,548,445 | A | * | 8/1996 | Yahagi | 359/684 |
| 5,610,766 | A | * | 3/1997 | Aoki et al. | 359/683 |
| 5,694,252 | A | * | 12/1997 | Yahagi | 359/684 |

FOREIGN PATENT DOCUMENTS

| JP | 06-180424 | 6/1994 |
| JP | 07-151967 | 6/1995 |
| JP | 09-090221 | 4/1997 |

* cited by examiner

Primary Examiner—Georgia Epps
Assistant Examiner—M. Hasan
(74) Attorney, Agent, or Firm—Dickstein Shapiro Morin & Oshinsky LLP

(57) ABSTRACT

A zoom lens includes a first lens band having a positive focal length, a second lens band having a negative focal length, and at least third to fifth lens bands having positive focal lengths. An aperture diaphragm is located in the vicinity of the third lens band. When magnification i.e., zooming is performed from short to long focal point ends, the second lens band smoothly moves toward the third lens band and the fourth lens band simultaneously moves from the fifth lens band side toward a long focal point end so as to share a magnification function together with the second lens band.

76 Claims, 74 Drawing Sheets

SHORT FOCAL POINT END EXP. 1

MIDDLE FOCAL LENGTH EXP. 1

LONG FOCAL POINT END EXP.1

MIDDLE FOCAL LENGTH EXP.2

LONG FOCAL POINT END EXP.2

SHORT FOCAL POINT END EXP.3

LONG FOCAL POINT END EXP.3

SHORT FOCAL POINT END EXP.4

MIDDLE FOCAL LENGTH EXP.4

LONG FOCAL POINT END EXP.4

SHORT FOCAL POINT END EXP.5

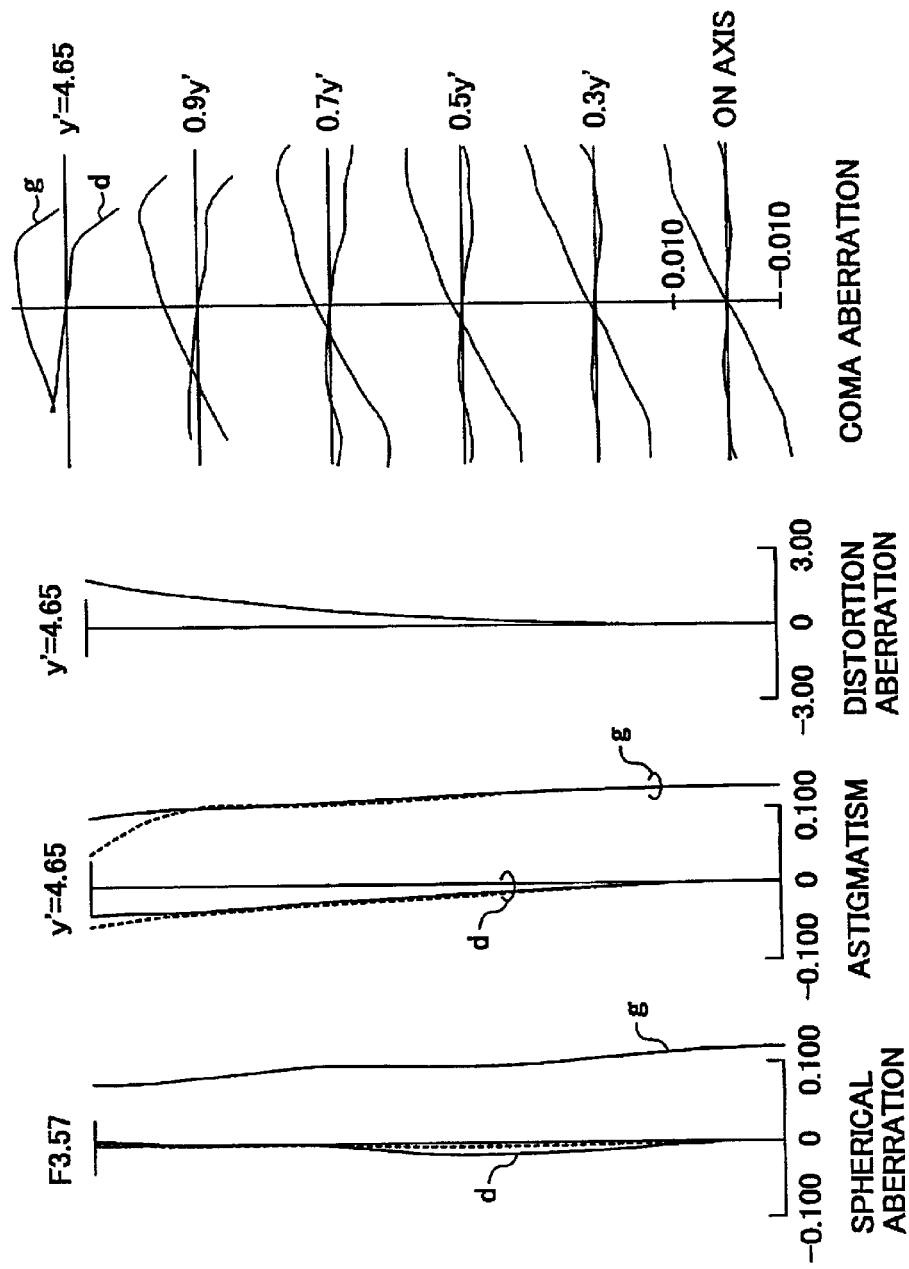

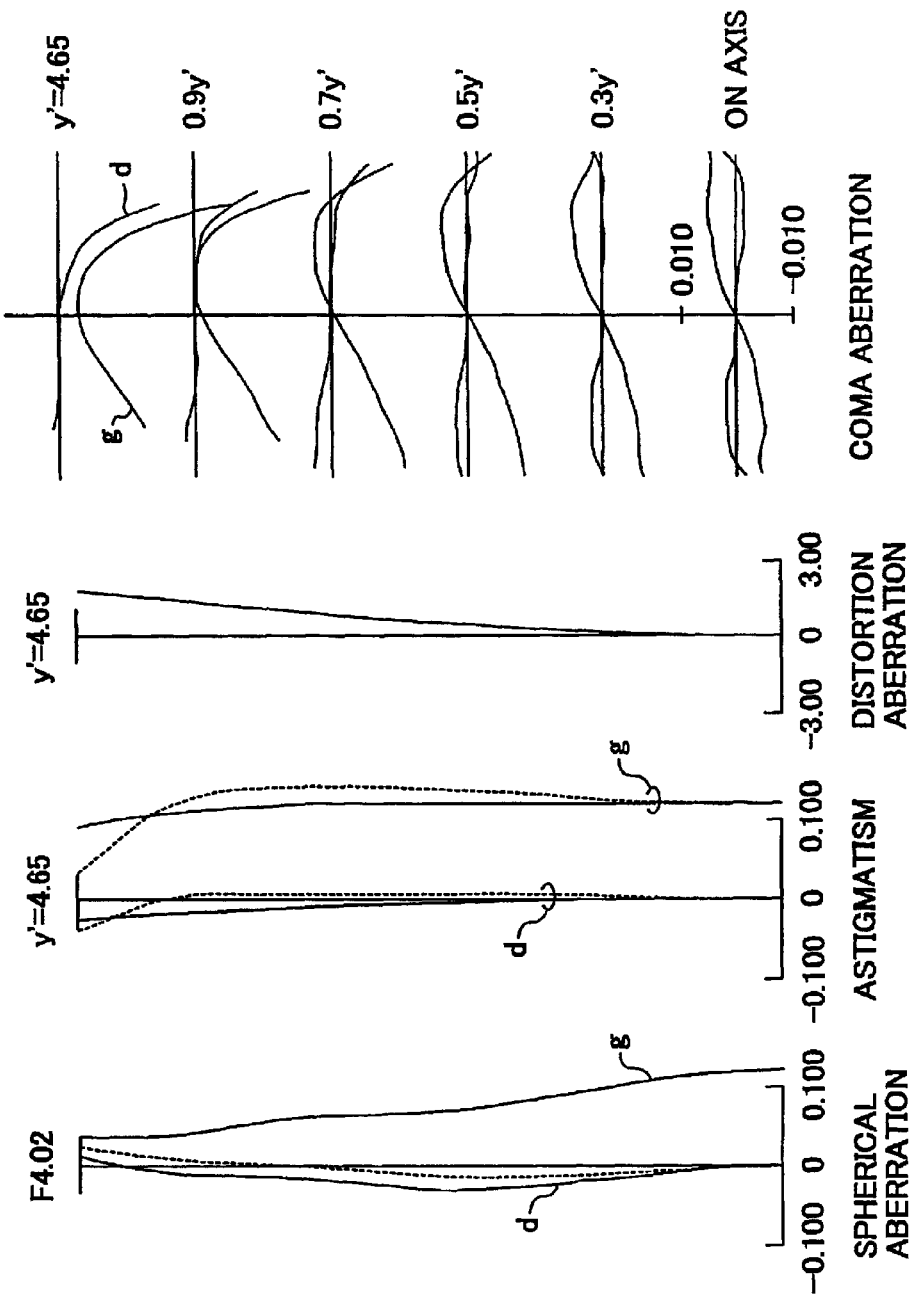
FIG. 21 LONG FOCAL POINT END EXP.5

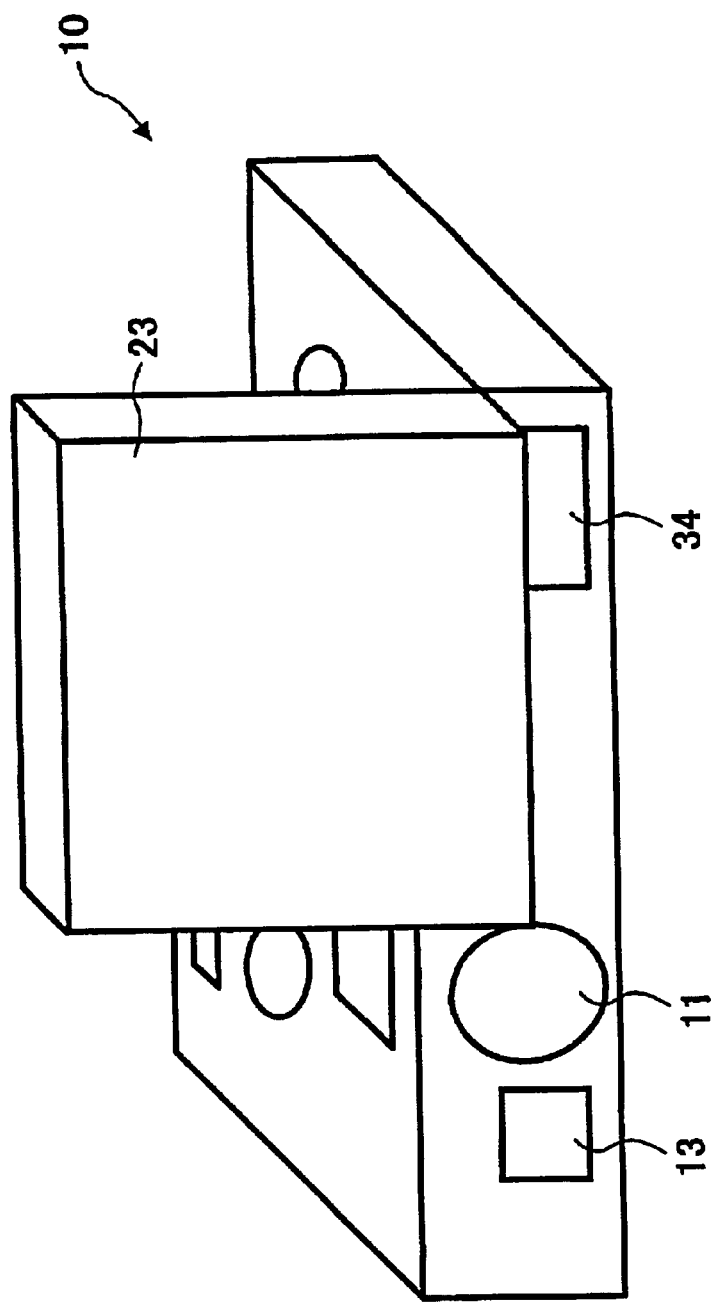

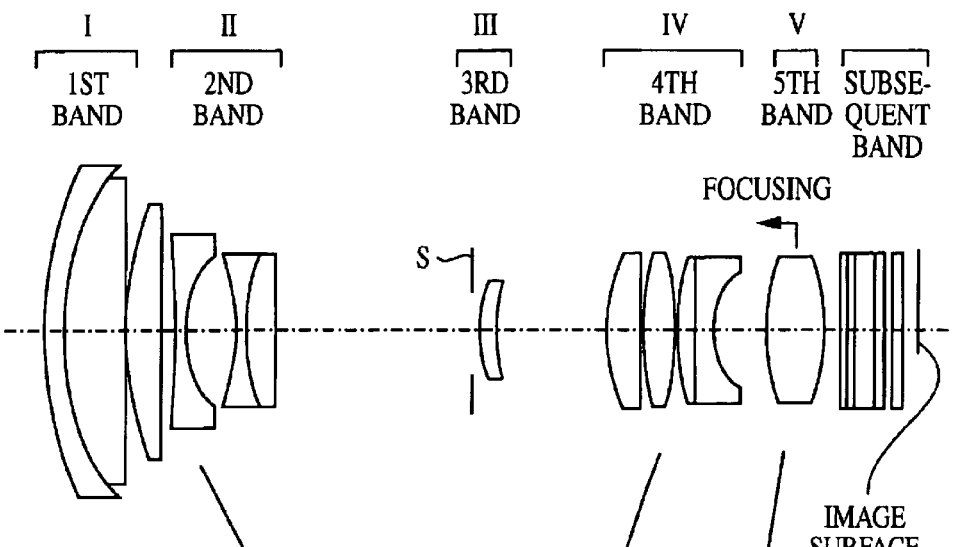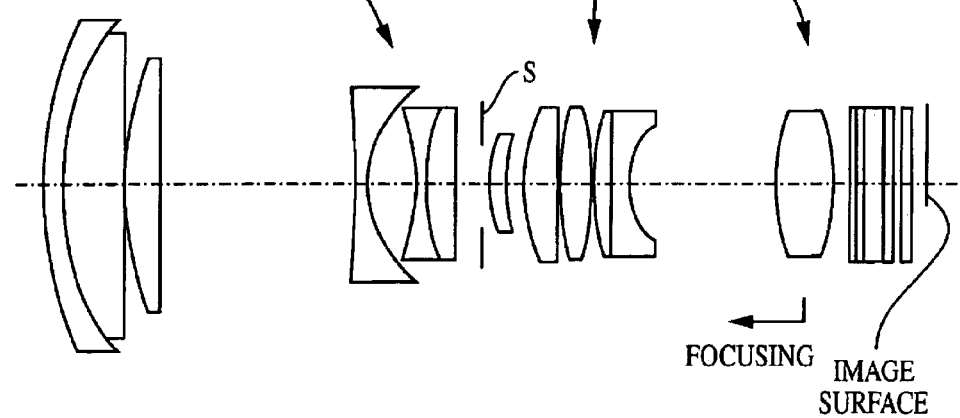
FIG. 25A

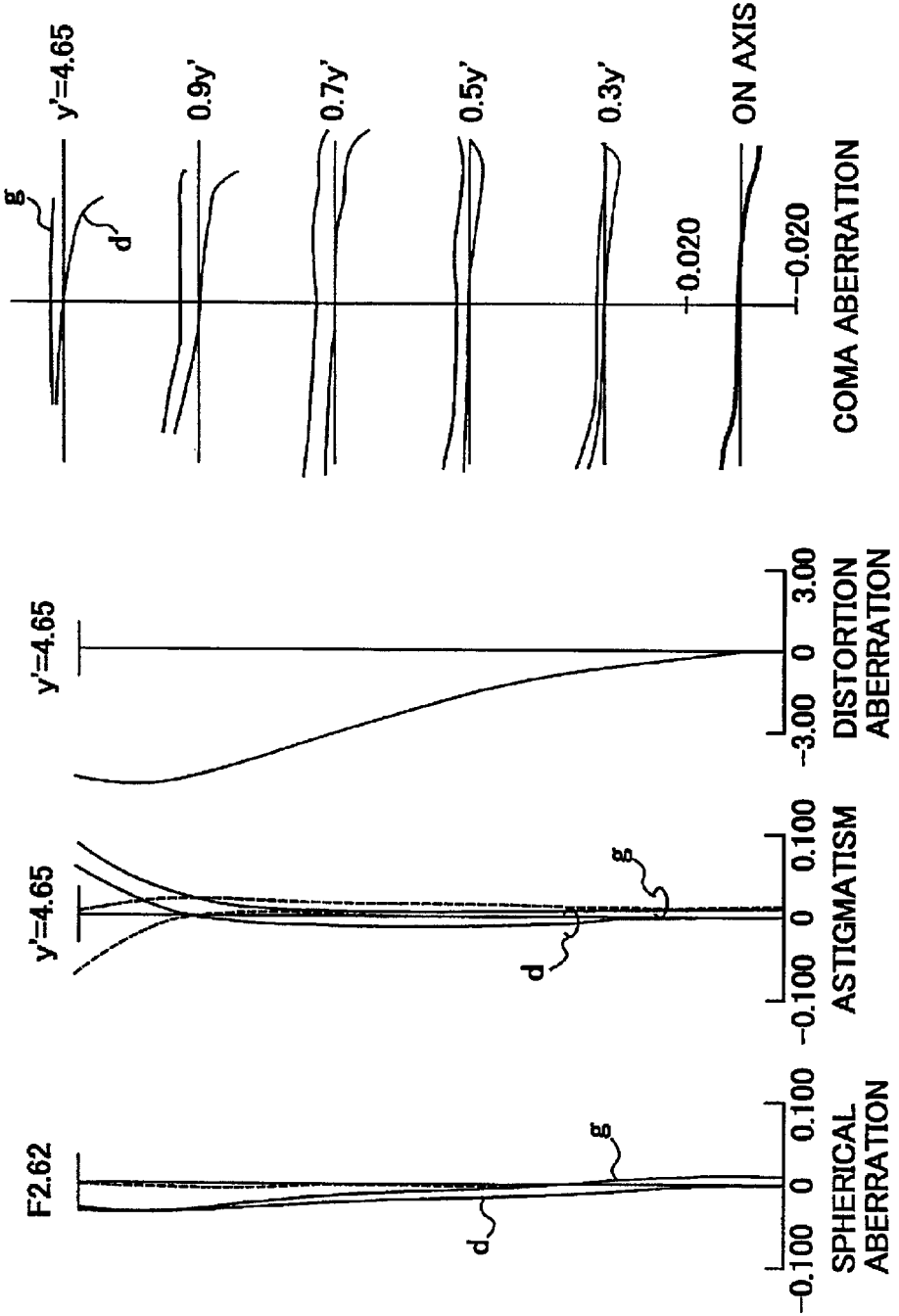

FIG. 27
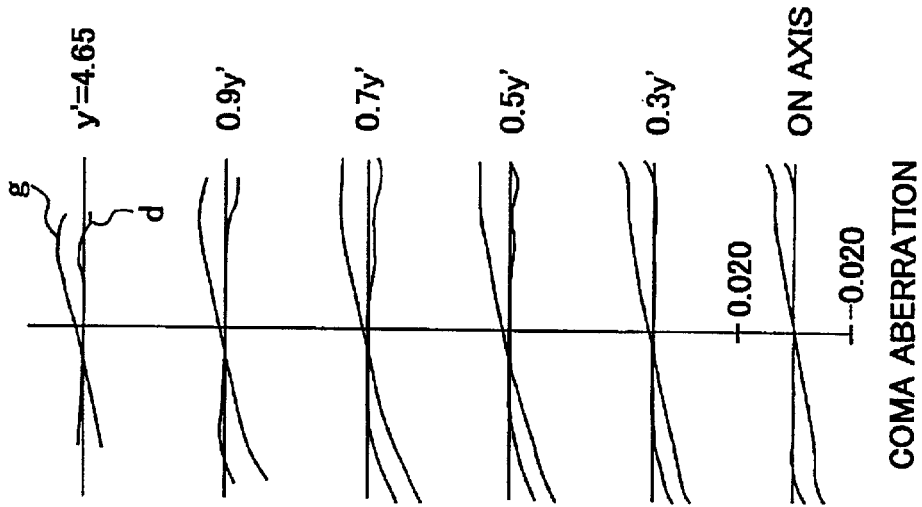
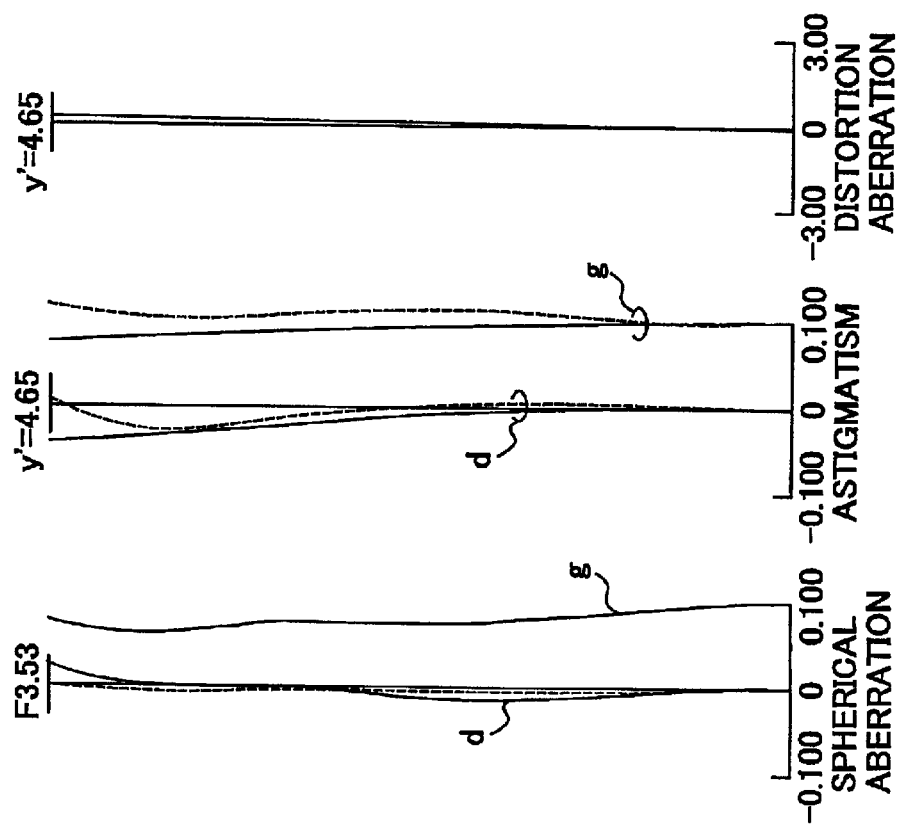

FIG. 30
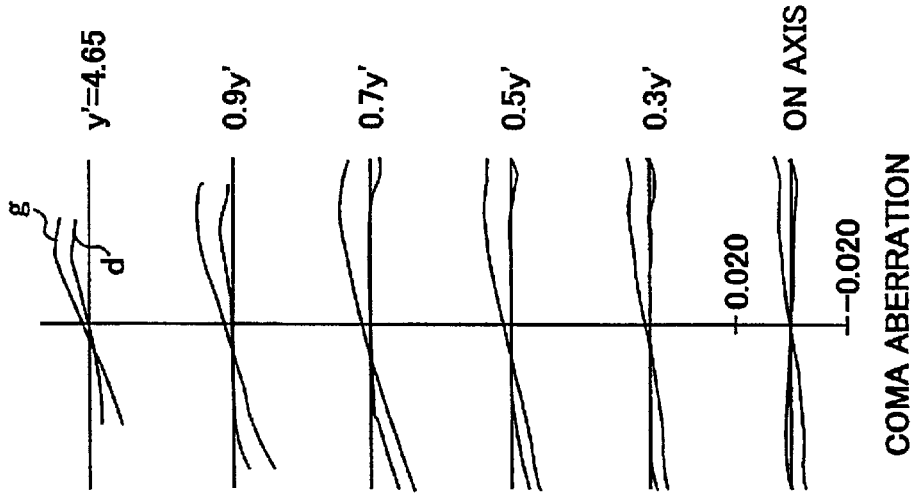
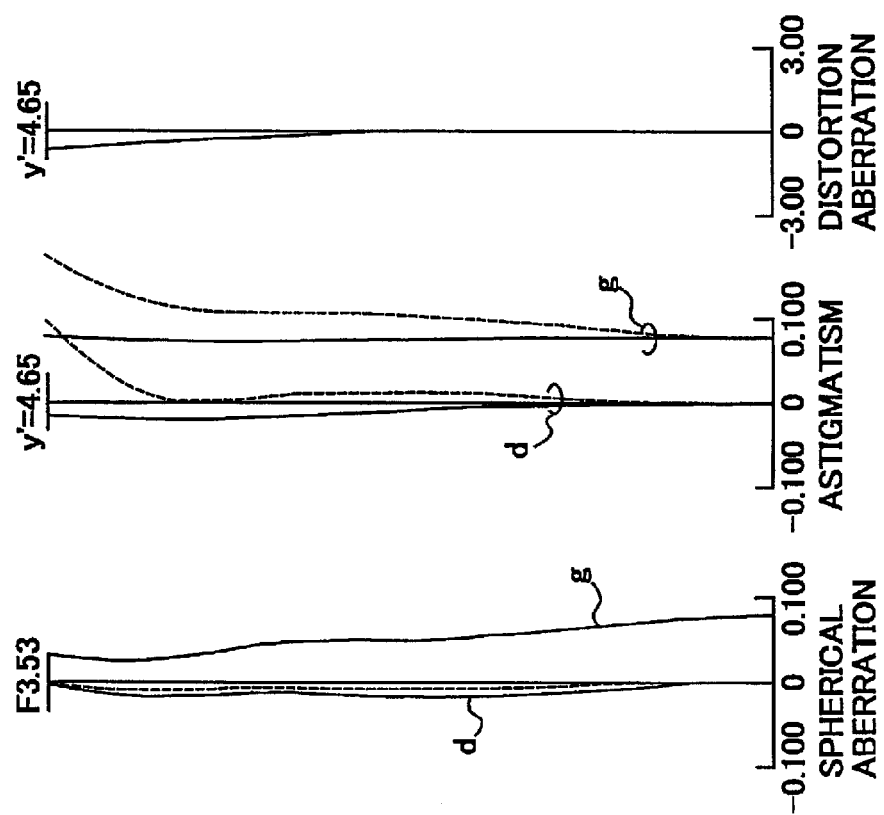

FIG. 34
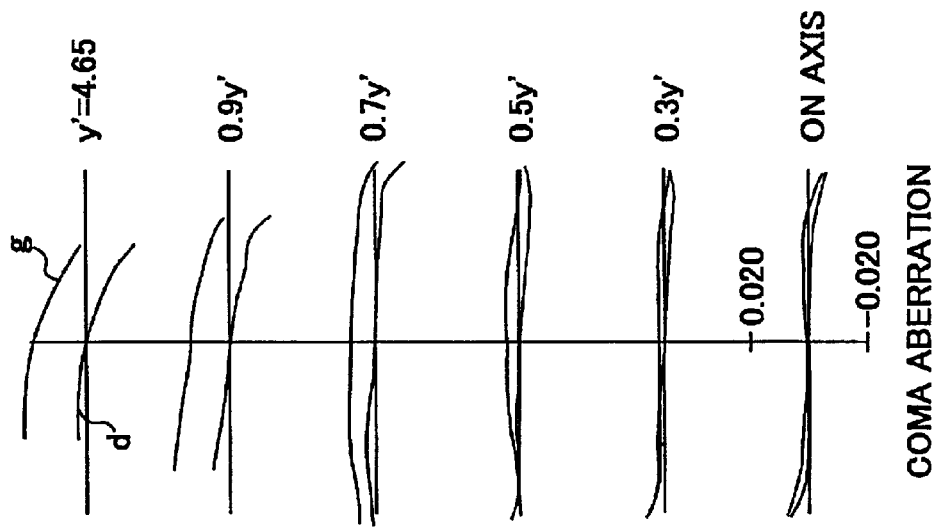
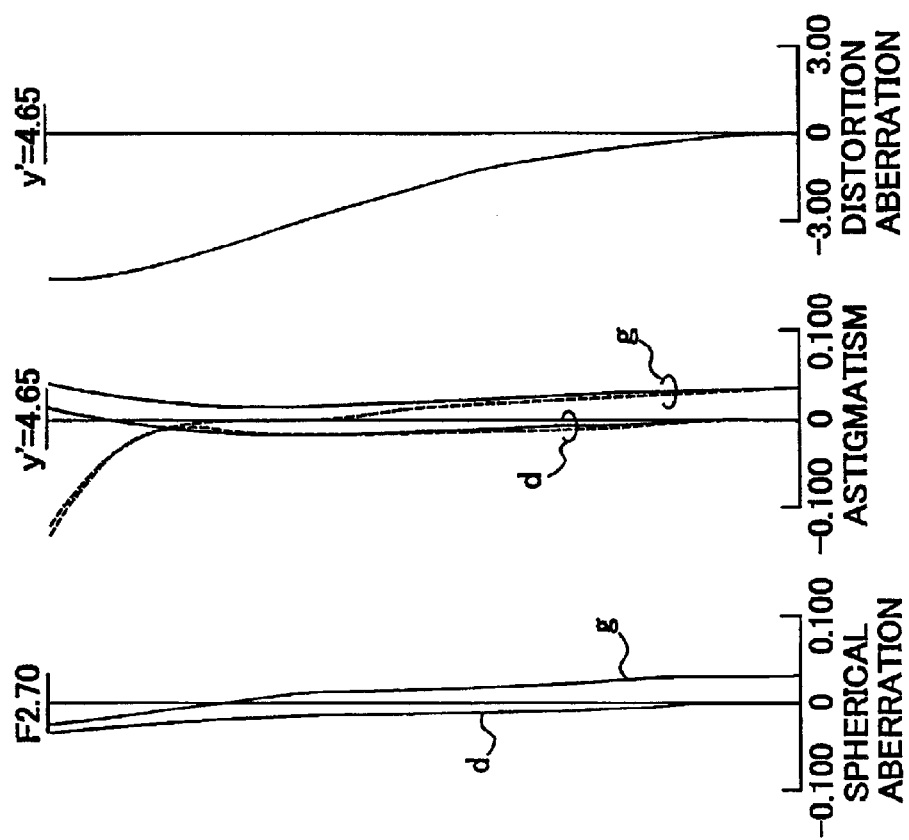

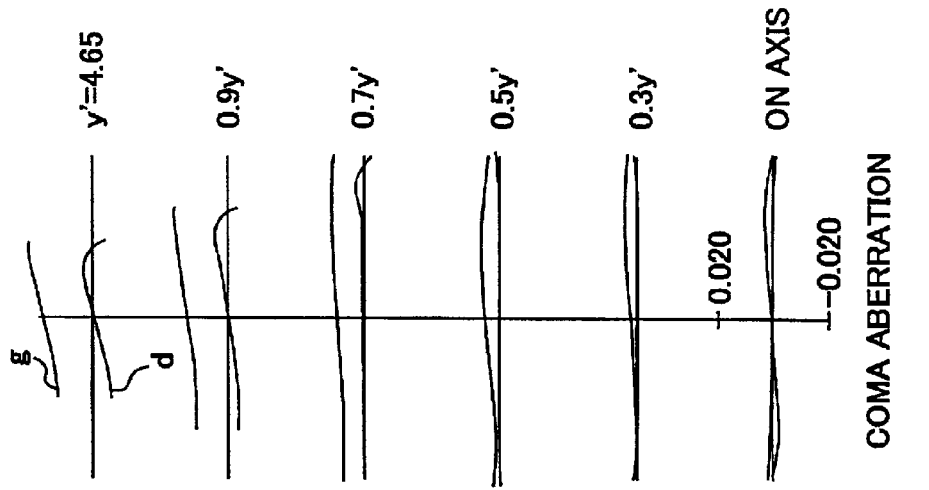
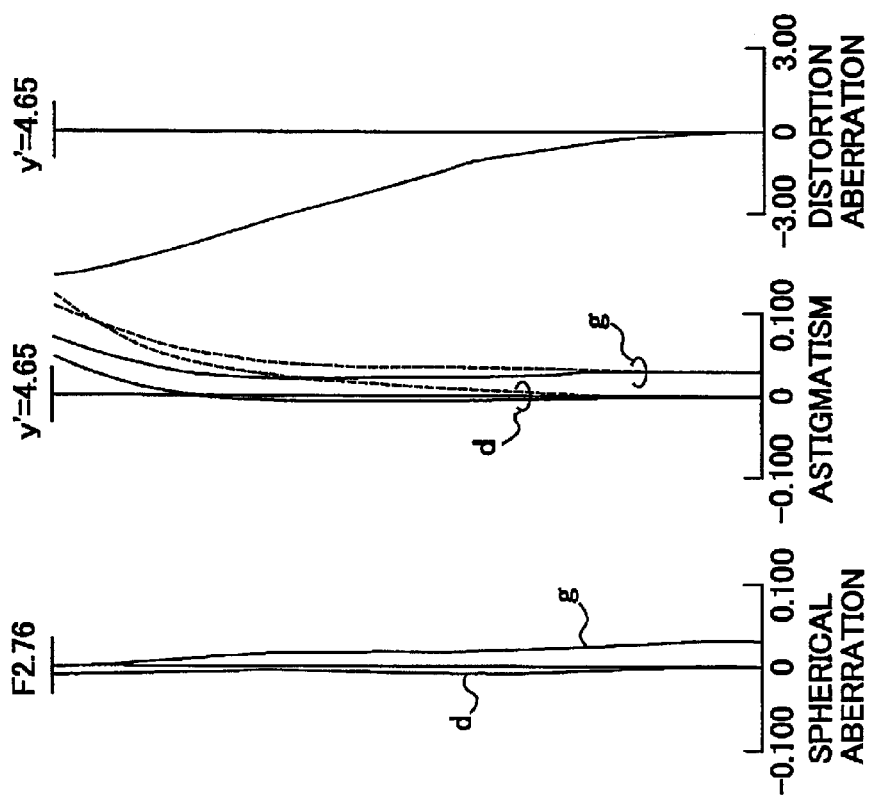
FIG. 45

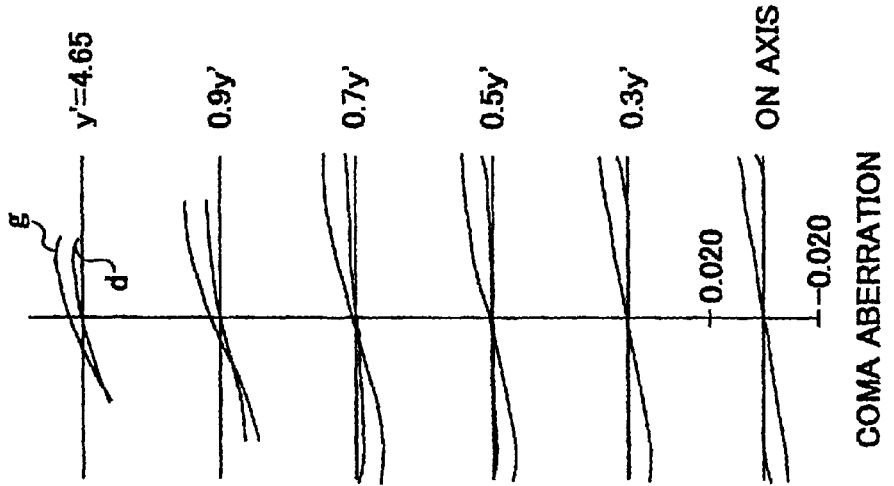
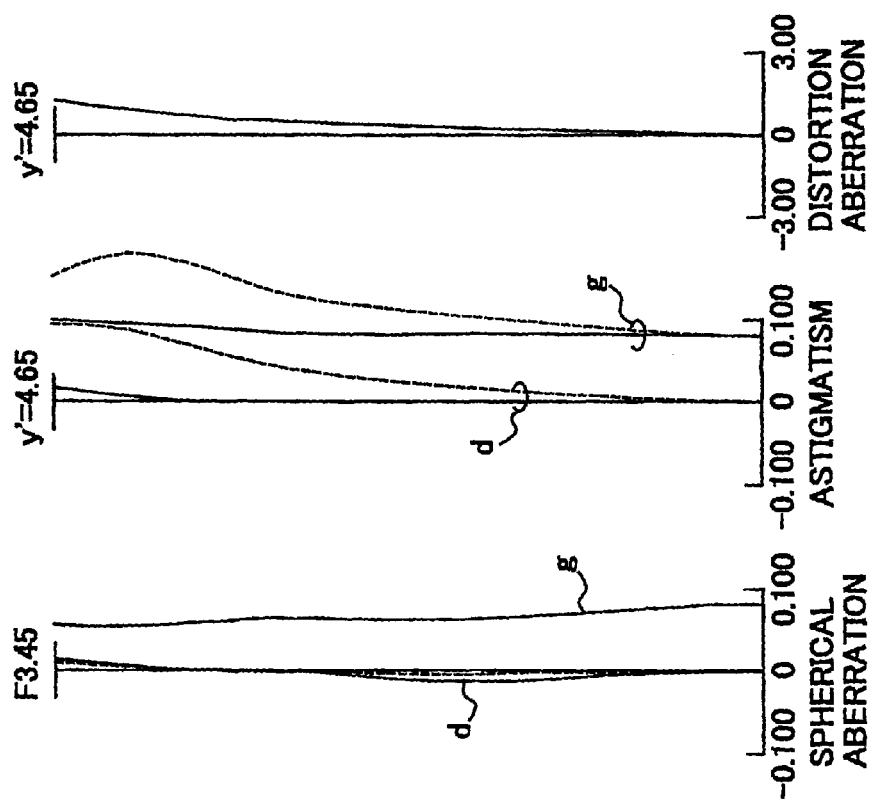
FIG. 46

FIG. 50A

TABLE 1A
f=7.52~35.41, F=2.78~4.02, ω=32.88~7.35

| SURFACE NUMBER | R | D | Nd | νd | REMARKS |
|---|---|---|---|---|---|
| 01 | 26.655 | 1.20 | 1.84666 | 23.78 | 1st LENS |
| 02 | 15.449 | 0.86 | | | |
| 03 | 16.227 | 4.67 | 1.77250 | 49.62 | 2nd LENS |
| 04 | -690.022 | ▲A | | | |
| 05* | -40.171 | 1.00 | 1.77250 | 49.62 | 3rd LENS |
| 06 | 11.901 | 2.28 | | | |
| 07* | -90.809 | 0.80 | 1.77250 | 49.62 | 4th LENS |
| 08 | 11.495 | 0.10 | | | |
| 09 | 11.044 | 2.13 | 1.84666 | 23.78 | 5th LENS |
| 10 | 62.549 | ▲B | | | |
| 11 | DIAPHRAGM | 0.50 | | | |
| 12* | 9.691 | 1.20 | 1.48749 | 70.44 | 6th LENS |
| 13 | 16.569 | ▲C | | | |
| 14* | 16.186 | 2.04 | 1.62299 | 58.12 | 7th LENS |
| 15 | -21.031 | 0.10 | | | |
| 16 | 12.470 | 1.84 | 1.71300 | 53.94 | 8th LENS |
| 17 | -582.751 | 4.37 | 1.80518 | 25.46 | 9th LENS |
| 18 | 6.332 | ▲D | | | |
| 19* | 12.416 | 2.11 | 1.58913 | 61.25 | 10th LENS |
| 20 | 181.185 | OPTION | | | |
| 21 | ∞ | 3.332 | 1.51680 | 64.20 | VARIETY OF FILTERS |
| 22 | ∞ | | | | |

▲A: VARIABLE(A)
▲B: VARIABLE(B)
▲C: VARIABLE(C)
▲D: VARIABLE(D)

FIG. 50B

TABLE 1B

| |
|---|
| NON-SPHERICAL SURFACE OF 5th SURFACE<br>$K=0.0$, $A_4=5.33251 \times 10^{-5}$, $A_6=1.60356 \times 10^{-6}$, $A_8=-1.65292 \times 10^{-8}$<br>$A_{10}=9.523698 \times 10^{-11}$ |
| NON-SPHERICAL SURFACE OF 7th SURFACE<br>$K=-5.00470$, $A_4=-2.37368 \times 10^{-5}$, $A_6=-2.56706 \times 10^{-6}$, $A_8=-2.81710 \times 10^{-8}$<br>$A_{10}=1.37805 \times 10^{-11}$ |
| NON-SPHERICAL SURFACE OF 12th SURFACE<br>$K=-1.96407$, $A_4=1.55199 \times 10^{-4}$, $A_6=-6.14819 \times 10^{-6}$, $A_8=5.61905 \times 10^{-7}$<br>$A_{10}=-2.19665 \times 10^{-8}$ |
| NON-SPHERICAL SURFACE OF 14th SURFACE<br>$K=-2.41495$, $A_4=-6.33751 \times 10^{-5}$, $A_6=1.38599 \times 10^{-6}$, $A_8=-8.42773 \times 10^{-8}$<br>$A_{10}=1.83313 \times 10^{-4}$ |
| NON-SPHERICAL SURFACE OF 19th SURFACE<br>$K=0.0$, $A_4=3.25504 \times 10^{-5}$, $A_6=-1.10948 \times 10^{-6}$, $A_8=9.67180 \times 10^{-8}$<br>$A_{10}=-1.28197 \times 10^{-9}$ |

TABLE 1C
VARIABLE INTERVAL

| | SHORT FOCAL POINT END $f=7.52$ | MIDDLE FOCAL LENGTH $f=16.32$ | LONG FOCAL POINT END $f=35.41$ |
|---|---|---|---|
| A | 1.000 | 8.525 | 14.979 |
| B | 15.595 | 8.070 | 1.616 |
| C | 8.078 | 4.388 | 1.500 |
| D | 3.854 | 7.544 | 10.432 |

TABLE 1D
PARAMETER VALUE OF CONDITIONAL EXPRESSION

| |
|---|
| $(D_{3W}-D_{3T})/(D_{1T}-D_{1W})=0.47$ |
| $(f_{12T}/f_1)=-1.090$ |
| $(f_{12T}/f_{12W})/(f_T/f_W)=0.537$ |

TABLE 1E
FOCAL LENGTH & VARIABLE INTERVALS WHEN MAGNIFICATION FROM SHORT TO LONG FOCAL POINT ENDS IS PERFORMED AND THE 4TH LENS BAND IS CLOSEST TO THE 3RD LENS BAND

| f:32.861, | A:14.155, | B:2.440, | C:1.350, | D:10.582 |
|---|---|---|---|---|

FIG. 51A

TABLE 2A
f=7.52~35.42, F=2.68~4.02, ω=32.96~7.32

| SURFACE NUMBER | R | D | Nd | νd | REMARKS |
|---|---|---|---|---|---|
| 01 | 26.120 | 1.20 | 1.84666 | 23.78 | 1st LENS |
| 02 | 15.408 | 0.73 | | | |
| 03 | 16.082 | 4.44 | 1.77250 | 49.62 | 2nd LENS |
| 04 | −2461.477 | ▲A | | | |
| 05* | −53.574 | 1.00 | 1.80610 | 40.73 | 3rd LENS |
| 06 | 11.021 | 2.33 | | | |
| 07* | −189.253 | 0.80 | 1.69350 | 53.34 | 4th LENS |
| 08 | 9.727 | 0.11 | | | |
| 09 | 9.808 | 2.22 | 1.84666 | 23.78 | 5th LENS |
| 10 | 43.589 | ▲B | | | |
| 11 | DIAPHRAGM | 0.50 | | | |
| 12* | 10.080 | 1.19 | 1.48749 | 70.44 | 6th LENS |
| 13 | 17.824 | ▲C | | | |
| 14* | 14.261 | 2.45 | 1.58913 | 61.25 | 7th LENS |
| 15 | −21.061 | 0.10 | | | |
| 16 | 11.627 | 2.45 | 1.70514 | 41.15 | 8th LENS |
| 17 | −33.441 | 2.88 | 1.80518 | 25.46 | 9th LENS |
| 18 | 6.497 | ▲D | | | |
| 19* | 10.344 | 1.98 | 1.58913 | 61.25 | 10th LENS |
| 20 | 33.975 | OPTION | | | |
| 21 | ∞ | 3.332 | 1.51680 | 64.20 | VARIETY OF FILTERS |
| 22 | ∞ | | | | |

▲A: VARIABLE(A)
▲B: VARIABLE(B)
▲C: VARIABLE(C)
▲D: VARIABLE(D)

FIG. 51B

TABLE 2B

| |
|---|
| NON-SPHERICAL SURFACE OF 5th SURFACE<br>$K=0.0$, $A_4=3.77213 \times 10^{-5}$, $A_6=1.03690 \times 10^{-6}$, $A_8=1.11273 \times 10^{-8}$<br>$A_{10}=6.33905 \times 10^{-11}$ |
| NON-SPHERICAL SURFACE OF 7th SURFACE<br>$K=0.0$, $A_4=9.35662 \times 10^{-6}$, $A_6=-2.41906 \times 10^{-6}$, $A_8=5.93970 \times 10^{-9}$<br>$A_{10}=-3.64847 \times 10^{-10}$ |
| NON-SPHERICAL SURFACE OF 12th SURFACE<br>$K=-2.14178$, $A_4=1.44251 \times 10^{-4}$, $A_6=-4.77086 \times 10^{-6}$, $A_8=4.23771 \times 10^{-7}$<br>$A_{10}=-1.74996 \times 10^{-8}$ |
| NON-SPHERICAL SURFACE OF 14th SURFACE<br>$K=-1.75847$, $A_4=-4.69337 \times 10^{-5}$, $A_6=5.28273 \times 10^{-7}$, $A_8=-2.09994 \times 10^{-8}$<br>$A_{10}=3.06349 \times 10^{-10}$ |
| NON-SPHERICAL SURFACE OF 19th SURFACE<br>$K=0.0$, $A_4=-3.92832 \times 10^{-5}$, $A_6=-4.61773 \times 10^{-7}$, $A_8=8.17517 \times 10^{-6}$<br>$A_{10}=-1.25985 \times 10^{-9}$ |

TABLE 2C
VARIABLE INTERVAL

| | SHORT FOCAL POINT END $f=7.52$ | MIDDLE FOCAL LENGTH $f=16.33$ | LONG FOCAL POINT END $f=35.42$ |
|---|---|---|---|
| A | 1.000 | 8.620 | 14.603 |
| B | 15.257 | 7.636 | 1.654 |
| C | 8.946 | 5.131 | 1.500 |
| D | 3.196 | 7.057 | 11.587 |

TABLE 2D
PARAMETER VALUE OF CONDITIONAL EXPRESSION

| |
|---|
| $(D_{3W}-D_{3T})/(D_{1T}-D_{1W})=0.55$ |
| $(f_{12T}/f_1)=-1.086$ |
| $(f_{12T}/f_{12W})/(f_T/f_W)=0.523$ |

FIG. 52A

TABLE 3A
f=7.52~42.48, F=2.38~4.00, ω=33.10~6.12

| SURFACE NUMBER | R | D | Nd | νd | REMARKS |
|---|---|---|---|---|---|
| 01 | 31.036 | 1.02 | 1.84666 | 23.78 | 1st LENS |
| 02 | 17.869 | 1.41 | | | |
| 03 | 19.260 | 4.17 | 1.77250 | 49.62 | 2nd LENS |
| 04 | −267.057 | ▲A | | | |
| 05* | −43.607 | 1.00 | 1.83500 | 42.98 | 3rd LENS |
| 06 | 11.134 | 2.45 | | | |
| 07* | −378.543 | 0.80 | 1.74330 | 49.22 | 4th LENS |
| 08 | 14.455 | 0.10 | | | |
| 09 | 13.436 | 2.30 | 1.84666 | 23.78 | 5th LENS |
| 10 | 339.694 | ▲B | | | |
| 11 | DIAPHRAGM | 0.50 | | | |
| 12* | 11.208 | 1.21 | 1.48749 | 70.44 | 6th LENS |
| 13 | 17.548 | ▲C | | | |
| 14* | 16.335 | 2.80 | 1.62299 | 58.12 | 7th LENS |
| 15 | −30.357 | 0.10 | | | |
| 16 | 16.543 | 3.24 | 1.77250 | 49.62 | 8th LENS |
| 17 | −17.522 | 2.43 | 1.71736 | 29.50 | 9th LENS |
| 18 | 7.459 | ▲D | | | |
| 19* | 9.682 | 2.25 | 1.48749 | 70.44 | 10th LENS |
| 20 | 30.238 | OPTION | | | |
| 21 | ∞ | 3.332 | 1.51680 | 64.20 | VARIETY OF FILTERS |
| 22 | ∞ | | | | |

▲A: VARIABLE(A)
▲B: VARIABLE(B)
▲C: VARIABLE(C)
▲D: VARIABLE(D)

FIG. 52B

TABLE 3B

| |
|---|
| NON-SPHERICAL SURFACE OF 5th SURFACE<br>$K=0.0$, $A_4=5.12563 \times 10^{-5}$, $A_6=1.60220 \times 10^{-7}$, $A_8=6.03181 \times 10^{-11}$<br>$A_{10}=-5.54096 \times 10^{-12}$ |
| NON-SPHERICAL SURFACE OF 7th SURFACE<br>$K=-2372.29$, $A_4=8.29144 \times 10^{-6}$, $A_6=-3.62960 \times 10^{-7}$, $A_8=-1.18221 \times 10^{-8}$<br>$A_{10}=-6.64935 \times 10^{-11}$ |
| NON-SPHERICAL SURFACE OF 12th SURFACE<br>$K=-2.54795$, $A_4=1.30168 \times 10^{-4}$, $A_6=-9.63887 \times 10^{-7}$, $A_8=7.57566 \times 10^{-9}$<br>$A_{10}=-2.29717 \times 10^{-11}$ |
| NON-SPHERICAL SURFACE OF 14th SURFACE<br>$K=-1.25642$, $A_4=-4.03456 \times 10^{-5}$, $A_6=4.01824 \times 10^{-8}$, $A_8=-1.74724 \times 10^{-9}$<br>$A_{10}=1.17398 \times 10^{-11}$ |
| NON-SPHERICAL SURFACE OF 19th SURFACE<br>$K=0.0$, $A_4=-4.24707 \times 10^{-5}$, $A_6=5.03298 \times 10^{-7}$, $A_8=2.74980 \times 10^{-9}$<br>$A_{10}=3.15192 \times 10^{-11}$ |

TABLE 3C
VARIABLE INTERVAL

| | SHORT FOCAL POINT END $f=7.52$ | MIDDLE FOCAL LENGTH $f=17.88$ | LONG FOCAL POINT END $f=42.48$ |
|---|---|---|---|
| A | 1.000 | 10.341 | 17.787 |
| B | 18.311 | 8.970 | 1.524 |
| C | 12.515 | 6.527 | 1.500 |
| D | 3.171 | 10.194 | 16.950 |

TABLE 3D
PARAMETER VALUE OF CONDITIONAL EXPRESSION

| |
|---|
| $(D_{3W}-D_{3T})/(D_{1T}-D_{1W})=0.66$ |
| $(f_{12T}/f_1)=-1.144$ |
| $(f_{12T}/f_{12W})/(f_T/f_W)=0.465$ |

FIG. 53A

TABLE 4A
f=7.52~35.42, F=2.62~4.00, ω=32.99~7.41

| SURFACE NUMBER | R | D | Nd | νd | REMARKS |
|---|---|---|---|---|---|
| 01 | 26.529 | 1.20 | 1.84666 | 23.78 | 1st LENS |
| 02 | 15.607 | 1.17 | | | |
| 03 | 16.702 | 4.36 | 1.77250 | 49.62 | 2nd LENS |
| 04 | −371.916 | ▲A | | | |
| 05* | −29.404 | 1.00 | 1.80610 | 40.73 | 3rd LENS |
| 06 | 8.571 | 2.20 | | | |
| 07 | 32.023 | 0.80 | 1.54072 | 47.20 | 4th LENS |
| 08 | 8.557 | 2.49 | 1.84666 | 23.78 | 5th LENS |
| 09 | 30.960 | ▲B | | | |
| 10 | DIAPHRAGM | 0.50 | | | |
| 11* | 7.674 | 1.10 | 1.58913 | 61.25 | 6th LENS |
| 12 | 8.158 | ▲C | | | |
| 13* | 10.021 | 2.54 | 1.58913 | 61.25 | 7th LENS |
| 14* | −63.691 | 0.10 | | | |
| 15 | 15.867 | 2.15 | 1.48749 | 70.44 | 8th LENS |
| 16 | −50.882 | 0.10 | | | |
| 17 | 12.522 | 1.82 | 1.59913 | 61.25 | 9th LENS |
| 18 | 76.837 | 0.80 | 1.80518 | 25.46 | 10th LENS |
| 19 | 5.641 | ▲D | | | |
| 20 | 18.992 | 3.37 | 1.60342 | 38.01 | 11th LENS |
| 21* | −47.165 | OPTION | | | |
| 22 | ∞ | 3.214 | 1.51680 | 64.20 | VARIETY OF FILTERS |
| 23 | ∞ | | | | |

▲A: VARIABLE(A)
▲B: VARIABLE(B)
▲C: VARIABLE(C)
▲D: VARIABLE(D)

FIG. 53B

TABLE 4B

| |
|---|
| NON-SPHERICAL SURFACE OF 5th SURFACE<br>$K=0.0$, $A_4=1.37015 \times 10^{-4}$ $A_6=-9.81958 \times 10^{-7}$ $A_8=9.21207 \times 10^{-9}$<br>$A_{10}=-4.92691 \times 10^{-11}$ |
| NON-SPHERICAL SURFACE OF 11th SURFACE<br>$K=-1.20196$, $A_4=2.83724 \times 10^{-4}$ $A_6=-6.86713 \times 10^{-6}$ $A_8=9.48847 \times 10^{-7}$<br>$A_{10}=-3.87184 \times 10^{-6}$ |
| NON-SPHERICAL SURFACE OF 13th SURFACE<br>$K=-1.13642$, $A_4=6.34825 \times 10^{-6}$ $A_6=2.90033 \times 10^{-6}$ $A_8=-3.90207 \times 10^{-8}$<br>$A_{10}=1.09626 \times 10^{-10}$ |
| NON-SPHERICAL SURFACE OF 14th SURFACE<br>$K=-70.9456$, $A_4=6.79619 \times 10^{-11}$ $A_6=3.00428 \times 10^{-6}$ $A_8=-3.35316 \times 10^{-8}$<br>$A_{10}=-1.72607 \times 10^{-10}$ |
| NON-SPHERICAL SURFACE OF 21th SURFACE<br>$K=14.57109$, $A_4=-5.21909 \times 10^{-5}$ $A_6=-3.69390 \times 10^{-6}$ $A_8=7.04367 \times 10^{-8}$<br>$A_{10}=-6.33661 \times 10^{-10}$ |

TABLE 4C
VARIABLE INTERVAL

| | SHORT FOCAL POINT END $f=7.52$ | MIDDLE FOCAL LENGTH $f=16.33$ | LONG FOCAL POINT END $f=35.42$ |
|---|---|---|---|
| A | 1.530 | 8.117 | 15.363 |
| B | 15.770 | 9.183 | 1.937 |
| C | 8.000 | 3.409 | 1.500 |
| D | 3.964 | 9.176 | 11.332 |

TABLE 4D
PARAMETER VALUE OF CONDITIONAL EXPRESSION

| |
|---|
| $(D_{3W}-D_{3T})/(D_{1T}-D_{1W})=0.47$ |
| $(f_{12T}/f_1)=-1.308$ |
| $(f_{12T}/f_{12W})/(f_r/f_w)=0.565$ |

FIG. 54A
TABLE 5A f=7.52~35.42, F=2.70~4.02, ω=33.09~7.35

| SURFACE NUMBER | R | D | Nd | νd | REMARKS |
|---|---|---|---|---|---|
| 01 | 39.389 | 1.20 | 1.84666 | 23.78 | 1st LENS |
| 02 | 20.025 | 3.88 | | | |
| 03 | 158.989 | 0.10 | 1.53172 | 48.84 | 2nd LENS |
| 04 | 26.736 | 2.70 | 1.77250 | 49.62 | 3rd LENS |
| 05 | 578.390 | ▲A | | | |
| 06* | −71.421 | 1.00 | 1.80610 | 40.73 | 4th LENS |
| 07* | 8.802 | 3.05 | | | |
| 08 | −16.232 | 0.80 | 1.51742 | 52.15 | 5th LENS |
| 09 | 11.846 | 2.06 | 1.84666 | 23.78 | 6th LENS |
| 10 | ∞ | ▲B | | | |
| 11 | DIAPHRAGM | 0.50 | | | |
| 12* | 7.657 | 1.12 | 1.58913 | 61.25 | 7th LENS |
| 13 | 8.381 | ▲C | | | |
| 14* | 9.908 | 2.63 | 1.58913 | 61.25 | 8th LENS |
| 15* | −40.037 | 0.11 | | | |
| 16 | 38.816 | 2.12 | 1.48749 | 70.44 | 9th LENS |
| 17 | −18.714 | 0.18 | | | |
| 18 | 15.283 | 1.87 | 1.58913 | 61.25 | 10th LENS |
| 19 | −112.371 | 1.17 | 1.80518 | 25.46 | 11th LENS |
| 20 | 6.199 | ▲D | | | |
| 21 | 17.732 | 1.96 | 1.64769 | 33.84 | 12th LENS |
| 22* | −121.961 | OPTION | | | |
| 23 | ∞ | 3.214 | 1.51680 | 64.20 | VARIETY OF FILTERS |
| 24 | ∞ | | | | |

▲A: VARIABLE(A)
▲B: VARIABLE(B)
▲C: VARIABLE(C)
▲D: VARIABLE(D)

FIG. 54B

TABLE 5B

| |
|---|
| NON-SPHERICAL SURFACE OF 6th SURFACE<br>$K=0.0$, $A_4=9.14684 \times 10^{-5}$ $A_6=-9.34472 \times 10^{-7}$ $A_8=1.42322 \times 10^{-8}$<br>$A_{10}=-1.17627 \times 10^{-10}$ |
| NON-SPHERICAL SURFACE OF 7th SURFACE<br>$K=0.09374$, $A_4=2.75961 \times 10^{-5}$ $A_6=1.27476 \times 10^{-6}$ $A_8=1.62751 \times 10^{-8}$<br>$A_{10}=7.41921 \times 10^{-10}$ |
| NON-SPHERICAL SURFACE OF 12th SURFACE<br>$K=-1.26140$, $A_4=2.67355 \times 10^{-4}$ $A_6=-6.25917 \times 10^{-6}$ $A_8=8.12274 \times 10^{-7}$<br>$A_{10}=-3.08665 \times 10^{-8}$ |
| NON-SPHERICAL SURFACE OF 14th SURFACE<br>$K=-1.30919$, $A_4=-1.18876 \times 10^{-5}$ $A_6=2.33312 \times 10^{-6}$ $A_8=-1.34009 \times 10^{-8}$<br>$A_{10}=-4.54838 \times 10^{-10}$ |
| NON-SPHERICAL SURFACE OF 15th SURFACE<br>$K=-46.11855$, $A_4=7.30394 \times 10^{-5}$ $A_6=3.24821 \times 10^{-6}$ $A_8=-2.36224 \times 10^{-8}$<br>$A_{10}=-5.40644 \times 10^{-10}$ |
| NON-SPHERICAL SURFACE OF 22th SURFACE<br>$K=45.76087$, $A_4=-5.63924 \times 10^{-5}$ $A_6=-2.40860 \times 10^{-6}$ $A_8=7.82626 \times 10^{-8}$<br>$A_{10}=-1.12266 \times 10^{-9}$ |

TABLE 5C
VARIABLE INTERVAL

| | SHORT FOCAL POINT END $f=7.52$ | MIDDLE FOCAL LENGTH $f=16.33$ | LONG FOCAL POINT END $f=35.42$ |
|---|---|---|---|
| A | 1.239 | 7.297 | 13.763 |
| B | 14.024 | 7.966 | 1.500 |
| C | 8.000 | 3.593 | 1.500 |
| D | 3.950 | 10.036 | 11.215 |

TABLE 5D
PARAMETER VALUE OF
CONDITIONAL EXPRESSION

| |
|---|
| $(D_{3W}-D_{3T})/(D_{1T}-D_{1W})=0.52$ |
| $(f_{12T}/f_1)=-1.223$ |
| $(f_{12T}/f_{12W})/(f_T/f_W)=0.559$ |

FIG. 55A

TABLE 6A
f=7.52~35.42, F=2.62~4.00, ω=32.99~7.41

| SURFACE NUMBER | R | D | Nd | νd | REMARKS |
|---|---|---|---|---|---|
| 01 | 26.529 | 1.20 | 1.84666 | 23.78 | 1st LENS |
| 02 | 15.607 | 1.17 | | | |
| 03 | 16.702 | 4.36 | 1.77250 | 49.62 | 2nd LENS |
| 04 | −371.916 | ▲A | | | |
| 05* | −29.404 | 1.00 | 1.80610 | 40.73 | 3rd LENS |
| 06 | 8.571 | 2.20 | | | |
| 07 | 32.023 | 0.80 | 1.54072 | 47.20 | 4th LENS |
| 08 | 8.557 | 2.49 | 1.84666 | 23.78 | 5th LENS |
| 09 | 30.960 | ▲B | | | |
| 10 | DIAPHRAGM | 0.50 | | | |
| 11* | 7.674 | 1.10 | 1.58913 | 61.25 | 6th LENS |
| 12 | 8.158 | ▲C | | | |
| 13* | 10.021 | 2.54 | 1.58913 | 61.25 | 7th LENS |
| 14* | −63.691 | 0.10 | | | |
| 15 | 15.867 | 2.15 | 1.48749 | 70.44 | 8th LENS |
| 16 | −50.882 | 0.10 | | | |
| 17 | 12.522 | 1.82 | 1.59913 | 61.25 | 9th LENS |
| 18 | 76.837 | 0.80 | 1.80518 | 25.46 | 10th LENS |
| 19 | 5.641 | ▲D | | | |
| 20 | 18.992 | 3.37 | 1.60342 | 38.01 | 11th LENS |
| 21* | −47.165 | OPTION | | | |
| 22 | ∞ | 3.214 | 1.51680 | 64.20 | VARIETY OF FILTERS |
| 23 | ∞ | | | | |

▲A: VARIABLE(A)
▲B: VARIABLE(B)
▲C: VARIABLE(C)
▲D: VARIABLE(D)

FIG. 55B

TABLE 6B

| |
|---|
| NON-SPHERICAL SURFACE OF 5th SURFACE<br>$K=0.0$, $A_4=1.37015 \times 10^{-4}$ $A_6=-9.81958 \times 10^{-7}$ $A_8=9.21207 \times 10^{-9}$<br>$A_{10}=-4.92691 \times 10^{-11}$ |
| NON-SPHERICAL SURFACE OF 11th SURFACE<br>$K=-1.20196$, $A_4=2.83724 \times 10^{-4}$ $A_6=-6.86713 \times 10^{-6}$ $A_8=9.48847 \times 10^{-7}$<br>$A_{10}=-3.87184 \times 10^{-8}$ |
| NON-SPHERICAL SURFACE OF 13th SURFACE<br>$K=-1.13642$, $A_4=6.34825 \times 10^{-6}$ $A_6=2.90033 \times 10^{-6}$ $A_8=-3.90207 \times 10^{-8}$<br>$A_{10}=1.09626 \times 10^{-10}$ |
| NON-SPHERICAL SURFACE OF 14th SURFACE<br>$K=-70.94256$, $A_4=6.79619 \times 10^{-5}$ $A_6=3.00428 \times 10^{-6}$ $A_8=-3.35316 \times 10^{-8}$<br>$A_{10}=-1.72607 \times 10^{-10}$ |
| NON-SPHERICAL SURFACE OF 21th SURFACE<br>$K=14.57109$, $A_4=-5.21909 \times 10^{-5}$ $A_6=-3.69390 \times 10^{-6}$ $A_8=7.04367 \times 10^{-8}$<br>$A_{10}=-6.33661 \times 10^{-10}$ |

TABLE 6C
VARIABLE INTERVAL:
TYPICAL PHOTOGRAPHING REGION

| | AT INFINITY | AT INFINITY | AT INFINITY | 0.3m | 0.4m | 0.5m |
|---|---|---|---|---|---|---|
| | SHORT FOCAL POINT END $f=7.52$ | MIDDLE FOCAL LINGTH $f=16.33$ | LONG FOCAL POINT END $f=35.42$ | SHORT FOCAL POINT END $f=7.44$ | MIDDLE FOCAL LENGTH $f=15.71$ | MIDDLE FOCAL POINT END $f=31.60$ |
| A | 1.530 | 8.117 | 15.363 | 1.530 | 8.117 | 15.363 |
| B | 15.770 | 9.183 | 1.937 | 15.770 | 9.183 | 1.937 |
| C | 8.000 | 3.409 | 1.500 | 8.000 | 3.409 | 1.500 |
| D | 3.964 | 9.176 | 11.332 | 3.571 | 7.896 | 7.438 |

FIG. 55C

TABLE 6D
VARIABLE INTERVAL
IN MACRO MODE (A PHOTOGRAPHIC
DISTANCE IS FROM AN IMAGE SURFACE)

|   | 0.3m | 0.077m |
|---|---|---|
|   | f=12.03 | f=10.43 |
| A | 4.508 | 4.508 |
| B | 12.792 | 12.792 |
| C | 3.816 | 3.816 |
| D | 8.960 | 4.150 |

TABLE 6E
PARAMETER VALUE OF
CONDITIONAL EXPRESSION

| |
|---|
| $(L_{1C}-L_{1W})/(L_{1T}-L_{1W})=0.215$ |
| $(L_{3C}-L_{3T})/(L_{3W}-L_{3T})=0.356$ |
| $(D_{3W}-D_{3T})/(D_{1T}-D_{1W})=0.47$ |
| $(f_{12T}/f_1)=-1.308$ |

FIG. 56A
TABLE 7A f=7.52~35.42, F=2.70~4.02, ω=33.09~7.35

| SURFACE NUMBER | R | D | Nd | νd | REMARKS |
|---|---|---|---|---|---|
| 01 | 39.389 | 1.20 | 1.84666 | 23.78 | 1st LENS |
| 02 | 20.025 | 3.88 | 1.53172 | 48.84 | |
| 03 | 158.989 | 0.10 | | | 2nd LENS |
| 04 | 26.736 | 2.70 | 1.77250 | 49.62 | 3rd LENS |
| 05 | 578.390 | ▲A | | | |
| 06* | −71.421 | 1.00 | 1.80610 | 40.73 | 4th LENS |
| 07* | 8.802 | 3.05 | | | |
| 08 | −16.232 | 0.80 | 1.51742 | 52.15 | 5th LENS |
| 09 | 11.846 | 2.06 | 1.84666 | 23.78 | 6th LENS |
| 10 | ∞ | ▲B | | | |
| 11 | DIAPHRAGM | 0.50 | | | |
| 12* | 7.657 | 1.12 | 1.58913 | 61.25 | 7th LENS |
| 13 | 8.381 | ▲C | | | |
| 14* | 9.908 | 2.63 | 1.58913 | 61.25 | 8th LENS |
| 15* | −40.037 | 0.11 | | | |
| 16 | 38.816 | 2.12 | 1.48749 | 70.44 | 9th LENS |
| 17 | −18.714 | 0.18 | | | |
| 18 | 15.283 | 1.87 | 1.58913 | 61.25 | 10th LENS |
| 19 | −112.371 | 1.17 | 1.80518 | 25.46 | 11th LENS |
| 20 | 6.199 | ▲D | | | |
| 21 | 17.732 | 1.96 | 1.64769 | 33.84 | 12th LENS |
| 22* | −121.961 | OPTION | | | |
| 23 | ∞ | 3.214 | 1.51680 | 64.20 | VARIETY OF FILTERS |
| 24 | ∞ | | | | |

▲A: VARIABLE(A)
▲B: VARIABLE(B)
▲C: VARIABLE(C)
▲D: VARIABLE(D)

FIG. 56B

TABLE 7B

| |
|---|
| NON-SPHERICAL SURFACE OF 6th SURFACE<br>$K=0.0$, $A_4=9.14684 \times 10^{-5}$ $A_6=-9.34472 \times 10^{-7}$ $A_8=1.42322 \times 10^{-8}$<br>$A_{10}=-1.17627 \times 10^{-10}$ |
| NON-SPHERICAL SURFACE OF 7th SURFACE<br>$K=0.09374$, $A_4=2.75961 \times 10^{-5}$ $A_6=1.27476 \times 10^{-6}$ $A_8=-1.62751 \times 10^{-8}$<br>$A_{10}=7.41921 \times 10^{-10}$ |
| NON-SPHERICAL SURFACE OF 12th SURFACE<br>$K=-1.26140$, $A_4=2.67355 \times 10^{-4}$ $A_6=-6.25917 \times 10^{-6}$ $A_8=8.12274 \times 10^{-7}$<br>$A_{10}=-3.08665 \times 10^{-8}$ |
| NON-SPHERICAL SURFACE OF 14th SURFACE<br>$K=-1.30919$, $A_4=-1.18876 \times 10^{-5}$ $A_6=2.33312 \times 10^{-6}$ $A_8=-1.34009 \times 10^{-8}$<br>$A_{10}=-4.54838 \times 10^{-10}$ |
| NON-SPHERICAL SURFACE OF 15th SURFACE<br>$K=-46.11855$, $A_4=7.30394 \times 10^{-5}$ $A_6=3.24821 \times 10^{-6}$ $A_8=-2.36224 \times 10^{-8}$<br>$A_{10}=-5.40644 \times 10^{-10}$ |
| NON-SPHERICAL SURFACE OF 22th SURFACE<br>$K=45.76087$, $A_4=-5.63924 \times 10^{-5}$ $A_6=-2.40860 \times 10^{-6}$ $A_8=7.82626 \times 10^{-8}$<br>$A_{10}=-1.12266 \times 10^{-9}$ |

TABLE 7C
VALUABLE INTERVAL:
TYPICAL PHOTOGRAPHING REGION

| | AT INFINITY | AT INFINITY | AT INFINITY | 0.3m | 0.4m | 0.5m |
|---|---|---|---|---|---|---|
| | SHORT FOCAL POINT END f=7.52 | MIDDLE FOCAL LENGTH f=16.33 | LONG FOCAL POINT END f=35.42 | SHORT FOCAL POINT END f=7.42 | MIDDLE FOCAL LENGTH f=15.68 | MIDDLE FOCAL POINT END f=31.93 |
| A | 1.239 | 7.297 | 13.763 | 1.239 | 7.297 | 13.763 |
| B | 14.024 | 7.966 | 1.500 | 14.024 | 7.966 | 1.500 |
| C | 8.000 | 3.593 | 1.500 | 8.000 | 3.593 | 1.500 |
| D | 5.563 | 10.036 | 11.215 | 5.118 | 8.673 | 7.390 |

FIG. 56C

TABLE 7D
VARIABLE INTERVAL IN MACRO MODE (PHOTOGRAPHIC DISTANCE IS FROM IMAGE SURFACE)

|   | 0.3m | 0.077m |
|---|---|---|
|   | f=12.55 | f=10.72 |
| A | 4.406 | 4.406 |
| B | 10.857 | 10.857 |
| C | 3.864 | 3.864 |
| D | 10.270 | 4.960 |

TABLE 7E
PARAMETER VALUE OF CONDITIONAL EXPRESSION

| |
|---|
| $(L_{1C}-L_{1W})/(L_{1T}-L_{1W})=0.253$ |
| $(L_{3C}-L_{3T})/(L_{3W}-L_{3T})=0.364$ |
| $(D_{3W}-D_{3T})/(D_{1T}-D_{1W})=0.52$ |
| $(f_{12T}/f_1)=-1.223$ |

FIG. 57A

TABLE 8A $f=7.52\sim35.41, F=2.76\sim3.93, \omega=33.03\sim7.33$

| SURFACE NUMBER | R | D | Nd | νd | REMARKS |
|---|---|---|---|---|---|
| 01 | 49.347 | 1.20 | 1.84666 | 23.78 | 1st LENS |
| 02 | 21.523 | 4.03 | 1.53172 | 48.84 | 2nd LENS |
| 03 | −735.434 | 0.10 | | | |
| 04 | 24.328 | 2.83 | 1.77250 | 49.62 | 3rd LENS |
| 05 | 253.175 | ▲A | | | |
| 06* | −60.958 | 1.00 | 1.84666 | 40.73 | 4th LENS |
| 07 | 8.431 | 2.83 | | | |
| 08 | −14.822 | 0.80 | 1.51680 | 64.20 | 5th LENS |
| 09 | 12.501 | 1.89 | 1.84666 | 23.78 | 6th LENS |
| 10 | ∞ | ▲B | | | |
| 11 | DIAPHRAGM | 0.50 | | | |
| 12* | 12.181 | 1.16 | 1.58913 | 61.25 | 7th LENS |
| 13 | 19.058 | ▲C | | | |
| 14* | 10.066 | 2.66 | 1.51680 | 64.20 | 8th LENS |
| 15 | −37.782 | 0.23 | | | |
| 16* | 26.397 | 2.21 | 1.48749 | 70.44 | 9th LENS |
| 17 | −19.437 | 0.10 | | | |
| 18 | 15.810 | 1.87 | 1.62374 | 47.05 | 10th LENS |
| 19 | −94.257 | 0.81 | 1.80518 | 25.46 | 11th LENS |
| 20 | 6.298 | ▲D | | | |
| 21 | 16.724 | 3.19 | 1.62004 | 36.30 | 12th LENS |
| 22* | −226.088 | OPTION | | | |
| 23 | ∞ | 3.214 | 1.51680 | 64.20 | VARIETY OF FILTERS |
| 24 | ∞ | | | | |

▲A: VARIABLE(A)
▲B: VARIABLE(B)
▲C: VARIABLE(C)
▲D: VARIABLE(D)

FIG. 57B

TABLE 8B

| |
|---|
| NON-SPHERICAL SURFACE IN 6th SURFACE<br>$K=0.0,\ A_4=7.30131\times10^{-5},\ A_6=-7.18253\times10^{-7},\ A_8=7.92813\times10^{-9},$<br>$A_{10}=-4.79927\times10^{-11}$ |
| NON-SPHERICAL SURFACE IN 12th SURFACE<br>$K=-2.47920,\ A_4=1.19559\times10^{-4},\ A_6=-7.86193\times10^{-6},\ A_8=8.04663\times10^{-7},$<br>$A_{10}=-3.15795\times10^{-8}$ |
| NON-SPHERICAL SURFACE IN 14th SURFACE<br>$K=-1.36970,\ A_4=-2.75811\times10^{-5},\ A_6=-9.84986\times10^{-7},\ A_8=-5.50234\times10^{-8},$<br>$A_{10}=-1.76532\times10^{-10}$ |
| NON-SPHERICAL SURFACE IN 16th SURFACE<br>$K=-16.43413,\ A_4=-5.94270\times10^{-5},\ A_6=-3.37933\times10^{-7},\ A_8=8.00684\times10^{-8},$<br>$A_{10}=3.43034\times10^{-10}$ |
| NON-SPHERICAL SURFACE IN 22th SURFACE<br>$K=0.0,\ A_4=-4.02551\times10^{-5},\ A_6=-2.96070\times10^{-6},\ A_8=9.12260\times10^{-8},$<br>$A_{10}=-1.34602\times10^{-9}$ |

TABLE 8C
VARIABLE INTERVAL:
TYPICAL PHOTOGRAPHING REGION

| | AT INFINITY | AT INFINITY | AT INFINITY | 0.3m | 0.4m | 0.5m |
|---|---|---|---|---|---|---|
| | SHORT FOCAL POINT END f=7.52 | MIDDLE FOCAL LENGTH f=16.33 | LONG FOCAL POINT END f=35.41 | SHORT FOCAL LENGTH f=7.43 | MIDDLE FOCAL POINT END f=15.76 | MIDDLE FOCAL POINT END f=32.02 |
| A | 1.362 | 7.523 | 13.223 | 1.362 | 7.523 | 13.223 |
| B | 13.361 | 7.201 | 1.500 | 13.361 | 7.201 | 1.500 |
| C | 8.000 | 3.864 | 1.500 | 8.000 | 3.864 | 1.500 |
| D | 5.373 | 9.240 | 11.288 | 4.937 | 7.944 | 7.412 |

FIG. 57C

TABLE 8D
VARIABLE INTERVAL IN MACRO MODE
(PHOTOGRAPHIC DISTANCE IS FROM IMAGE SURFACE)

|   | 0.3m | 0.077m |
|---|---|---|
|   | f=12.79 | f=11.19 |
| A | 5.415 | 5.415 |
| B | 9.308 | 9.308 |
| C | 4.309 | 4.309 |
| D | 8.630 | 3.620 |

TABLE 8E
PARAMETER VALUE OF CONDITIONAL EXPRESSION

| |
|---|
| $(L_{1C}-L_{1W})/(L_{1T}-L_{1W})=0.342$ |
| $(L_{3C}-L_{3T})/(L_{3W}-L_{3T})=0.432$ |
| $(D_{3W}-D_{3T})/(D_{1T}-D_{1W})=0.55$ |
| $(f_{12T}/f_1)=-1.211$ |

DOWNSIZE, HIGH PERFORMANCE, AND WIDE RANGE MAGNIFICATION ZOOM LENS AND CAMERA APPARATUS

BACKGROUND OF THE INVENTION

1. Field of the Invention

The present invention generally relates to zoom lenses and camera apparatuses, in particular to zoom lenses and camera apparatuses that are downsized and capable of exerting a high performance and a wide range magnification.

2. Discussion of the Background

In these later days, it becomes the nature of things that a digital camera that is rapidly spreading has a zooming function of a photographing lens. Accordingly, high image quality, wide range magnification, downsizing, and electrical power saving are sought in order to accommodate a photo-acceptance unit having a high density such as more than three million pixels.

Japanese Patent Application Laid Open Nos. 06-180424, 07-151967, and 09-090221 or the like propose the below described technology that is suitable for enabling a zoom lens for use in a digital camera to have a high performance and wide range magnification. Specifically, the first lens band having a positive focal length, the second lens band having a negative focal length, and the third, fourth and fifth lens bands having positive focal lengths are arranged in this order from an object side. In addition, magnification from short to long focal point ends is performed by smoothly moving the second lens band from the object side toward an image surface. Also, an image surface positional variance that accompanies such magnification is compensated by moving the fourth lens band.

However, in any one of zoom lenses described in these official gazettes, the fourth lens band moves in order to compensate the positional variance of an image surface, which accompanies the magnification, and rarely contributes to the magnification. Specifically, the second lens band substantially bears all of the magnifying function.

As a result, a moving amount of the second lens band that accompanies the magnification is large, and the first lens band steps away from an aperture diaphragm arranged in the vicinity of the third lens band. As a result, the first lens band as well as the whole lens can not avoid being large in size.

Further, in these later days, a macro mode that enables proximal photographing more than a typical proximal photographing is increasingly demanded in not only a typical camera but also a digital camera so that detail of a circuit board, a decor good such as a jewelry, and parts of a precision instrument can more sharply and distinctly be photographed.

SUMMARY OF THE INVENTION

Accordingly, an object of the present invention is to address and resolve the above and other problems and provide a new zoom lens. The above and other objects are achieved according to the present invention by providing a novel zoom lens that includes a first lens band having a positive focal length, a second lens band having a negative focal length, and at least third to fifth lens bands having positive focal lengths. An aperture diaphragm may be located in the vicinity of the third lens band. When magnification is performed from short to long focal point ends, the second lens band smoothly moves toward the third lend band, and the fourth lens band simultaneously moves from the fifth lens band side toward a long focal point end so as to share a magnification function together with the second lens band.

In another embodiment, a distance $D_{1W}$ between the first and second lens bands at the short focal point end, a distance $D_{1T}$ between the first and second lens bands at the long focal point end, a distance $D_{3W}$ between the third and fourth lens bands at the short focal point end, and a distance $D_{3T}$ between the third and fourth lens bands at the long focal point end substantially meet the following inequality:

$$(D_{3W}-D_{3T})/(D_{1T}-D_{1W})>0.3$$

In yet another embodiment, the zoom lens may be photograph use and the first lens band may be nearest to an object to be photographed.

In yet another embodiment, the fourth lens band May come closest to the third lens band at a focal length slightly before the long focal point end.

In yet another embodiment, a positional variance of an image surface, which is caused by these smooth movements of the second and fourth lens bands, may be compensated by movement of the fifth lens band.

In yet another embodiment, the first lens band is immobile.

In yet another embodiment, the third lens band and the aperture diaphragm are immobile.

In yet another embodiment, the fifth lens band may perform focussing.

In yet another embodiment, a focal length $f_1$ of the first lens band, and a composite focal length $f_{12T}$ of the first and second lens bands at the long focal point end substantially meet the following inequality:

$$-1.4<(f_{12T}/f_1)<-1.0$$

In yet another embodiment, a composite focal length $f_{12W}$ of the first and second lens bands at the short focal point end, a composite focal length $f_{12T}$ of the first and second lens bands at the long focal point end, a focal length $f_T$ of the entire unit at the long focal point end, and a focal length $f_W$ of the entire unit at the short focal point end substantially meet the following inequality:

$$0.4<(f_{12T}/f_{12W})/(f_T/f_W)<0.7$$

In yet another embodiment, each of the lens bands includes less than three lenses, the second and third lens bands include at least one non-spherical surface, and at least one of the fourth and fifth lens band includes more than one non-spherical surfaces.

In yet another embodiment, the first to third and fifth lens bands include less than three lenses, the fourth lend band includes four lenses, each of the second and third lens bands includes at least one non-spherical surface, and at least one of the fourth and fifth lens band includes more than one non-spherical surfaces.

In yet another embodiment, the fifth lens band includes only one lens.

In yet another embodiment, the aperture diaphragm is located in the object side of the third lens band.

In yet another embodiment, a camera apparatus includes the zoom lens.

In yet another embodiment, the camera apparatus includes a function of digitizing a photographed image into digital information.

In yet another embodiment, a photo acceptance unit having three million pixels may be included so as to receive an image from the zoom lens.

In yet another embodiment, a mobile information terminal may include the camera apparatus.

In yet another embodiment, a macro mode capable of focussing at a shorter distance than an ordinal photographing region may be included in the zoom lens, and focussing may be performed by movement of the fifth lens band both in an ordinal photographing region and in the macro mode.

In yet another embodiment, the fourth lens band in the macro mode is close to the fourth lens band at the long focal point end.

In yet another embodiment, the second lens band in the macro mode is closer to the image surface than when it is at the short focal point end.

In yet another embodiment, the fourth lens band in the macro mode is positioned close to the fourth lens band at the long focal point end, and the second lens band in the macro mode is closer to the image surface than the second lens band at the short focal point end.

In yet another embodiment, the first lens band is immobile with regard to the image surface.

In yet another embodiment, the aperture diaphragm is immobile with regard to the image surface.

In yet another embodiment, the first and third lens bands and the aperture diaphragm are immobile with regard to the image surface.

In yet another embodiment, a distance $L_{1W}$ between the first and second lens bands at the short focal point end, a distance $L_{1T}$ between the first and second lens bands at the long focal point end, a distance $L_{1C}$ between the first and second lens bands in the macro mode substantially meet the following inequality:

$$0.15 < (L_{1C} - L_{1W})/(L_T - L_{1W}) < 0.40$$

In yet another embodiment, a distance $L_{3W}$ between the third and fourth lens bands at the short focal point end, a distance $L_{3T}$ between the third and fourth lens bands at the long focal point end, a distance $L_{3C}$ between the third and fourth lens bands in the macro mode substantially meet the following inequality:

$$0.25 < (L_{3C} - L_{3W})/(L_{3W} - L_{3T}) < 0.50$$

In yet another embodiment, a distance $L_{1W}$ between the first and second lens bands at the short focal point end, a distance $L_{1T}$ between the first and second lens bands at the long focal point end, a distance $L_{1C}$ between the first and second lens bands in the macro mode substantially meet the following inequality:

$$0.15 < (L_{1C} - L_{1W})/(L_{1T} - L_{1W}) < 0.40$$

In addition, a distance $L_{3W}$ between the third and fourth lens bands at the short focal point end, a distance $L_{3T}$ between the third and fourth lens bands at the long focal point end, and a distance $L_{3C}$ between the third and fourth lens bands in the macro mode substantially meet the following inequality:

$$0.25 < (L_{3C} - L_{3W})/(L_{3W} - L_{3T}) < 0.50$$

In yet another embodiment, a distance $D_{1W}$ between the first and second lens bands at the short focal point end, a distance $D_{1T}$ between the first and second lens bands at the long focal point end, a distance $D_{3W}$ between the third and fourth lens bands at the short focal point end, and a distance $D_{3T}$ between the third and fourth lens bands at the long focal point end substantially meet the following inequality:

$$(D_{3W} - D_{3T})/(D_{1T} - D_{1W}) > 0.3$$

In yet another embodiment, a focal length $f_1$ of the first lens band, and a composite focal length $f_{12T}$ of the first and second lens bands at the long focal point end substantially meet the following inequality:

$$-1.4 < (f_{12T}/f_1) < -1.0$$

BRIEF DESCRIPTION OF DRAWINGS

A more complete appreciation of the present invention and many of the attendant advantages thereof will be readily obtained as the same becomes better understood by reference to the following detailed description when considered in connection with the accompanying drawings, wherein:

FIG. 20 is a diagram for illustrating a set of aberration curvatures of the fifth exemplary zoom lens at a middle focal length;

FIG. 21 is a schematic chart for illustrating aberration curvature of the fifth exemplary zoom lens at a long focal length;

FIGS. 22, 22B, and 22C are schematic charts for illustrating one example of a camera apparatus;

FIGS. 25A and 25B are schematic charts for illustrating lens arrangements during magnification and in a macro mode of the eighth example;

FIG. 26 is a schematic chart for illustrating a set of aberration curvatures of the sixth example at a short focal point end when a photographing distance is infinity;

FIG. 27 is a schematic chart for illustrating a set of aberration curvatures of the sixth example at a middle focal length when a photographing distance is infinity;

FIG. 30 is a schematic chart for illustrating a set of aberration curvatures of the sixth example at the middle focal length when a photographing distance is 0.4 millimeters;

FIG. 34 is a schematic chart for illustrating a set of aberration curvatures of the seventh example at a short focal point end when a photographing distance is infinity;

FIG. 45 is a schematic chart for illustrating a set of aberration curvatures of the eighth example at the short focal point end when a photographing distance is 0.3 millimeters;

FIG. 46 is a schematic chart for illustrating a set of aberration curvatures of the eighth example at the middle focal length when a photographing distance is 0.4 millimeters;

FIGS. 50 through 57 include tables for illustrated examples of the present invention.

DETAILED DESCRIPTION OF THE PREFERRED EMBODIMENT

Figure 1A:
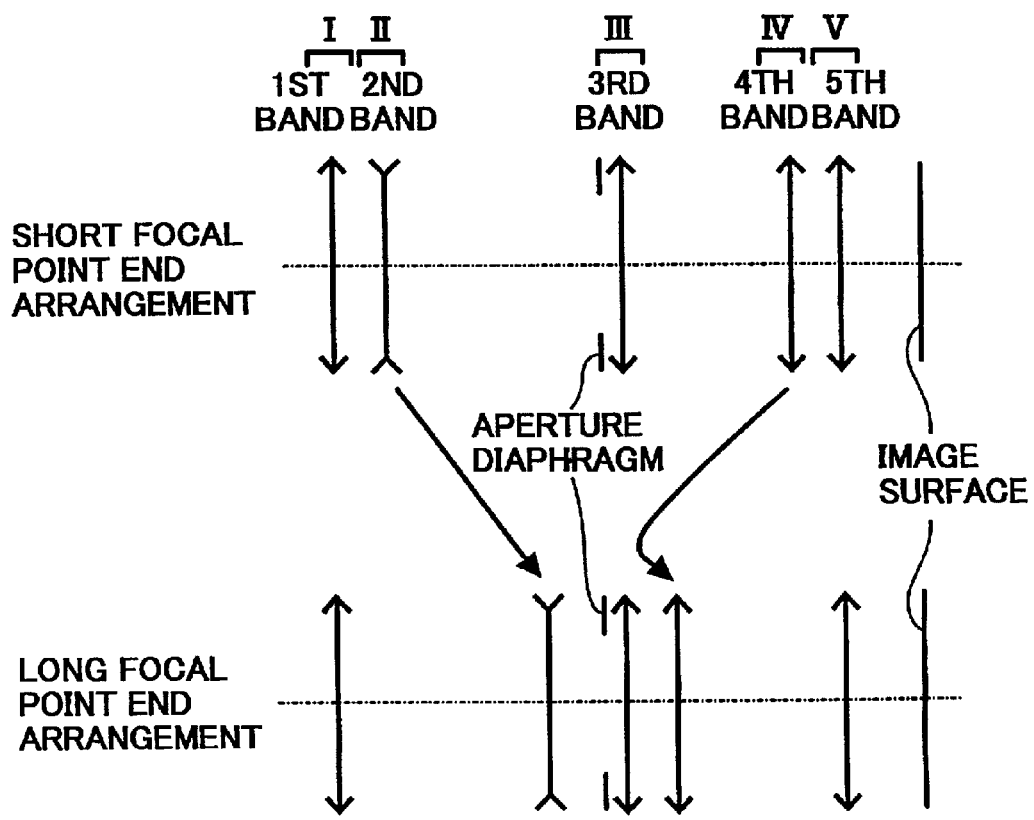
FIGS. 1A and 1B are schematic charts for illustrating one example of magnification movement of a zoom lens according to the present invention.
Figure 1B:
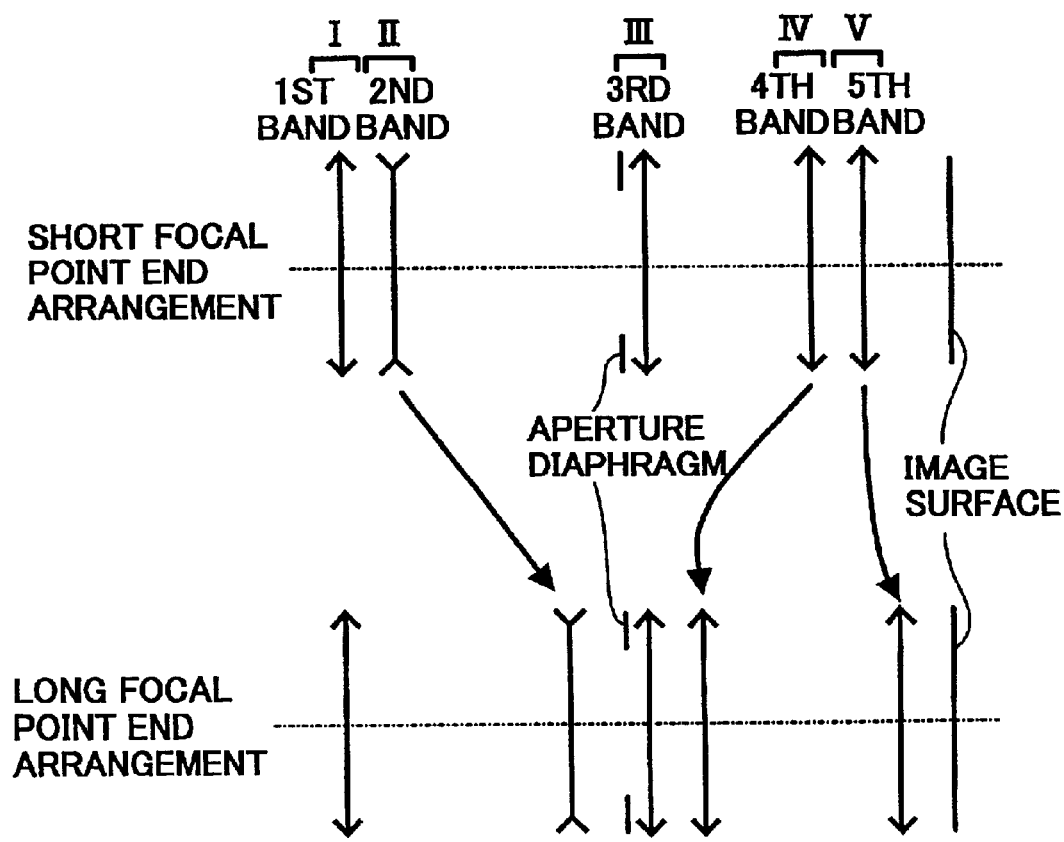

Referring now to the drawings, wherein like reference numerals designate identical or corresponding parts throughout several views, and in particular in FIGS. 1A and 1B, a zoom lens may include the first lens band having a positive focal length, the second lens band having a negative focal length, and the third to fifth lens bands having the positive focal lengths.

Also included may be an aperture diaphragm disposed in the vicinity of the third lens band. When magnification from short to long focal point ends is performed, the second lens band may smoothly move toward the third lens band.

Simultaneously, the fourth lens band may move from the fifth lens band toward a long focal point end in the vicinity of the third lens band. Thereby, the fourth lens band may share a magnifying function together with the second lens band.

As a typical zoom lens whose first to fifth lens bands having power allocation such as positive, negative, positive, positive, and positive, it is known heretofore that the first, third, and fifth lens bands are fixed in case of magnification, and the second lens band (i.e., variant) is moved so as to perform the magnification. In addition, the fourth lens band (i.e., compensating member) is moved so as to compensate a positional variance of an image surface which accompanies the magnification. In such a situation, since the second lens band substantially bear all of the magnifying function, a moving amount of the second lens band for the magnification is large. In addition, since the first lens band largely steps away from an aperture diaphragm, a light ray valid diameter (i.e., a lens external diameter) of the first lens band results in large.

Then, an exemplary zoom lens of the present invention may be configured such that the fourth lens band may share the magnifying function during magnification.

A moving amount of the second lens band is minimized, and thereby, the aperture diaphragm can be approximated by the first lens band. As a result, the light ray valid diameter of the first lens band can be minimized.

Such a zoom lens may be preferable if it substantially meets the following inequality, wherein the reference numeral $D_{1W}$ represents a distance between the first and second lens bands at a short focal point end, the reference numeral $D_{1T}$ represents a distance between the first and second lens bands at a long focal point end, the reference numeral $D_{3W}$ represents a distance between the third and fourth lens bands at a short focal point end, and the reference numeral $D_{3T}$ represents a distance between the third and fourth lens bands at a long focal point end:

$$(D_{3W}-D_{3T})/(D_{1T}-D_{1W})>0.3$$

The above-described formula may represent necessity of increase in a moving amount of the fourth lens band more than a prescribed level when magnification is performed. Specifically, if the parameter $(D_{3W}-D_{3T})/(D_{1T}-D_{1W})$ becomes smaller than the lower limit 0.3, there may be a probability that the fourth lens band does not sufficiently share the magnifying function. For example, if supposing a case in which the third lens band is fixed, the element $(D_{3W}-D_{3T})$ may indicate a moving amount of the fourth lens band when magnification from the short to long focal point ends is performed. Similarly, the denominator $(D_{1T}-D_{1W})$ may indicate a moving amount of the second lens band when magnification is performed.

Thus, minimization of the parameter $(D_{3W}-D_{3T})/(D_{1T}-D_{1W})$ may denote minimization of the element or enlargement of the denominator. The minimization of the element may denote decrease in a moving amount of the fourth lens band. In contrast, enlargement of the denominator may denote enlargement of a moving amount of the second lens band. Accordingly, a magnifying function to be shared by the fourth lens band may be minimized in any cases.

Further, along as becomes larger, a rate of sharing magnifying function by the fourth lens band may become larger. However, if the magnifying function share rate by the fourth lens band becomes excessively large, the magnifying function share rate of the second lens band may become smaller, thereby resulting in difficulty in obtaining fair magnification. Accordingly, a limit of the parameter $(D_{3W}-D_{3T})/(D_{1T}-D_{1W})$ may be around 1.0.

The above-described zoom lens may be novel to the extent that the fourth lens band shares a magnifying function together with the second lens band.

It can be utilized as a projector use zoom lens in a liquid crystal projector.

In addition, the zoom lens can be a photographic zoom lens whose first lens band is arranged in an object side.

In addition, as illustrated in FIG. 1A, the fourth lens band may come closest to the third lens band during its movement from the fifth lens band side toward the long focal point end in the vicinity of the third lens band for magnification at a focal point slightly before the long focal point end.

Further, the zoom lens can have both of functions of magnifying and compensating an image surface positional variance that accompanies the magnification at once.

Specifically, as illustrated in FIG. 1B, when magnification from the short to long focal point ends is performed, the fourth lens band smoothly moves from the fifth lens band side toward the long focal point end in the vicinity of the third lens band.

The positional variance of an image surface may accompany the magnification performed by the smooth movement of the second and fourth lens bands. The positional variance may be compensated by a movement of the fifth lens band.

If compensating the image surface variance, flexibility of improvement in a performance may increase and a higher performance may readily be obtained. In addition, since smooth movement is performed by each of the second and fourth lens bands in such a manner, a mechanism for use in a lens band movement may be simplified and accomplished with a lower torque.

In one example of zoom lens, the first lens band can be fixed. Such fixation may represent a stable, permanently fixed condition. To achieve the lens band movement with a simpler mechanism, the first lens band may preferably always be fixed. Because, the first lens band is biggest and heaviest, movement of the first lens band may be easy to impair simplicity of the mechanism and electrical power saving. In addition, when movement of the first lens band performs focussing, the first lens band may become large owing to reservation of a circumference light quantity at a close range.

In another example of a zoom lens, the third lens band and an aperture diaphragm may be fixed. Because, a shutter (not shown) is sometimes arranged at a position of the aperture diaphragm, and displacement of the shutter may unfortunately cause a mechanism to be complex. If a shutter movable configuration is employed, vibration generated when the shutter is driven may easily travel to another portion of a lens unit, and is a possible cause of image vibration.

In another exemplary zoom lens, focussing can be performed by integrally moving the whole lens units. In a case of imaging on a light-receiving surface of a photoacceptance unit such as a CCD or the like, the photoacceptance unit can be moved. Otherwise, inner focussing performed by moving one or more lens bands other than the first lens band may be employable. In any way, focussing can be performed by movement of the fifth lens band.

When performing the inner focussing, the fifth lens band is most preferably utilized for focussing.

The amount of movement required to adjust a focal point of an object of a prescribed distance may be smaller at the short focal point end, and larger at the long focal point end, in contrast. However, since an interval between the fourth and fifth lens bands may be small when lens band moves to the short focal point end, and large when they moves to the long focal point end as similar to the above, movement of the fifth lens band for focussing may not be impaired by the fourth lens band.

In addition, if a positional variance of an image surface which accompanies magnification is compensated by movement of the fifth lens band, an advantage that a moving mechanism and a control device for focussing and compensating an image surface can be designed in common may be obtained.

In one example of a zoom lens, the following inequality may be preferably met by the focal length $f_1$ of the first lens band and the composite focal length $f_{12T}$ of the first and second lens bands in order to further downsize and obtain a higher performance:

$$-1.4<(f_{12T}/f_1)<-1.0$$

Such parameter $(f_{12T}/f_1)$ may denote a magnification rate of the second lens band at the long focal point end. To downsize a lens unit, power of the first lens band is required to be strengthened (i.e., to shorten a focal length). To achieve such a design the magnification rate of the second lens band at the long focal point end preferably may be set at less than −1. On the other hand, if the magnification rate of the second lens band at the long focal point end is less than −1.4, since contribution of the fourth lens band to the magnification is weakened and the power of the second lens band should be strengthened, disadvantage may arise in aberration compensation.

Thus, one example of zoom lens may preferably substantially meet the following inequality, wherein the reference numeral $f_{12W}$ represents the composite focal length of the first and second lens bands at the short focal point end, the reference numeral $f_{12T}$ represents the composite focal length of the first and second lens bands at the long focal point end, and the reference numeral $f_{1T}$ represents a focal length of the whole lens units at the long focal point end, and reference numeral $f_{1W}$ represents a focal length of the whole lens units at the short focal point end:

$$0.4 < (f_{12T}/f_{12W})/(f_T/f_W) < 0.7$$

The element $(f_{12T}/f_{12W})$ may indicate a magnification change of the second lens band. The denominator $(f_T/f_W)$ may indicate a magnification rate of a zoom lens as it is. If the parameter $(f_{12T}/f_{12W})/(f_T/f_W)$ exceeds the upper limit 0.7, a magnifying function of the fourth lens band is insufficient, and the first lens band may generally be increase in size. In contrast, when the parameter $(f_{12T}/f_{12W})/(f_T/f_W)$ lowers the lower limit 0.4, the magnifying function of the second lens band may excessively become weak and a change in an incident pupil radius at the time of zooming may become small. As a result, a variance of the F-number from the short to long focal point ends may unavoidably become large when a diameter of an aperture diaphragm is set constant.

If the variance of the F-number is large, either minimization of the F-number at the short focal point end or enlargement of the F-number at the long focal point end should optionally be selected. However, if the F-number of the short focal point is minimized, aberration is hardly compensated. In contrast, when the F-number of the long focal point is enlarged, it may be easy to receive affection of hand shaking or the like. In addition, a method for maintaining the F-number constant by varying the aperture diaphragm diameter at the time of zooming can be employed. However, it is not preferable because a mechanism (i.e., a shutter) for the diaphragm becomes complex.

In the above-described zoom lens, less than three lenses may constitute each lens band. More than one non-spherical surface may be employed in each of the second and third lens bands. Further, more than one non-spherical surface may be employed in any one of fourth and fifth lens bands.

When a zoom lens is utilized in order to image on a photo-acceptance unit having more than three million pixels, each aberration has to be suppressed to an extraordinary small level. However, it is not preferable from a cost point of view also to make the lens construction complex to sufficiently compensate each aberration.

By constituting each lens band with less than three lenses to be relatively simple, and utilizing more than one non-spherical surface in each of the second and third lens bands and at least any one of the fourth and fifth lens bands, a high imaging performance capable of sufficiently accommodating the photo-acceptance unit can be secured.

As an alternative lens construction capable of obtaining a high performance with a relatively simple construction in the similar manner, a zoom lens may be configured in the following manner. That is, less than three lenses may constitute the first to third lens bands and fifth lens band. In addition, four lenses may constitute the fourth lens band, and more than one non-spherical surface may be included in each of the second and third lens bands. In addition, more than one non-spherical surface may be included in any one of the fourth and fifth lens bands.

In addition, the fifth lens band may include one lens. This may introduce an advantage that movement can be performed with small energy because the fifth lens band weighs relatively light when moved in order to perform compensation of an image surface variance and focussing.

In addition, the aperture diaphragm may be arranged in the object side in the vicinity of the third lens band.

An exemplary camera apparatus may employ the above-described any one of zoom lenses as a photograph use zoom lens.

The camera apparatus may be any one of a conventional silver photographic camera, a digital camera, and a digital video camera having a function of digitizing a photographed image.

The camera apparatus can employ a photo-acceptance unit having more than three million pixels in order to receive a light ray of an image via the zoom lens. In addition, the camera apparatus can be utilized in a mobile information terminal.

A plurality of practical examples of a zoom lens is now described with reference to tables 1A, 1B, 1C, and 1D, wherein it is premised that an aberration of each example has sufficiently been compensated and thereby capable of accommodating a photo acceptance unit having more than 3 million pixels.

The first practical example may be a type in that the fifth lens band is fixed, and the fourth lens band exerts both functions of magnifying and compensating an image surface positional variance that accompanies the magnification. The successive second to fifth practical examples may be types in that an image surface positional variance may be compensated by moving the fifth lens band.

In each practical example, the reference numeral (f) represents a focal length of the whole lens units. The reference numeral (F) represents an F-number. The reference numeral (ω) represents a half field angle. The reference numeral (R) represents a curvature radius (a paraxial curvature radius in a case of a non-spherical surface). The reference numeral (D) represents an interval of a surface including a surface of an aperture diaphragm. The reference numeral (Nd) represents a refraction index of a d-line. The reference numeral (vd) represents an abbe's number. The reference numeral (K) represents a circular cone constant of the non-spherical surface. The reference numeral $A_4$ is the fourth degree coefficient of a non-spherical surface. The reference numeral $A_6$ is the sixth degree coefficient of a non-spherical surface. The reference numeral $A_8$ is the eighth degree coefficient of a non-spherical surface. The reference numeral $A_{10}$ is the tenth degree coefficient of a non-spherical surface.

A plurality of coordinates "X" of non-spherical surfaces whose surface numbers have asterisks (*) may be determined from the following universally known formula by substituting values of the above-described reference numerals K, $A_4$, $A_6$, $A_8$ and $A_{10}$.

Such a reference numeral "X" represents a coordinate of a surface of the non-spherical surface in the optical axis direction at each height of the surface, the reference numeral "C" represents an inverse number of a paraxial curvature radius (i.e., a paraxial curvature) and the reference numeral H represents a height from an optical axis:

$$X=CH^2/1+(1-(1+k)C^2H^2)+A_4H^4+A_6H^6+A_8H^8+A_{10}H^{10}$$

Then, a shape may be defined by giving R (=1/C), K, $A_4$, $A_6$, $A_8$ and $A_{10}$. Such a "surface number" may be of a number counted starting from the object nearest side surface. A unit of a quantum having a length dimension may be millimeter.

In the first practical example, now described with reference to tables 1A, 1B, 1C, 1D, and 1E, the reference numeral (f) varies from 7.52 to 35.41, that of (F) varies from 2.78 to 4.02, and that of (ω) varies from 32.88 to 7.35 in accordance with zooming.

A plurality of lenses having prescribed properties may be employed as listed on the table 1A (FIG. 50).

Each of the non-spherical surfaces of the fifth, seventh, twelfth, fourteenth, and nineteenth surfaces may be defined by predetermined values listed on the table 1B. Further, a plurality of intervals A, B, C, and D may also be listed on the table 1C. In addition, a plurality of numerical values listed on the table 1D may be assigned to parameters of conditional expressions in this practical example.

Further, both a variable distance and a focal length when magnification from the short to long focal point ends is performed and the fourth lens band comes closest to the third lens band may be listed on the table 1E.

Figure 2:
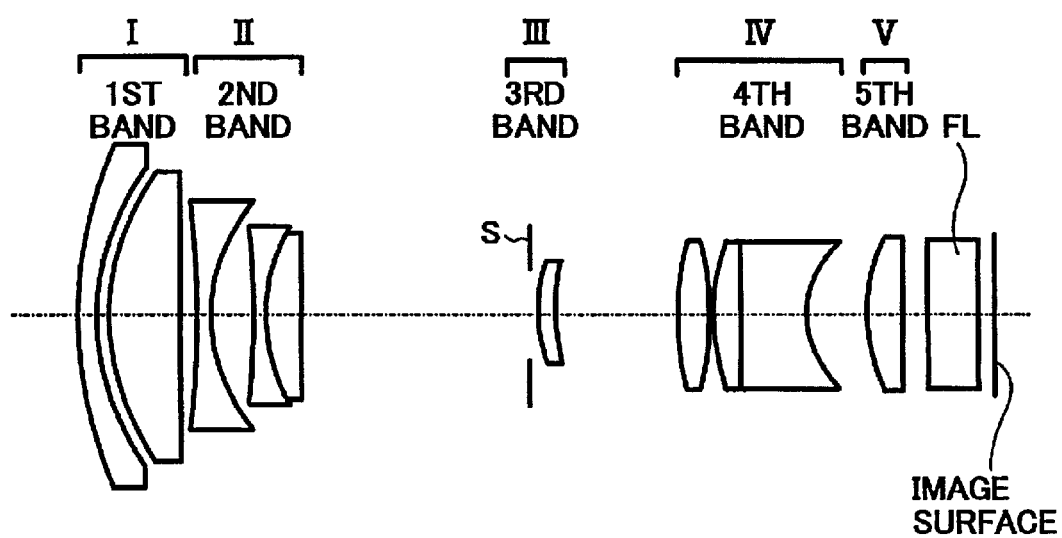
FIG. 2 is a schematic chart for illustrating lens arrangement of the first exemplary zoom lens.

A lens arrangement of the first practical example may be illustrated in FIG. 2, wherein the reference numerals I, II, III, IV and V may represent the first, second, third, fourth and fifth lens bands. In FIG. 2, the reference numeral "S" may represent an aperture diaphragm, and that of FL may represent a variety of lens filters. These may be similar in subsequent drawings.

The second practical example is now described with reference to tables 2A, 2B, 2C, 2D, and 2E, wherein the reference numeral (f) varies from 7.52 to 35.42, that of (F) varies from 2.68 to 4.02, and that of (ω) varies from 32.96 to 7.32 in accordance with zooming.

A plurality of properties of lenses may be listed in the table 2A.

Each of the non-spherical surfaces of the fifth, seventh, twelfth, fourteenth, and nineteenth surfaces in this example may be defined by predetermined values as listed on the table 2B. In addition, a plurality of intervals A, B, C, and D in this example may be listed on the table 2C. A plurality of values assigned to parameters of conditional expressions may be listed on the table 2D.

Figure 3:
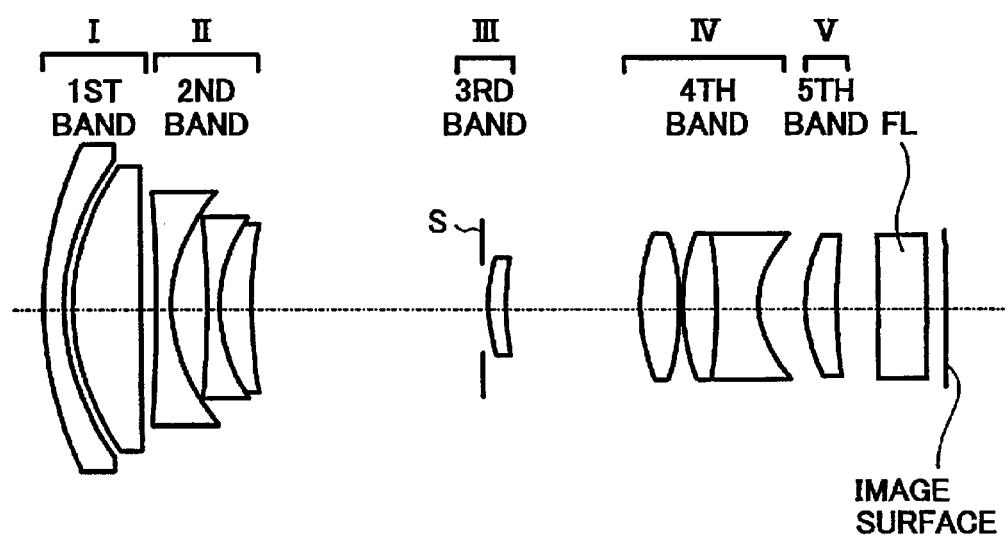
FIG. 3 is a schematic chart for illustrating the second exemplary zoom lens.

A lens arrangement of the second practical example may be illustrated in FIG. 3.

The third practical example is now described with reference to tables 3A, 3B, 3C and 3D, wherein the reference numeral (f) varies from 7.52 to 42.48, that of (F) varies from 2.38 to 4.00, and that of (ω) varies from 33.10 to 6.12 in accordance with zooming.

A plurality of lens properties of this example may be listed on the table 3A.

Each of the non-spherical surfaces of the fifth, seventh, twelfth, fourteenth, and nineteenth surfaces may be defined by predetermined values as listed on the table 3B.

A plurality of intervals A, B, C, and in this practical example may be listed on the table 3C. In addition, a plurality of numerical values assigned to parameters of conditional expressions in this practical example may be listed on the table 3D.

Figure 4:
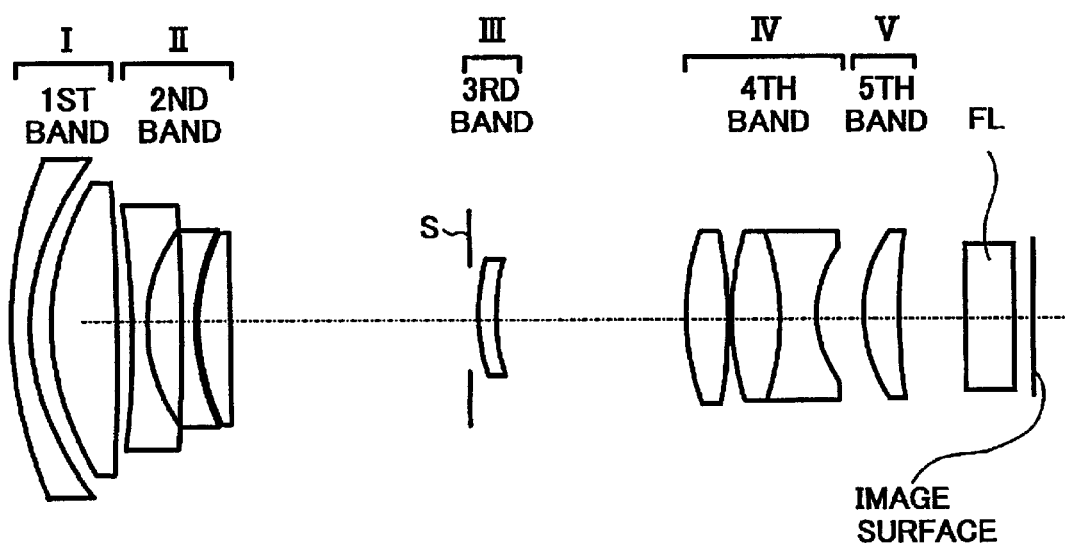
FIG. 4 is a schematic chart for illustrating the third exemplary zoom lens.

Further, a lens arrangement of the third practical example may be illustrated in FIG. 4.

The fourth practical example is now described with reference to tables 4A, 4B, 4C, and 4D, wherein the reference numeral (f) varies from 7.52 to 35.42, that of (F) varies from 2.62 to 4.00, and that of (ω) varies from 32.99 to 7.41 in accordance with zooming.

Each of the non-spherical surfaces of the fifth, seventh, eleventh, thirteenth, fourteenth, and twenty-first surfaces may be defined by predetermined values listed on the table 4B. In addition, a plurality of intervals A, B, C, and D may be listed on the table 4C. Further, a plurality of numerical values assigned to parameters of conditional expressions in this practical example may be listed on the table 4D. In addition, a lens arrangement of the third practical example may be illustrated in FIG. 5.

The fifth practical example is now described with reference to tables 5A, 5B, 5C, and 5D, wherein the reference numeral (f) varies from 7.52 to 35.42, that of (F) varies from 2.70 to 4.02, and that of (ω) varies from 33.09 to 7.35 in accordance with zooming.

Each of the non-spherical surfaces of the fifth, seventh, twelfth, fourteenth, fifteenth, and twenty-second surfaces may be defined by predetermined values listed on the table 5B. In addition, a plurality of intervals A, B, C, and D may be listed on the table 5C. Further, a plurality of numerical values assigned to parameters of conditional expressions in this practical example may be listed on the table 5D.

Figure 6:
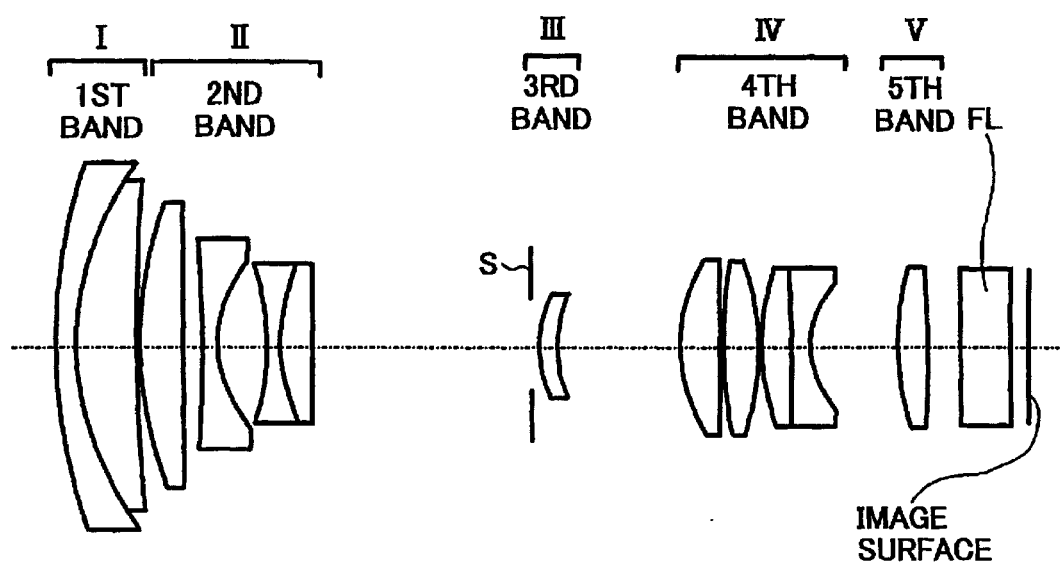
FIG. 6 is a schematic chart for illustrating the fifth exemplary zoom lens.

A lens arrangement of the fifth practical example may be illustrated in FIG. 6.

Figure 7:
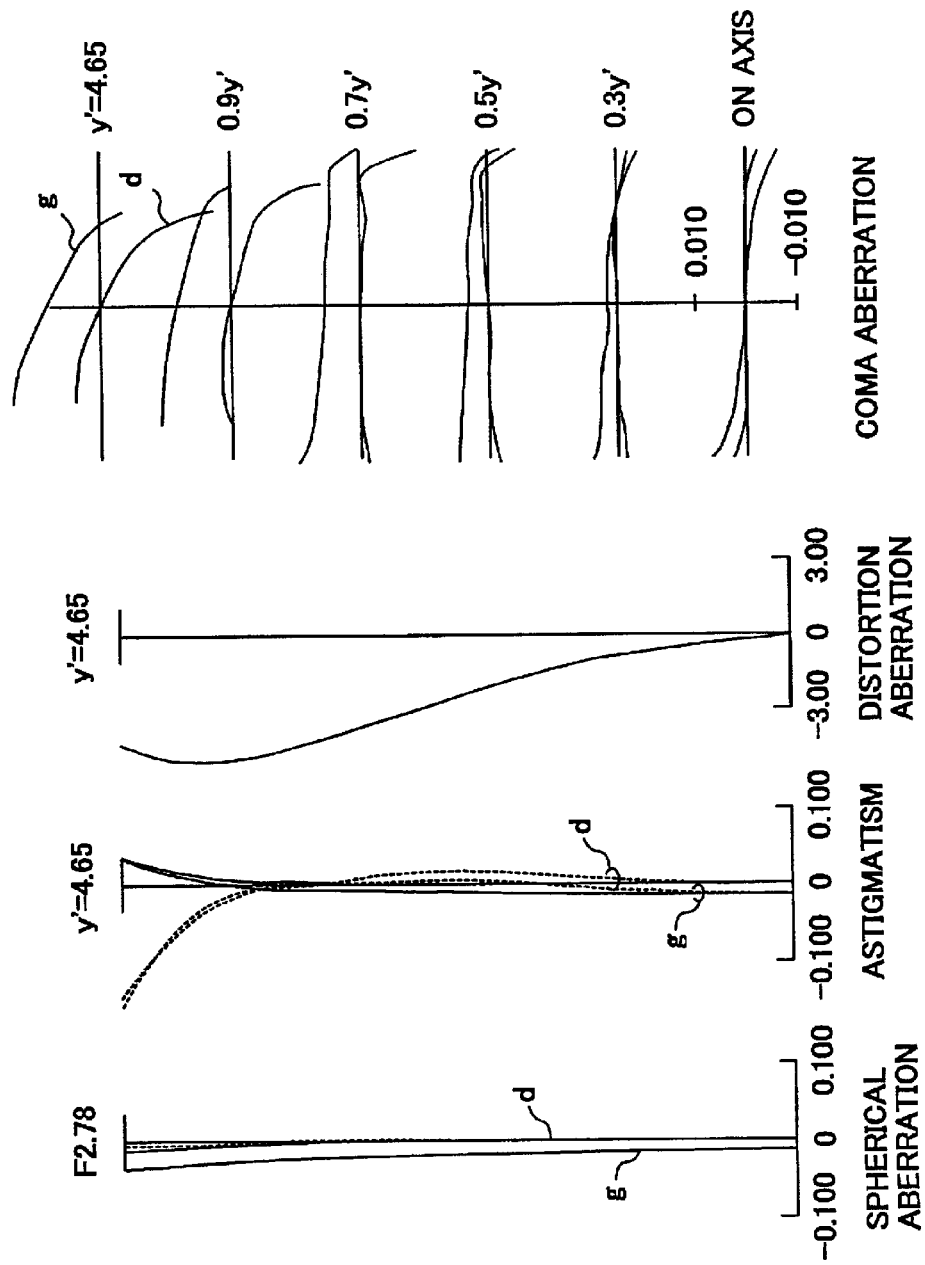
FIG. 7 is diagram for illustrating a set of aberration curvatures of the first example at a short focal point end.
Figure 8:
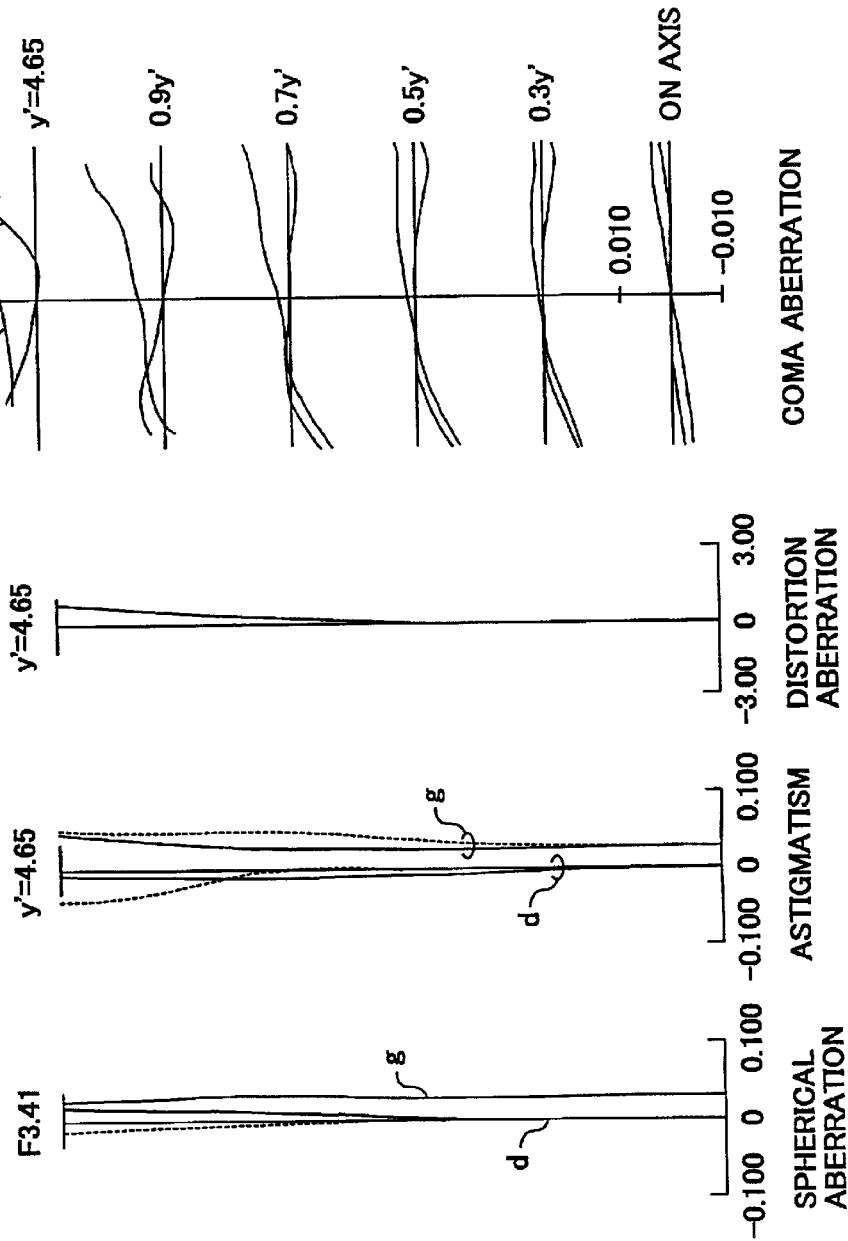
FIG. 8 is a diagram for illustrating a set of aberration curvatures of the first example at a middle focal length.
Figure 9:
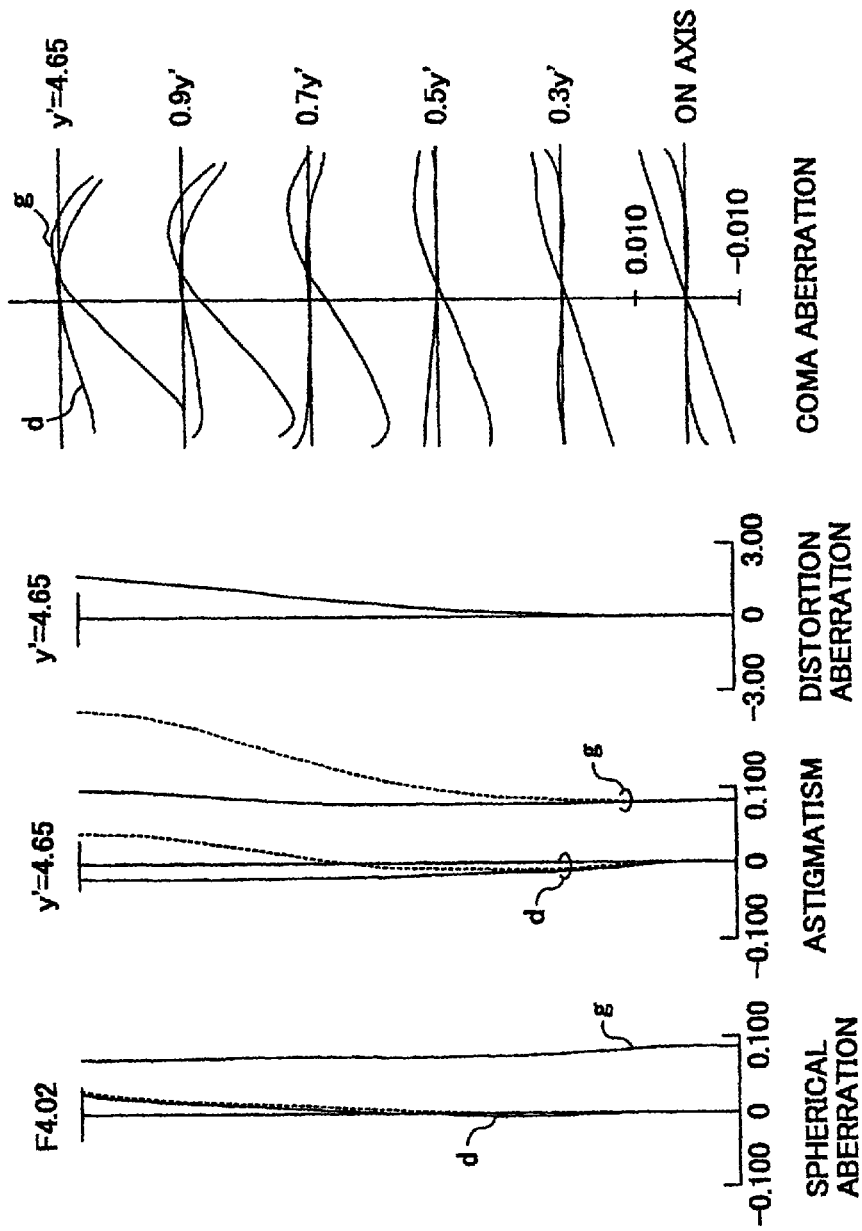
FIG. 9 is a schematic chart for illustrating a set of aberration curvatures of the first exemplary zoom lens at a long focal length.

A set of aberration curvatures at the short focal point end, the middle focal length, and the long focal point end of the first practical example may be illustrated in FIGS. 7 to 9 one by one. Similarly, plural sets of aberration curvatures of the second to fifth practical examples may be illustrated in FIGS. 10 to 12, 13 to 15, 16 to 18, and 19 to 21, respectively, one by one.

In each of the aberration curvature diagrams, a dotted line in the spherical surface aberration diagram may represent a sine condition. A rigid line in the diagram of the astigmatism may represent sagittal, and a dotted line may represent meridional. In addition, reference numerals (g) and (d) may represent a (g)-line and a (d)-line, respectively.

As apparent from these sets of aberration diagrams, each of the practical examples may have an extremely fair performance, and is capable of accommodating a digital camera or the like employing a photo acceptance unit having more than three million pixels.

As described earlier, in any one of zoom lenses of from the first to fifth practical examples, there may be provided with the first lend band having a positive focal length, the second lens band II having a negative focal length, the third to fifth lens bands III, IV, and V having positive focal lengths, and the aperture diaphragm "S" disposed in the vicinity of the third lens band III. In addition, when magnification from the short to long focal point ends is performed, the second lens band may smoothly move toward the third lens band. Simultaneously, the fourth lens band may move from the fifth lens band side toward the long focal point end in the vicinity of the third lens band.

Thus, the fourth lens band may take partial charge of the magnifying function together with the second lens band. Further, an exemplary zoom lens may be designed so that the following inequality may be valid, wherein a distance between the first and second lens bands at the short focal point end is $D_{1W}$, that between the first and second lens bands at the long focal point end is $D_{1T}$, that between the third and fourth lens bands at the short focal point end is $D_{3W}$, and that between the third and fourth lens bands at the long focal point end is $D_{3T}$:

$$(D_{3W}-D_{3T})/(D_{1T}-D_{1W})>0.3$$

In addition, the exemplary zoom lens may be for photographic use with the first lens band (I) sides facing an object side. Further, the first exemplary zoom lens may be configured such that the fourth lens band moves from the fifth lens band side toward the long focal point end in the vicinity of the third lens band, and comes closest to the third lens band at a focal point slightly before the long focal point end when magnification from the short to long focal point ends is performed. Further, the second to fourth exemplary zoom lenses may be configured such that the fourth lens band smoothly moves from the fifth lens band side toward the long focal point end in the vicinity of the third lens band, and the movement of the fifth lens band compensates a positional variance of an image surface which is caused by the smooth movement of the second and fourth lens bands when magnification from the short to long focal point ends is performed.

Further, the zoom lenses of the first to fifth examples may be configured such that the first and third lens bands and the aperture diaphragm may be fixation types, and focussing is performed by movement of the fifth lens band.

Further, each of these exemplary zoom lens may substantially meet the following inequality wherein reference numerals $f_1$ and $f_{12T}$ may be a focal length of the first lens band and a combination focal length of the first and second lens bands at the long focal point end:

$$-1.4 < (f_{12T}/f_1) < -1.0$$

In addition, the following inequality may also be met, wherein reference numerals $f_{12W}$ and $f_{12T}$ are combination focal lengths of the first and second lens bands at the short and long focal point ends, respectively. Also, the reference numerals $f_T$ and $f_W$ are focal lengths of the whole lens units at the long and short focal point ends, respectively:

$$0.4 < (f_{12T}/f_{12W})/(f_T/f_W) < 0.7$$

The zoom lenses of from the first to third examples may be configured such that each of the lens bands is formed by less than three lenses, more than one non-spherical surface may be included in each of the second and third lens bands, and more than one non-spherical surface may be included in one of the fourth and fifth bands. The zoom lenses of the fourth and fifth examples may be configured such that less than three lenses constitute the first to third and fifth bands. In addition, four lenses may constitute the fourth lens band, more than one non-spherical surface may be included in each of the second and third lens bands, and more than one non-spherical surface may be included in one of the fourth and fifth bands. Further, each of the examples may be configured such that one lens constitutes the fifth lens band, and the aperture diaphragm "S" may be arranged in the object side of the third lens band III.

One example of a camera apparatus is now described with reference to FIG. 22. This camera may be a mobile information terminal. As noted from FIG. 22C, the mobile information terminal 10 may include a photographing lens 11 and is configured to read an image of a photographing object with a photo-acceptance unit (i.e., an area sensor) 15. For the photographing lens 11, the above-described any one set of exemplary zoom lenses may be utilized.

An output of the photo-acceptance unit 15 may be input to a signal processing apparatus 17, and then converted into digital information by the signal processing apparatus 17 controlled by a central processor 21. Specifically, the camera apparatus of FIG. 22 may function to convert a photographing image into digital information.

More than three million pixels may be used for its photo-acceptance unit 15 so as to receive an image via the photographing lens (i.e., zoom lens) 11.

The image information may receive prescribed image processing in the image processing apparatus 19 under control of the central processor 21 after being converted into the digital information by the signal processing apparatus 17. Such image information may be capable of selectively being displayed on a liquid crystal monitor 23 or stored in a semiconductor memory 27. Otherwise, it can be transferred outside via a communication card or the like 25.

Figure 22B:
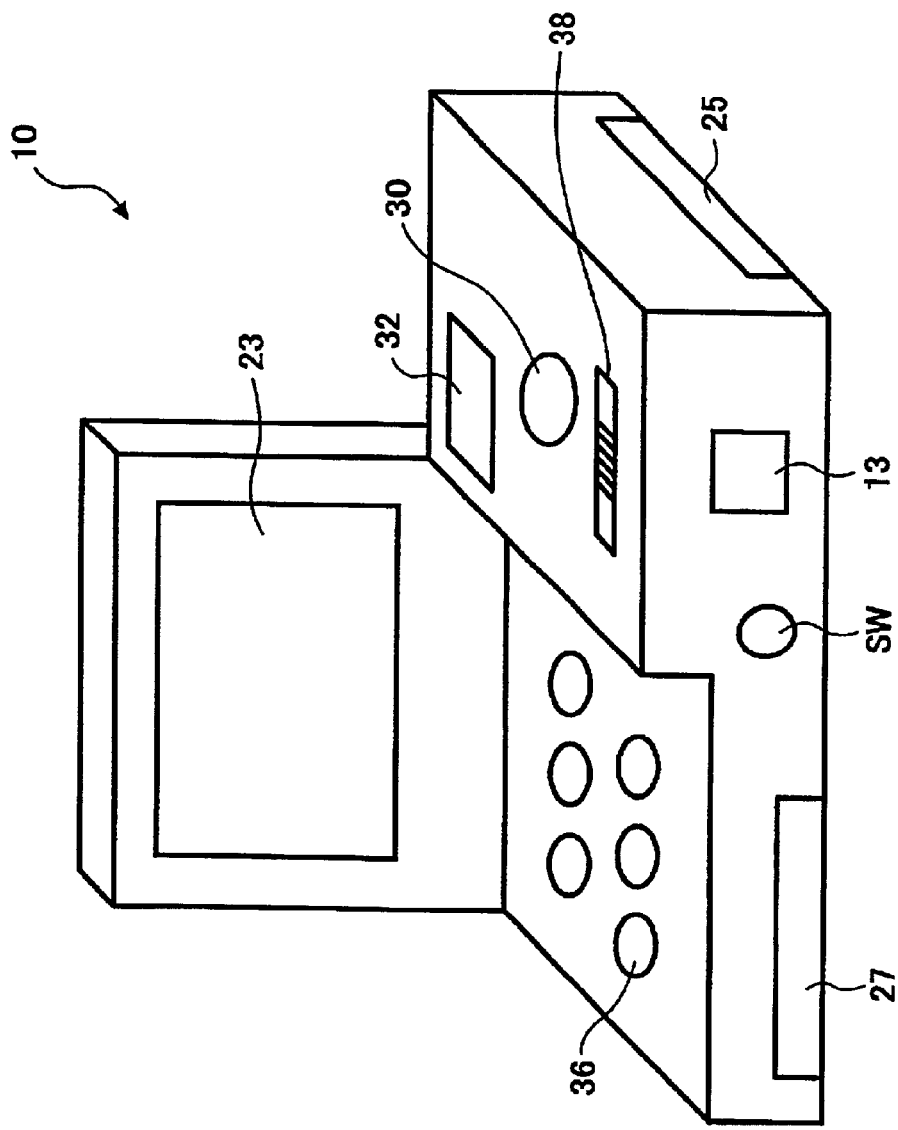
Figure 22C:
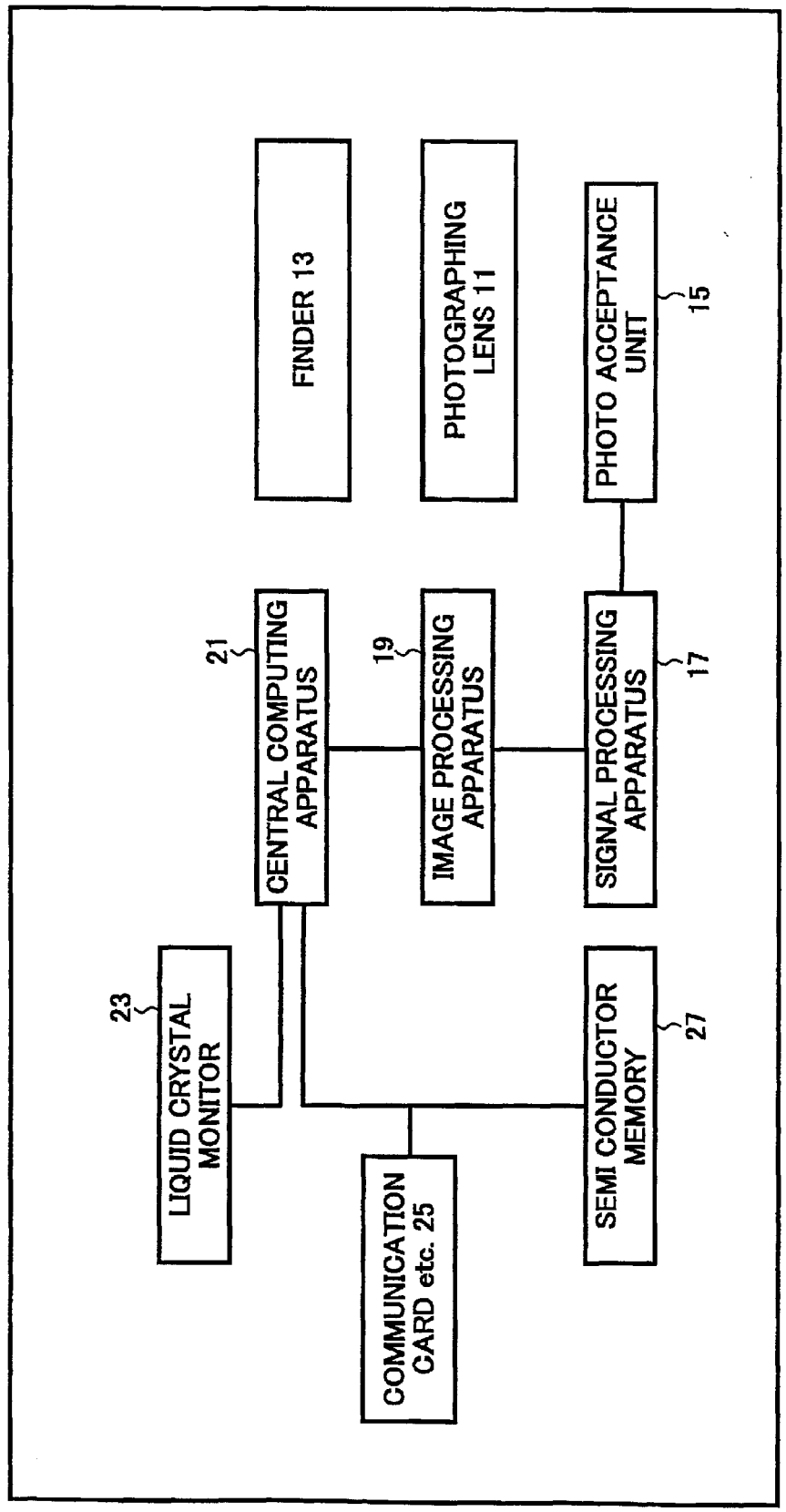

FIG. 22A is a front side view illustrating a mobile information terminal in use. FIG. 22B is a rear side view of the mobile information terminal.

The camera apparatus 10 as the mobile information terminal may have a flat rectangular box shape, and is handled selectively standing with its liquid crystal monitor 23 being open. Simultaneously, a display of the liquid crystal monitor 23 may face a user (i.e., a photographer side). In addition, the object lens 11 of the photographic lens (i.e., the zoom lens 11) may face a photographic object.

When a photograph is taken, a switch SW is turned ON, and a photograph mode may then be selected using an operation button 36. A selected mode may be displayed on a liquid crystal panel 32. Then, while peeping in through an ocular lens of a finder 13 illustrated in FIG. 22B, a photographer may select a zoom ratio through an operation of a zoom lever 38. Focussing may automatically be performed by movement of the fifth lens band.

When a shutter button 30 is depressed, photographing may be performed. The above-described information digitization may subsequently be performed. To display and review the photographed image on the liquid crystal monitor 23, such a request may be selected through the operation button 36.

Since the photographed image is digitized, desired recordation of information may be performed through an operation of the operation button 36 in the semiconductor memory (i.e., memory card) 27 with it being inserted into a dedicated throttle of the camera body.

Otherwise, when the photographed image is to be transmitted, transmission may be performed through an operation of the operation button 36 with the communication card 25 being inserted into a dedicated throttle of the camera body. In addition, image information transferred from outside via the communication card 25 can optionally be displayed on the liquid crystal monitor 23.

A plurality of modifications is now described with reference to FIGS. 23 to 49, in which a macro mode is applied in a camera. A zoom lens of this invention may include the first lens band I having a positive focal length, the second lens band II having a negative focal length, and the third III, fourth IV, and fifth V lens bands having positive focal lengths arranged from an object side toward an image surface as illustrated in FIG. 23. An aperture diaphragm "S" may also be arranged in the vicinity of the third lens band.

Figure 23A:
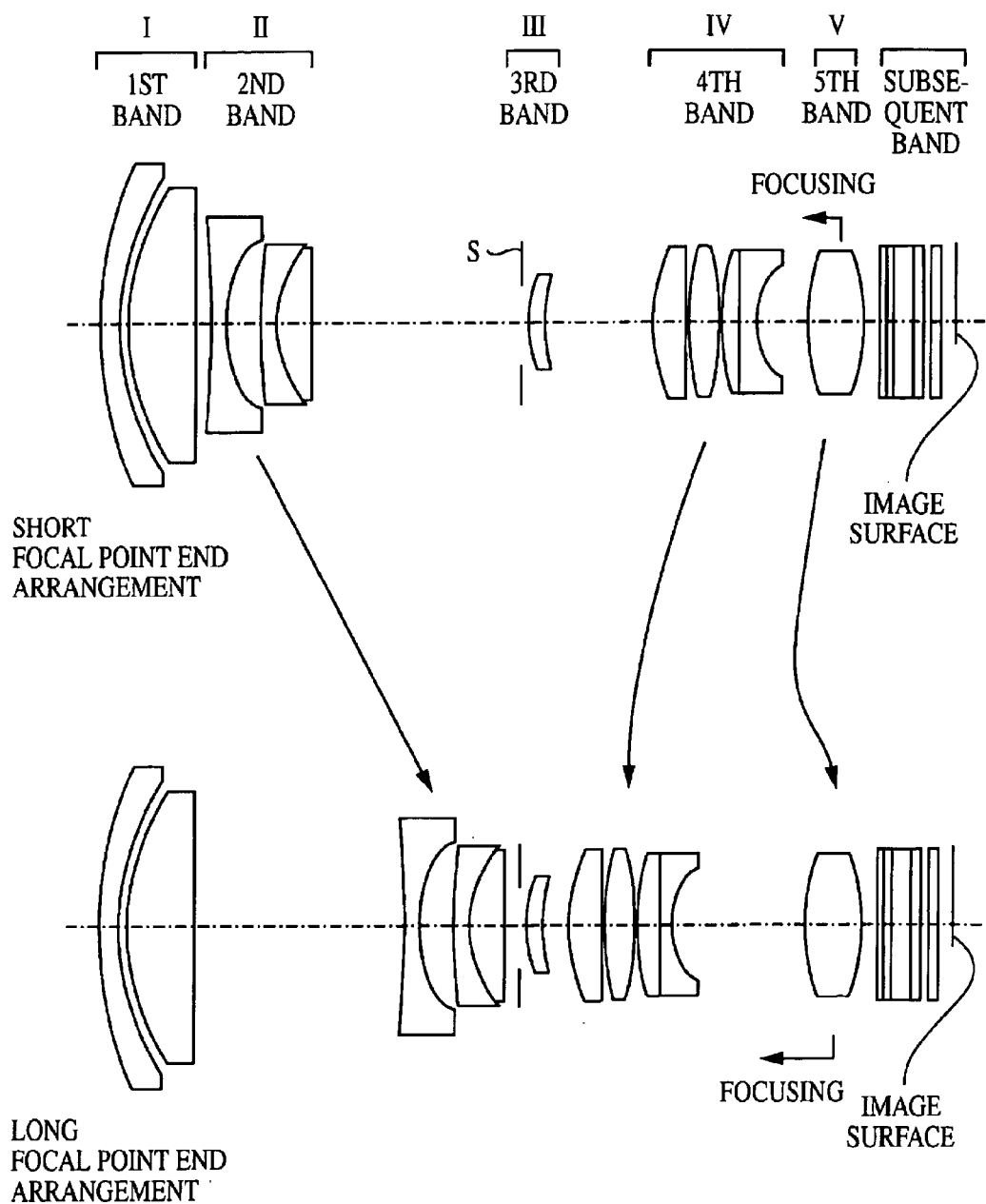
FIGS. 23A and 23B are schematic charts for illustrating lens arrangement during magnification and in a macro mode of sixth example.
Figure 23B:
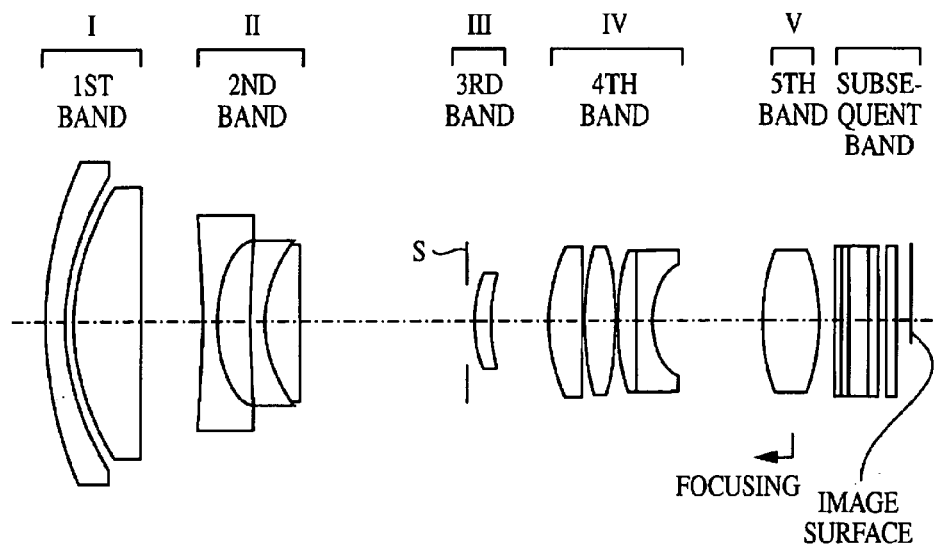

FIG. 23A may illustrate a lens band arrangement of a short focal point end (i.e., a wide-angle end). FIG. 23A may also illustrate a lens band arrangement of a telescopic end. FIG. 23B may illustrate a lens band arrangement of a macro mode.

The second lens band II may smoothly move toward the third lens band III when magnification from the short to long focal point end (FIGS. 23A) is performed. Simultaneously, the fourth lens band IV may move from the fifth lens band V side toward the long focal point end in the vicinity of the third lens band III.

Specifically, the fourth lens band IV may bear part of a magnifying function together with the second lens band II.

In addition, there may exist a macro mode that enables focussing at a shorter distance outside a typical photographing region for zooming. In addition, the fifth lens band IV may perform focussing by its movement both in the typical photographing region and macro mode.

Such a typical photographing region may represent the entire photographing region in that the focussing is possible at an optional zoom position between the short and long focal point ends including these ends. Simply in other words, it may be a photographing region in that zoom photographing is available.

The macro mode may be a mode that is set outside the typical photographing region and enables lenses to focus at a distance shorter than that of the zoom photographing. A lens band arrangement in the macro mode may be different from that of the lens band for zooming between the short to long focal point ends as illustrated in FIG. 23B. Specifically, lens band movement for zooming can not realize the lens band arrangement for the macro mode.

As a zoom lens whose first to fifth lens bands having power allocation such as positive, negative, positive, positive, and positive, it is known heretofore that the first, third, and fifth lens bands are fixed in case of performing magnification, and the second lens band (variant) is moved so as to perform the magnification. In addition, the fourth lens band (compensating member) is moved so as to compensate a positional variance of an image surface which accompanies the magnification. Thus, since the second lens band substantially bears all of the magnifying function, a moving amount of the second lens band for the magnification is large. In addition, since the first lens band largely steps away from an aperture diaphragm, a light ray valid diameter (i.e., a lens external diameter) of the first lens band becomes large when realizing a wide angle.

Then, as mentioned earlier, an exemplary zoom lens may be configured such that the fourth lens band also shares the magnifying function when the magnification is performed.

In addition, the aperture diaphragm may be approximated by the first lens band by minimizing the moving amount of the second lens band. As a result, the light ray valid diameter of the first lens band may be minimized. Thus, the focussing in the typical photographing region may be performed by the movement of the fifth lens band. However, to downsize the lens unit, in particular to shorten the entire length, an interval between the fourth and fifth lens bands should or may be better to be short.

However, there may exist a limit on a moving amount of the fifth lens band when downsized. Specifically, it may be difficult to extremely shorten the shortest photographing distance (e.g. focussing at 1 to 2 cm from a leading end of a lens).

In this respect, focussing at a distance shorter than the typical photographing region may be enabled in the macro mode by arranging the second and fourth lens bands in a positional relation different from that arranged when zooming is performed. Thus, focussing up to a distance (the shortest photographing distance in a macro mode) shorter than the shortest photographing distance for the typical photographing region is required in the macro mode.

Then, the fifth lens band may be selected as a movement objective as similar to a case when focussing in the typical photographing region. As a result, only one lens band may be enough to be driven by a focus signal passed from a distance measurement device or the like (not shown), thereby capable of simplifying a focussing mechanism.

Further, a rear lens band illustrated in FIG. 23 may be a variety of filters.

The fourth lens band in a macro mode may preferably be positioned at the fourth lens band at the long focal point end.

Because, when performing focussing by moving the fifth lens band, since a height of an outside-axis-light ray that passes through the fourth lens band increases along with focussing at a shorter distance, a circumferential light flux is readily cut off and resulting in insufficient circumferential light quantity. In contrast, when reserving a sufficient circumferential light ray quantity, the fourth lens band may necessarily become increase in size.

Such a fourth lens band may come closest to the aperture diaphragm in the vicinity of the long focal point end in the zoom photographing, and amount of the cut off by the fourth lens band may be least at that time.

Thus, if also positioning the fourth lens band in the vicinity of the aperture diaphragm as closely as possible in the macro mode, the cut off can be suppressed as much as possible even performing focussing to a short distance by moving the fifth lens band. As a result, the shortage of the circumferential light ray quantity and the increase in size of the fourth lens band can be avoided.

In addition, the second lens band in a macro mode may preferably be positioned nearer to an image surface than the second lens band at the short focal point end.

With such a zoom lens, a large negative distortion aberration can easily arise at the short focal point end. In addition, if performing focussing by moving the fifth lens band, the distortion aberration becomes large along as focussing at a shorter distance.

A cause of easier generation of the large negative distortion aberration at the short focal point end may be that the second lens band having a negative power comes closest to the first lens band, and a negative strong power may arise in the distance from the object side of the aperture diaphragm.

Also, if the second lens band approximates the first lens band, negative large distortion aberration easily arises in the macro mode. Then, the negative distortion aberration may be suppressed to be small in the macro mode like in another exemplary zoom lens by alienating the second lens band from the first lens bands.

Accordingly, both of the second and fourth lens bands in a macro mode may preferably be arranged such that the fourth lens band is positioned close to the fourth lens band at the long focal point end, and the second lens band is positioned closer to the image surface than the second lens band at the short focal point end.

If these second and fourth lens bands are arranged in a macro mode in the above-described manner, a focal length in the macro mode may become longer than that at a short focal point end, and shorter than that at the long focal point end during zooming.

By setting a focussing range of the macro mode from the shortest of typical photographing region to a short distance under the above-described conditions, a discontinued portion does not appear in available photographing magnifications.

Further, it is preferable that the first lens band of the zoom lens is immobile with regard to an image surface in one embodiment. It is not new itself to fix the first lens band at the times of zooming and focussing. However, the first lens band may be fixed because the first lens band is unnecessary to be moved even when a typical photographing region is switched to a macro mode in the zoom lens according to the present invention. In addition, if the first lens band having heaviest weight is always fixed with regard to the image surface, a number of actuators used for moving a lens band and amount of torque does not need to be increased. As a result, such a construction may be advantageous in view of cost and power consumption saving.

In addition, the third lens band and the aperture diaphragm may be preferably immobile with regard to the image surface in one example of a zoom lens. Because, a shutter sometimes is arranged at the position of the aperture diaphragm, and movement of the shutter causes undesirable result such as complexity of its mechanism. In addition, the shutter causes vibration when it is driven, and if a configuration enabling the shutter to move is employed, the vibration may easily travel to another parts of the lens unit, thereby being possible cause of image vibration. Then, problems such as mechanical complexity and image vibration can efficiently be avoided if both of the third lens band and aperture diaphragm are fixed like the zoom lens as stated earlier.

Accordingly, it is preferable that the first and third lens bands as well as the aperture diaphragm may be immobile with regard to the image surface.

In addition, it may be preferable that the following inequality may be valid in an exemplary zoom lens, wherein distances between the first and second lens bands at short and long focal point ends and in a macro mode are $L_{1W}$, $L_{1T}$, and $L_{1C}$, respectively:

$$0.15<(L_{1C}-L_{1W})/(L_{1T}-L_{1W})<0.40$$

The lower limit of the above-described inequality may be a condition for suppressing a large negative distortion aberration in a macro mode to be small. Thus, if the lower limit is exceeded, a negative distortion aberration that accompanies focussing may be large. In contrast, if the higher limit is exceeded, focussing toward a sufficiently short distance may be difficult.

In the above-described zoom lens, it may be preferable that the following inequality may be valid, wherein distances between the third and fourth lens bands at short and long focal point ends and in a macro mode are $L_{3W}$, $L_{3T}$, and $L_{3C}$, respectively:

$$0.25<(L_{3C}-L_{3W})/(L_{3W}-L_{3T})<0.50$$

The upper limit of the above-described inequality may relief cutting off of the circumferential light flux in the macro mode of the zoom lens. If the upper limit is exceeded, sufficient avoidance of the cutting off may be difficult to be achieved, and a moving amount of the fifth lens band for focussing may be limited. In contrast, if the lower limit of the above-described inequality is exceeded, focussing to a sufficiently short distance may be difficult.

Accordingly, it may be preferable that distances $L_{1W}$, $L_{1T}$, and $L_{1C}$ between the first and second lens bands, as well as $L_{3W}$, $L_{3T}$, and $L_{3C}$ between the third and fourth lens bands may satisfy the above-described two inequalities.

Further, one example of zoom lens may preferably substantially meet the following inequality, wherein the reference numeral $D_{1W}$ represents a distance between the first and second lens bands at a short focal point end, the reference numeral $D_{1T}$ represents a distance between the first and second lens bands at a long focal point end, the reference numeral $D_{3W}$ represents a distance between the third and fourth lens bands at a short focal point end, and the reference numeral $D_{3T}$ represents a distance between the third and fourth lens bands at a long focal point end:

$$(D_{3W}-D_{3T})/(D_{1T}-D_{1W})>0.3$$

The above-described formula may represent necessity of increasing in a moving amount of the fourth lens band more than a prescribed level when magnification is performed. Specifically, if the parameter $(D_{3W}-D_{3T})/(D_{1T}-D_{1W})$ becomes smaller than the lower limit 0.3, there may exist a probability that the fourth lens band does not sufficiently share the magnifying function. For example, if supposing a case in which the third lens band is fixed, the element $(D_{3W}-D_{3T})$ may indicate a moving amount of the fourth lens band when magnification from the short to long focal point ends is performed.

Similarly, the denominator $(D_{1T}-D_{1W})$ may indicate a moving amount of the second lens band when magnification is performed.

Thus, minimization of the parameter $(D_{3W}-D_{3T})/(D_{1T}-D_{1W})$ becomes small may denote minimization of the element, or enlargement of the denominator. The minimization of the element may denote decrease in a moving amount of the fourth lens band. In contrast, enlargement of the denominator may denote enlargement of a moving amount of the second lens band. Accordingly, a magnifying function to be shared by the fourth lens band may be minimized in any cases.

Further, along as the parameter $(D_{3W}-D_{3T})/(D_{1T}-D_{1W})$ becomes larger, the rate of sharing magnifying function of the fourth lens band may become larger. However, if the magnifying function share rate of the fourth lens band becomes excessively large, the magnifying function share rate of the second lens band may become smaller, thereby resulting in difficulty in obtaining fair magnification. Accordingly, a limit of the parameter $(D_{3W}-D_{3T})/(D_{1T}-D_{1W})$ may be around 1.0.

In exemplary zoom lenses, the following inequality may be preferably met by the focal length $f_1$ of the first lens band, and the composite focal length $f_{12T}$ of the first and second lens bands in order to further downsize and obtain a higher performance:

$$-1.4<(f_{12T}/f_1)<-1.0$$

Such parameter $(f_{12T}/f_1)$ may denote a magnification rate of the second lens band at the long focal point end. To downsize a lens unit, power of the first lens band is strengthened (i.e., to shorten a focal length). In order to design in such manner, it may be preferable that a magnification rate of the second lens band at the long focal point end may be set at less than −1.

However, if the magnification rate of the second lens band at the long focal point end is less than −1.4, since contribution of the fourth lens band to the magnification is weakened and the power of the second lens band should be strengthened, disadvantage may arise in aberration compensation.

In the zoom lens, when magnification from the short to long focal point ends is performed, the fourth lens band smoothly moves from the fifth lens band side toward the long focal point end in the vicinity of the third lens band. In addition, a positional variance of an image surface which accompanies the magnification performed by the smooth movement of the second and fourth lens bands may be compensated by a movement of the fifth lens band.

In addition, as illustrated in FIG. 23A, the fourth lens band may come closest to the third lens band during its movement from the fifth lens band side toward the long focal point end in the vicinity of the third lens band for magnification at a focal point slightly before the long focal point end. If operated in such a manner, it is possible to enable the fourth lens band to have a function of compensating a positional variance of an image surface accompanying magnification beside a magnifying function.

However, movement during the zooming of the fourth lens band can not be smooth. Thus, a positional variance of the image surface accompanying the magnification is compensated by moving the fifth lens band like the zoom lens, flexibility for improving a performance may increase and a high performance may readily be obtained. In addition, since both of the second and fourth lens bands execute smooth movement, a mechanism for moving lens bands can be simplified, and its torque can be lower.

Further, one example of the zoom lens may be configured such that less than three lenses constitute the first to third and the fifth lens bands. Four lens may constitute the fourth lens band.

At least one non-spherical surface may be employed in the second, third, and fifth lens bands, and two or more non-spherical surfaces may be employed in the fourth lens band. When utilizing one example of a zoom lens in order to image on a photo-acceptance unit having more than three million pixels, it is required for each aberration to be extraordinarily suppressed. However, it also is not preferable from a cost point of view to make the lens construction complex in order to sufficiently compensate each aberration.

Like the earlier described zoom lens, by employing an appropriate number of non spherical surfaces in the second to fifth lens band, a high imaging performance capable of sufficiently accommodating a photo-acceptance unit having more than three million pixels can be secured.

In addition, the fifth lens band of an exemplary zoom lens may include one lens. This may bring an advantage that movement can be performed with small energy because the fifth lens band weighs light when moved in order to perform compensation of an image surface variance and focussing.

Further, in one example of the zoom lens, one positive lens may constitute the third lens band, and the aperture diaphragm may be arranged in the object side of the third lens band. Thus, the third lens band may simply be configured with it being included in a shutter unit.

Further, an exemplary camera apparatus may employ the above-described any one of zoom lenses for photographic use. The camera apparatus may by any one of a conventional silver photographic camera, a digital camera, and a digital video camera having a function of digitizing a photographed image.

The above-described camera apparatus can employ a photo-acceptance unit having more than three million pixels in order to receive a light ray of an image via the zoom lens.

In addition, the camera apparatus can be utilized in a mobile information terminal.

A plurality of practical examples of a zoom lens is now described with reference to tables 6A, 6B, 6C, and 6D, wherein it is premised that a set of aberrations of each example is sufficiently compensated and thereby capable of accommodating a photo acceptance unit having more than three million pixels.

The following first to third examples may be types in which a positional variation of an image surface which accompanies magnification of second and fourth band may be compensated by movement of the fifth lens band.

In the below described practical examples, the reference numeral (f) represents a focal length of the whole lens units. The reference numeral (F) represents an F-number. The reference numeral (ω) represents a half field angle. The reference numeral (R) represents a curvature radius including a paraxial curvature radius in a case of a non-spherical surface. The reference numeral (D) represents an interval of a surface including a surface of an aperture diaphragm. The reference numeral (Nd) represents a refraction index of a d-line. The reference numeral (vd) represents an abbe's number. The reference numeral (K) represents a circular cone constant of the non-spherical surface. The reference numeral $A_4$ is the fourth degree coefficient of a non-spherical surface. The reference numeral $A_6$ is the sixth degree coefficient of a non-spherical surface. The reference numeral $A_8$ is the eighth degree coefficient of a non-spherical surface. The reference numeral $A_{10}$ is the tenth degree coefficient of a non-spherical surface.

A plurality of non-spherical surfaces whose surface numbers have asterisks (*) may be determined from the following universally known formula by substituting values of the above-described reference numerals K, $A_4$, $A_6$, $A_8$ and $A_{10}$. Such a reference numeral "X" may represent a coordinate of the non-spherical surface in the optical axis direction at each height from the original point, the reference numeral "C" represents an inverse number of a paraxial curvature radius (i.e., a paraxial curvature) and the reference numeral H represents a height from an optical axis:

$$X = CH^2/1 + (1-(1+k)C^2H^2) + A_4H^4 + A_6H^6 + A_8H^8 + A_{10}H^{10}$$

Then, a shape may be defined by giving R(=1/C), K, $A_4$, $A_6$, $A_8$ and $A_{10}$. Such a "surface number" may be of a number counted from an object nearest surface. A unit of a quantum having a length dimension may be millimeter.

The first practical example of properties of the entire lens arrangement constituting a zoom lens may be listed on the table 6A.

The above-described non-spherical surfaces whose surface numbers have asterisks are may be defined by predetermined values listed on the table 6B.

The variable intervals during the typical photographing and in a macro mode, and conditional expression values are listed on the tables 6C and 6D.

A plurality of properties of the entire lenses constituting a zoom lens of the second practical example may be listed on the table 7A.

A plurality of non-spherical surfaces whose surface numbers have asterisks may be defined by predetermined values listed on the table 7B.

A plurality of intervals A, B, C, and D during the typical photographing and in a macro mode, and conditional expression values are listed on the tables 7C and 7D.

A plurality of properties of the entire lenses of the third practical example may be listed on the table 8A.

A plurality of non-spherical surfaces whose surface numbers have asterisks may be defined by predetermined values listed on the table 8B.

A plurality of intervals A, B, C, and D during the typical photographing and in a macro mode, and conditional expression values may be listed on the tables 8C and 8D.

Figure 5:
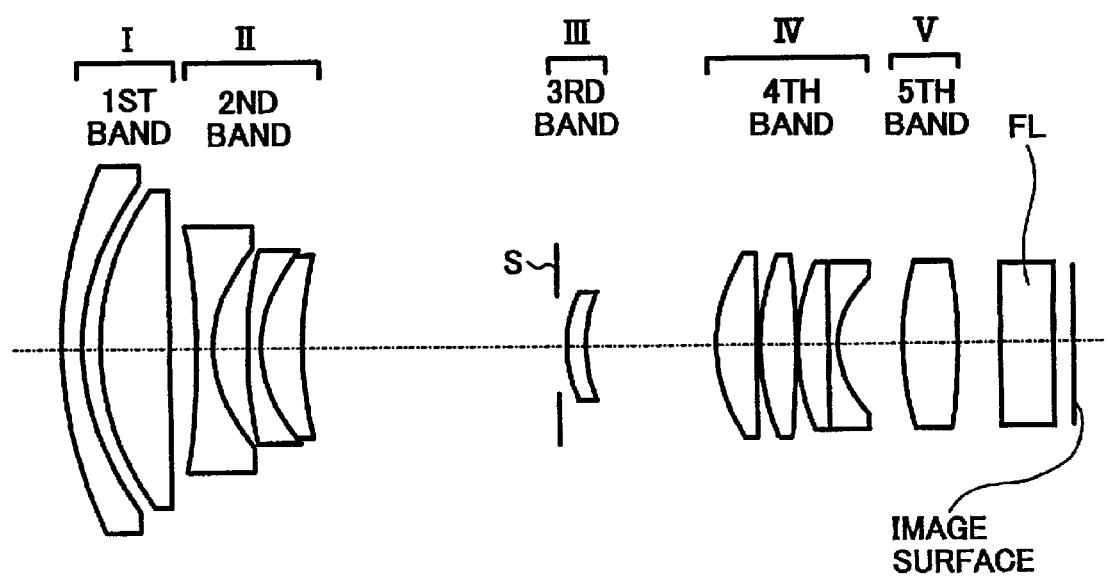
FIG. 5 is a schematic chart for illustrating the fourth exemplary zoom lens.
Figure 10:
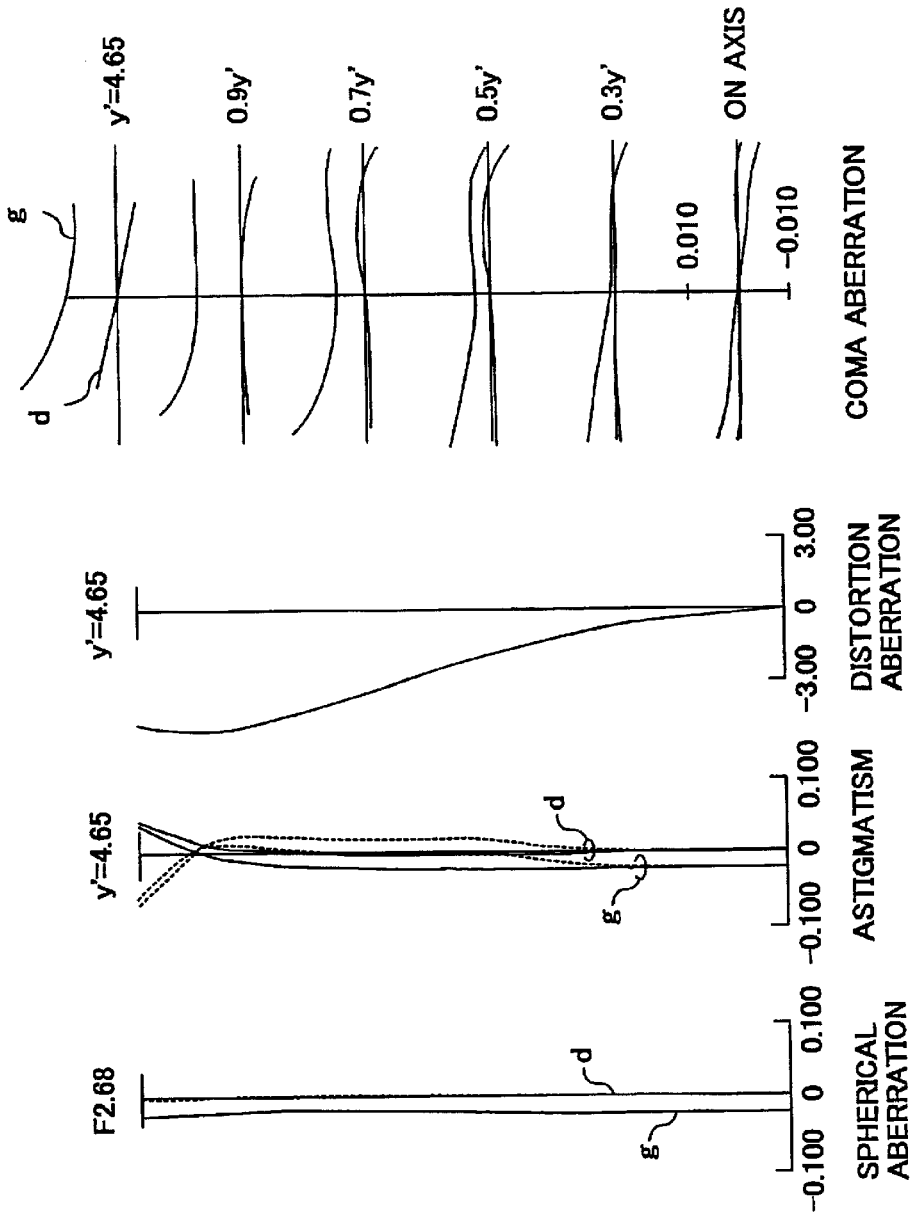
FIG. 10 is diagram for illustrating a set of aberration curvatures of the second exemplary zoom lens at a short focal point end.
Figure 11:
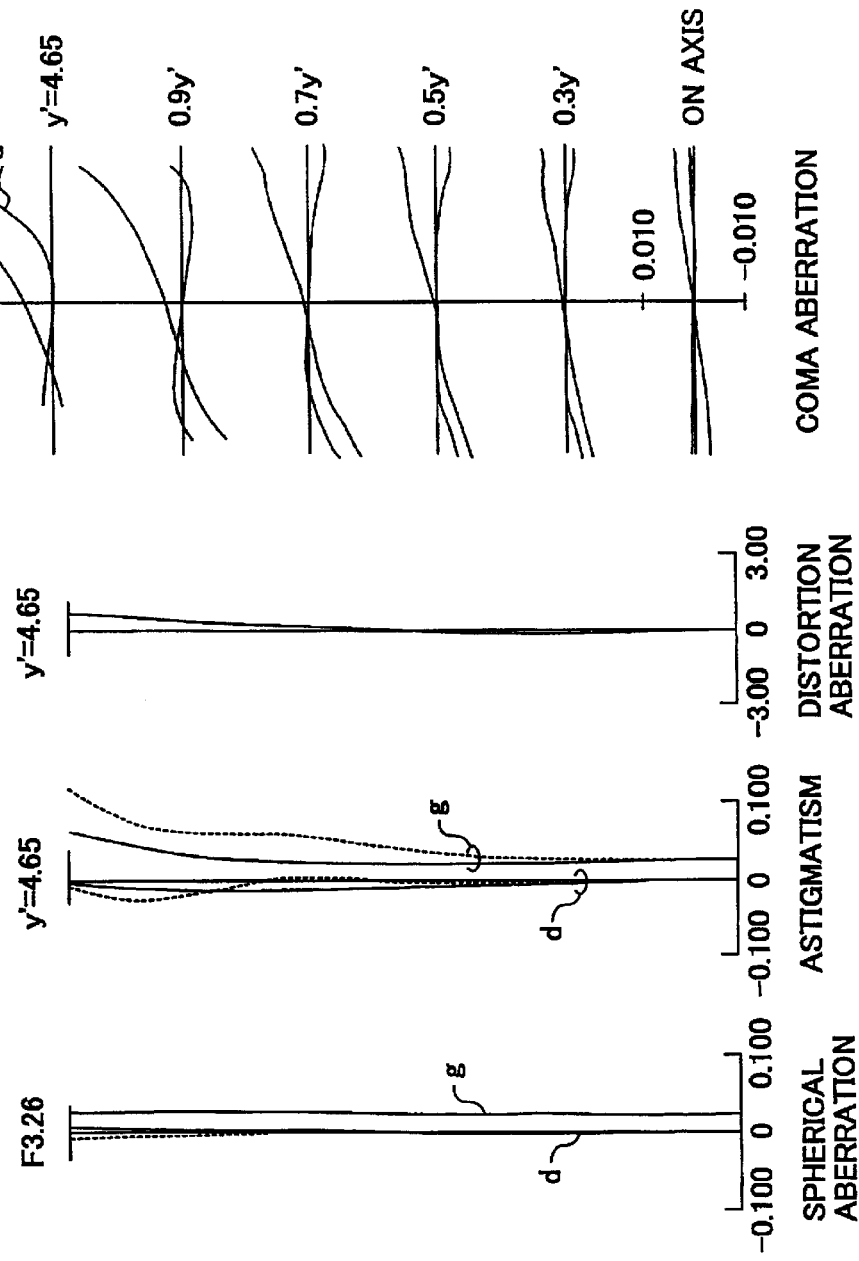
FIG. 11 is a diagram for illustrating a set of aberration curvatures of the second exemplary zoom lens at a middle focal length.

A plurality of aberration curvatures of the first example at short, middle, and long focal point ends when a photographing distance is infinite may be illustrated from FIGS. 4 to 6 one after another. FIG. 7 illustrates a set of aberration curvatures of the first example at the short focal point end when the photographing distance is 0.3 meters. FIG. 8 illustrates a set of aberration curvatures at the middle focal length when the photographing distance is 0.4 meters. FIG. 9 illustrates a set of aberration curvatures at the long focal point end when the photographing distance is 0.5 meters. In addition, FIG. 10 illustrates a set of aberration curvatures when the photographing distance is 0.3 meters in a macro mode. FIG. 11 also illustrates a set of aberration curvatures in a macro mode when the photographing distance is 0.77 meters.

Figure 12:
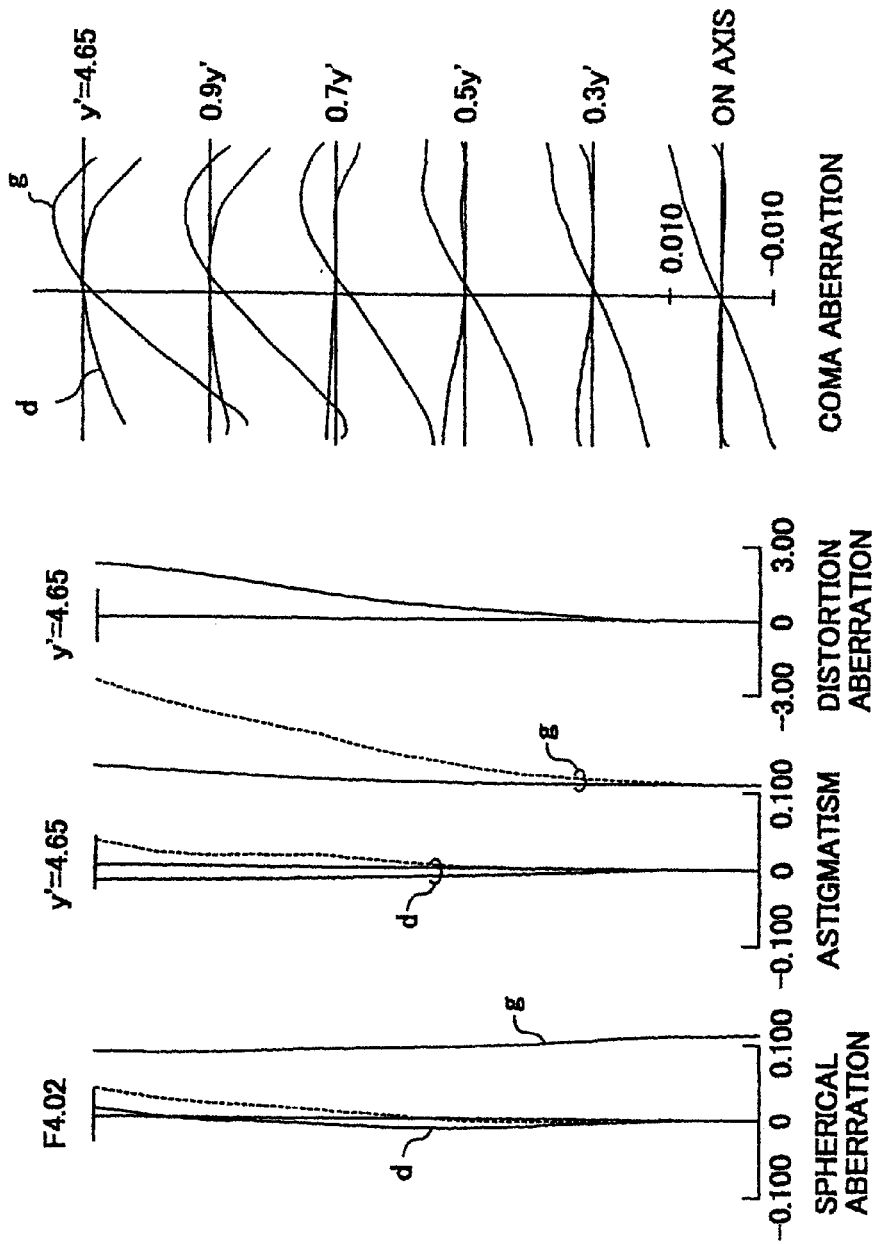
FIG. 12 is a schematic chart for illustrating a set of aberration curvatures of the second exemplary zoom lens at a long focal length.
Figure 13:
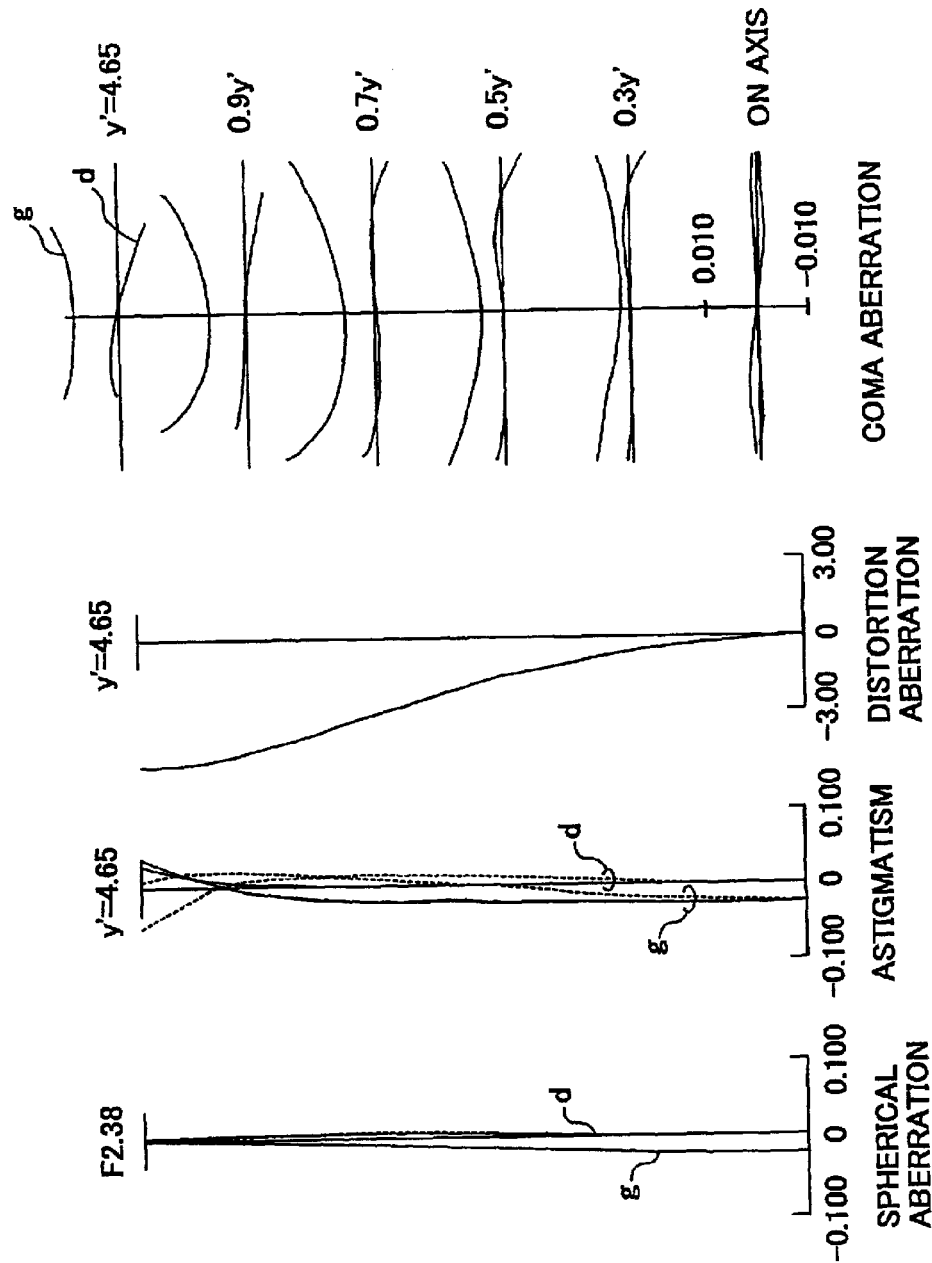
FIG. 13 is diagram for illustrating a set of aberration curvatures of the third exemplary zoom lens at a short focal point end.
Figure 14:
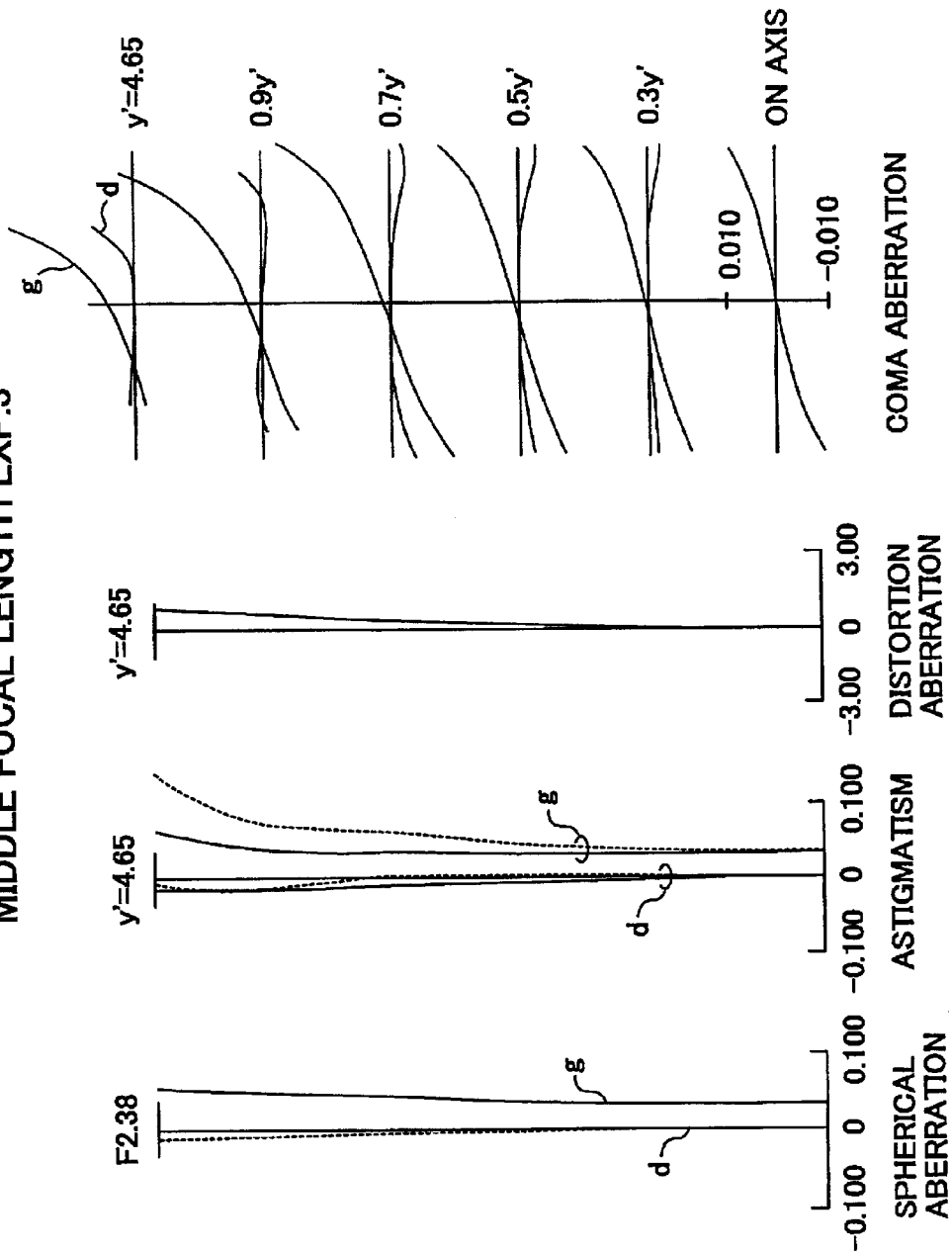
FIG. 14 is a diagram for illustrating a set of aberration curvatures of the third exemplary zoom lens at a middle focal length.

A set of aberration curvatures of the second example at short, middle, and long focal point ends when a photograph distance is infinite may be illustrated from FIGS. 12 to 14 one after another.

Figure 15:
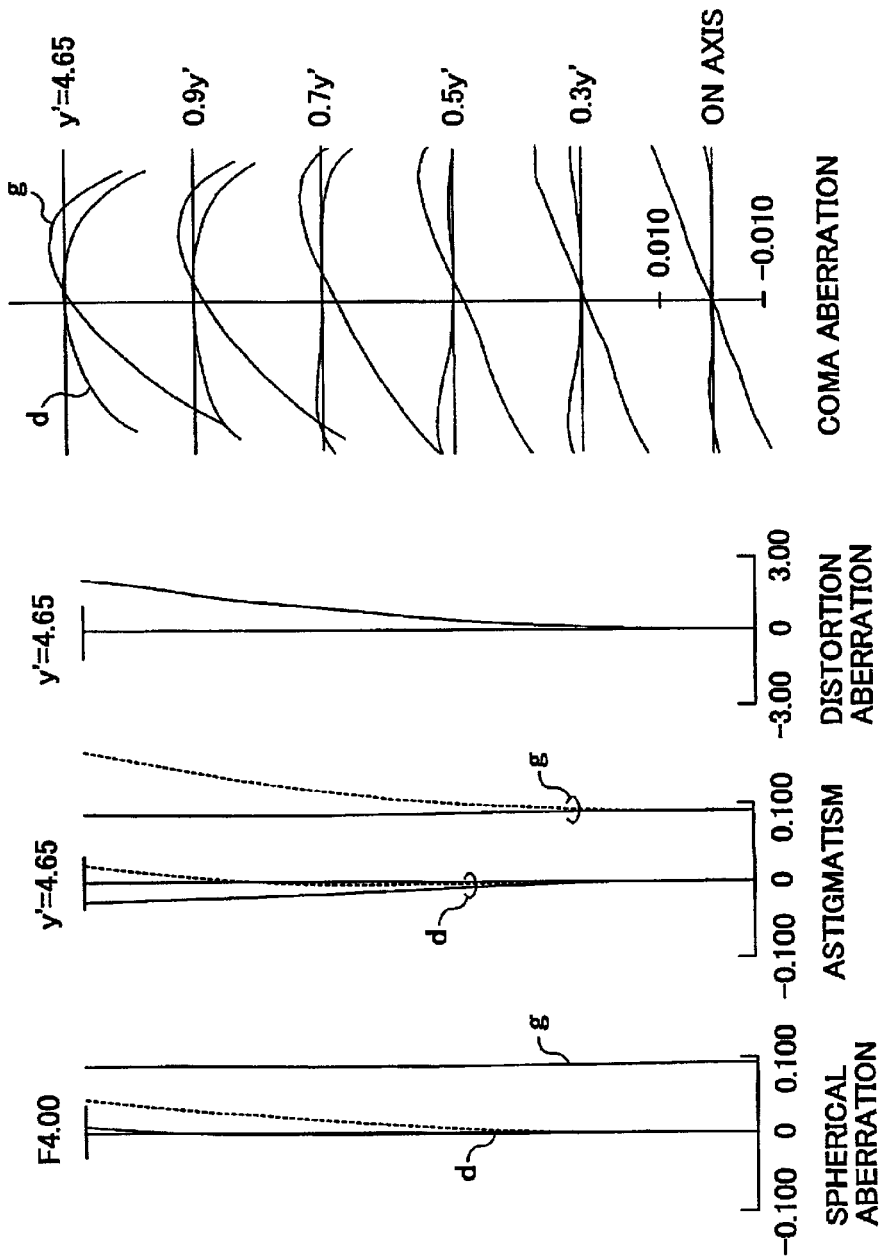
FIG. 15 is a schematic chart for illustrating a set of aberration curvatures of the third exemplary zoom lens at a long focal length.

In addition, FIG. 15 illustrates a set of aberration curvatures of the second example at the short focal point end when the photographing distance is 0.3 meters.

Figure 16:
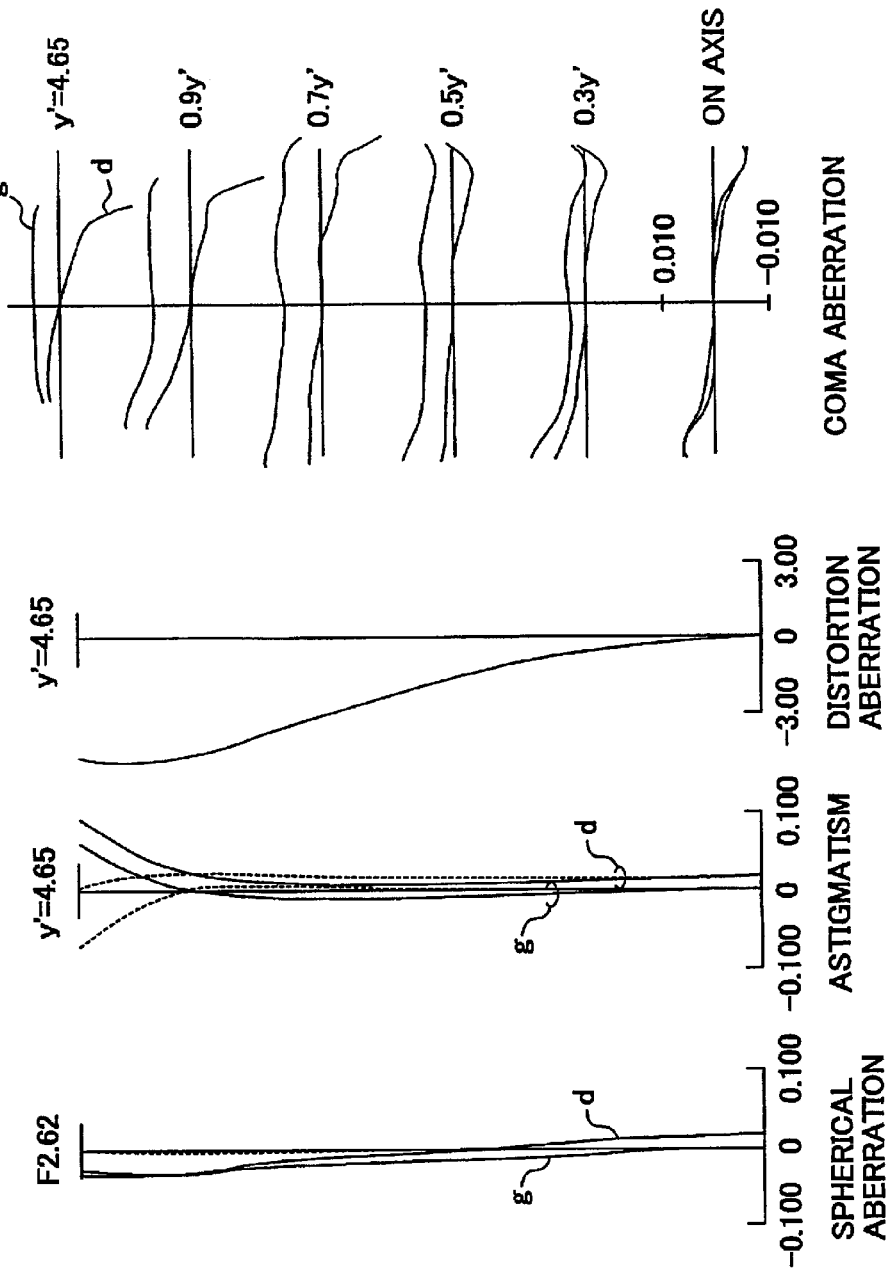
FIG. 16 is diagram for illustrating a set of aberration curvatures of the fourth exemplary zoom lens at a short focal point end.
Figure 17:
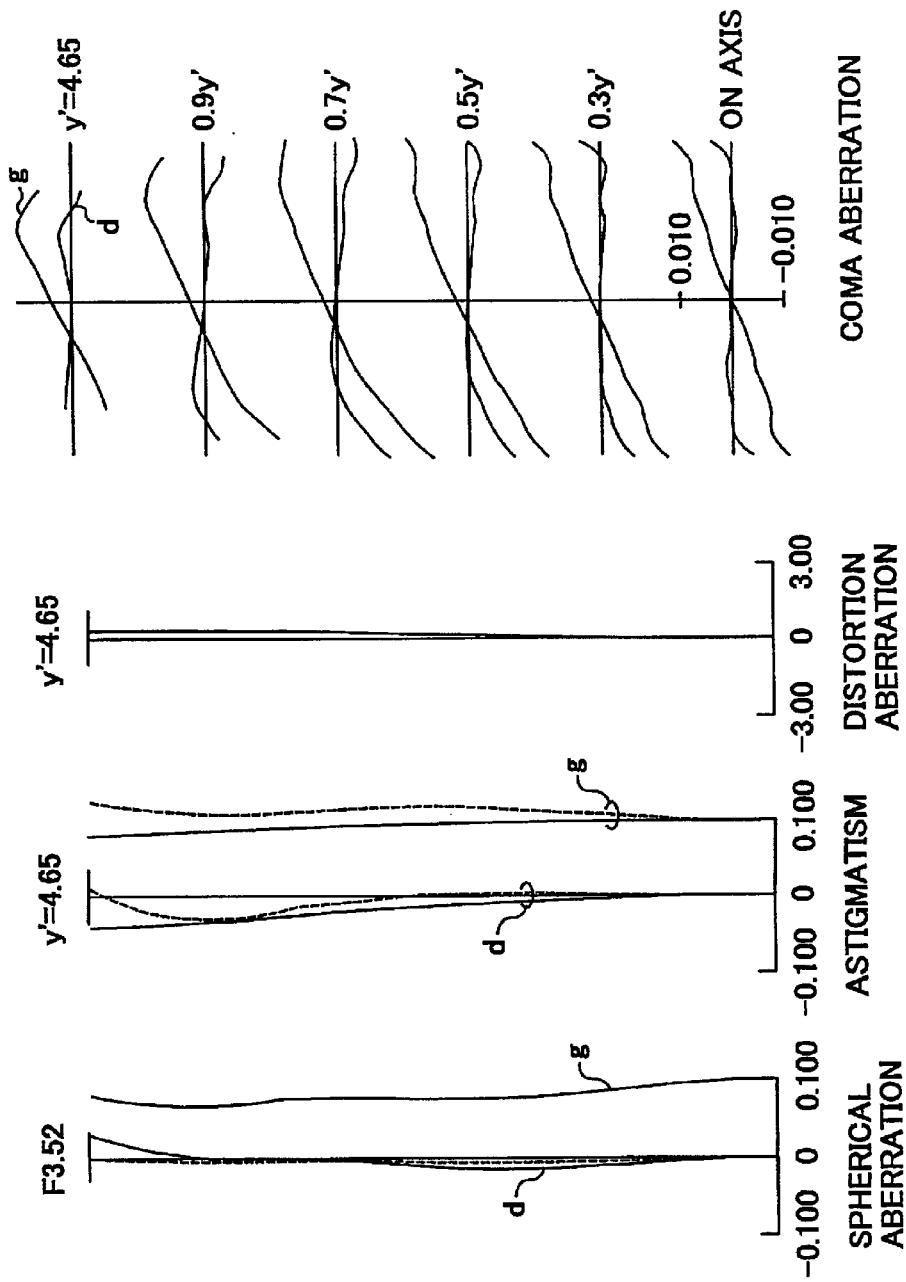
FIG. 17 is a diagram for illustrating a set of aberration curvatures of the fourth exemplary zoom lens at a middle focal length.
Figure 18:
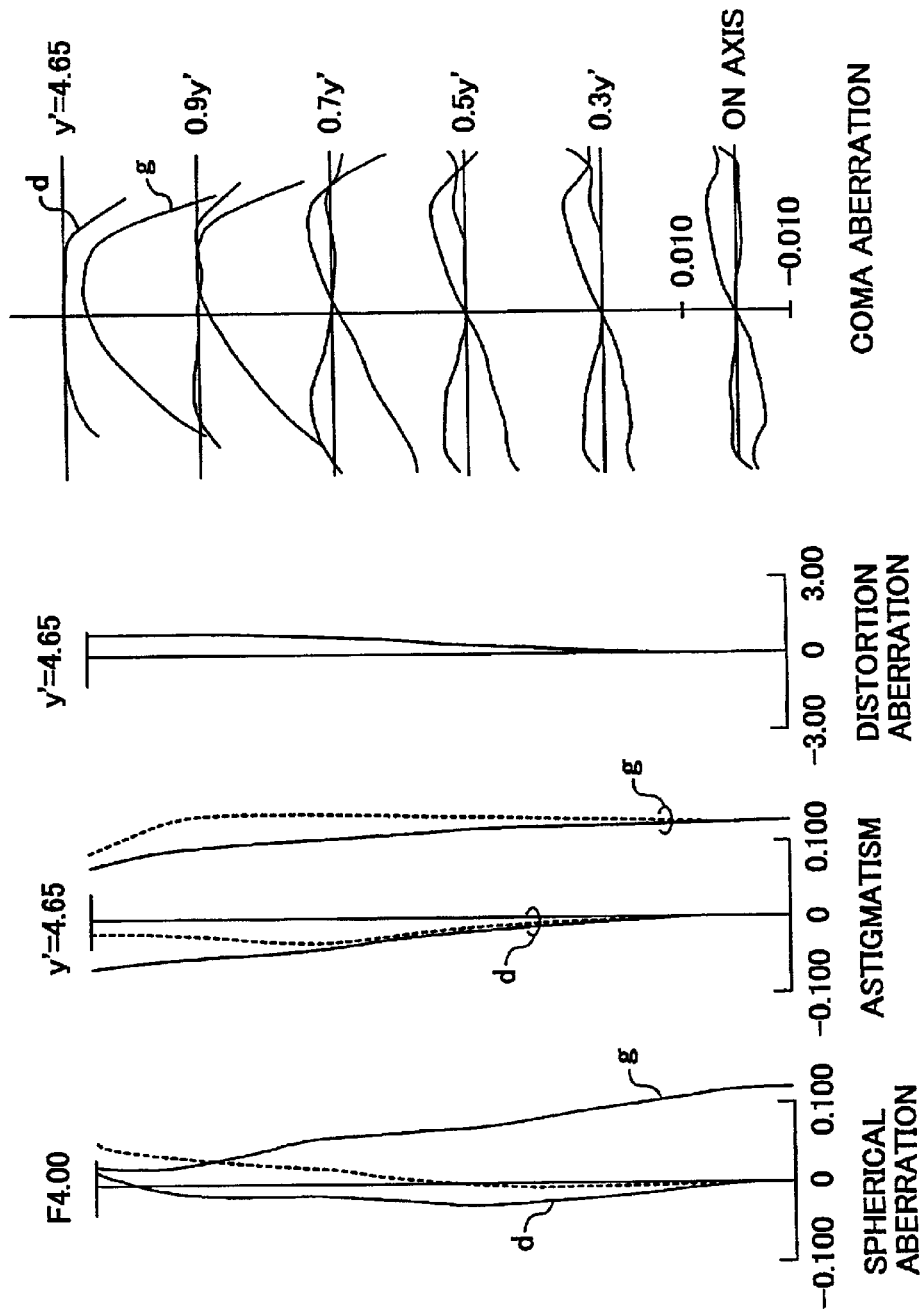
FIG. 18 is a schematic chart for illustrating a set of aberration curvatures of the fourth exemplary zoom lens at a long focal length.

FIG. 16 also illustrates a set of aberration curvatures at the middle focal length when the photographing distance is 0.4 meters. FIG. 17 illustrates a set of aberration curvatures at the long focal point end when the photographing distance is 0.5 meters. FIG. 18 also illustrates a set of aberration curvatures when the photographing distance is 0.3 meters in a macro mode.

Figure 19:
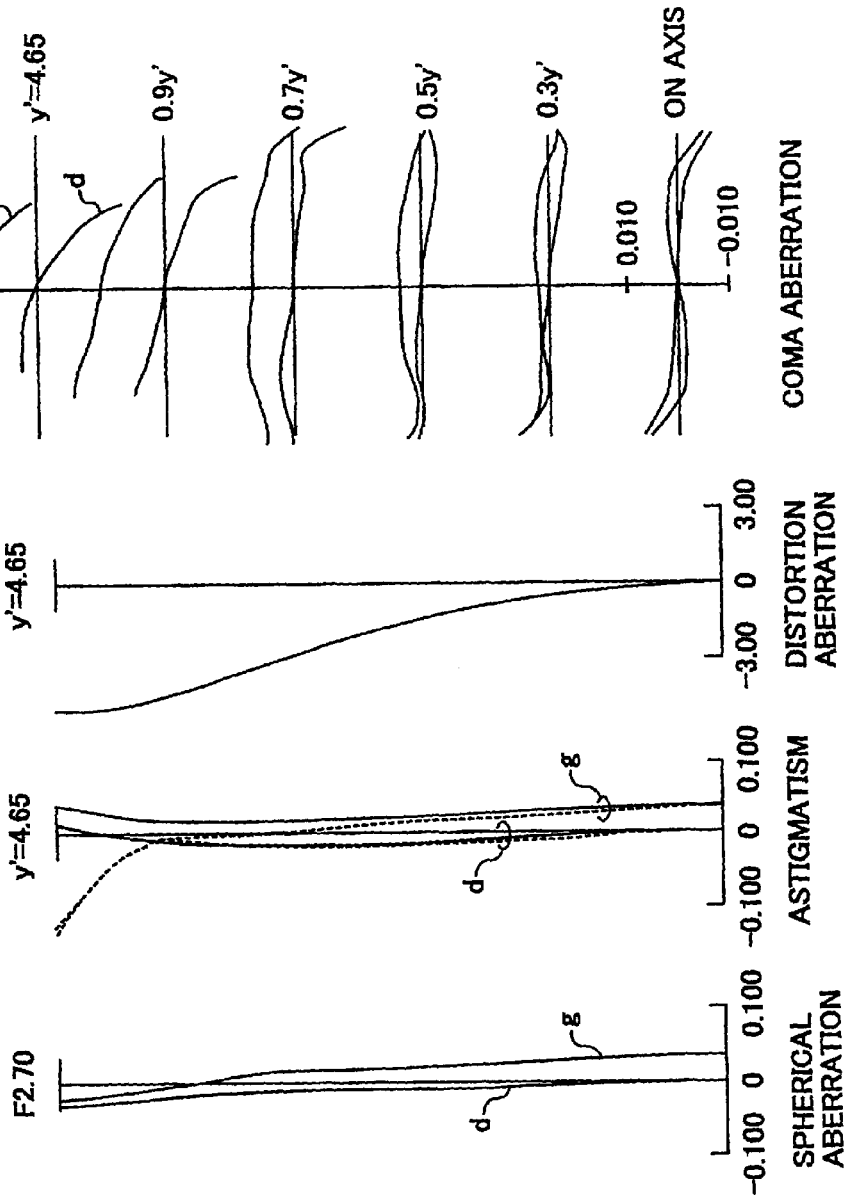
FIG. 19 is diagram for illustrating a set of aberration curvatures of the fifth exemplary zoom lens at a short focal point end.

FIG. 19 also illustrates a set of aberration curvatures when the photographing distance is 0.77 meters in a macro mode.

A plurality of aberration curvatures of the second example at short, middle, and long focal point ends when a distance is infinite may be illustrated from FIGS. 20 to 22 one after another.

Figure 24A:
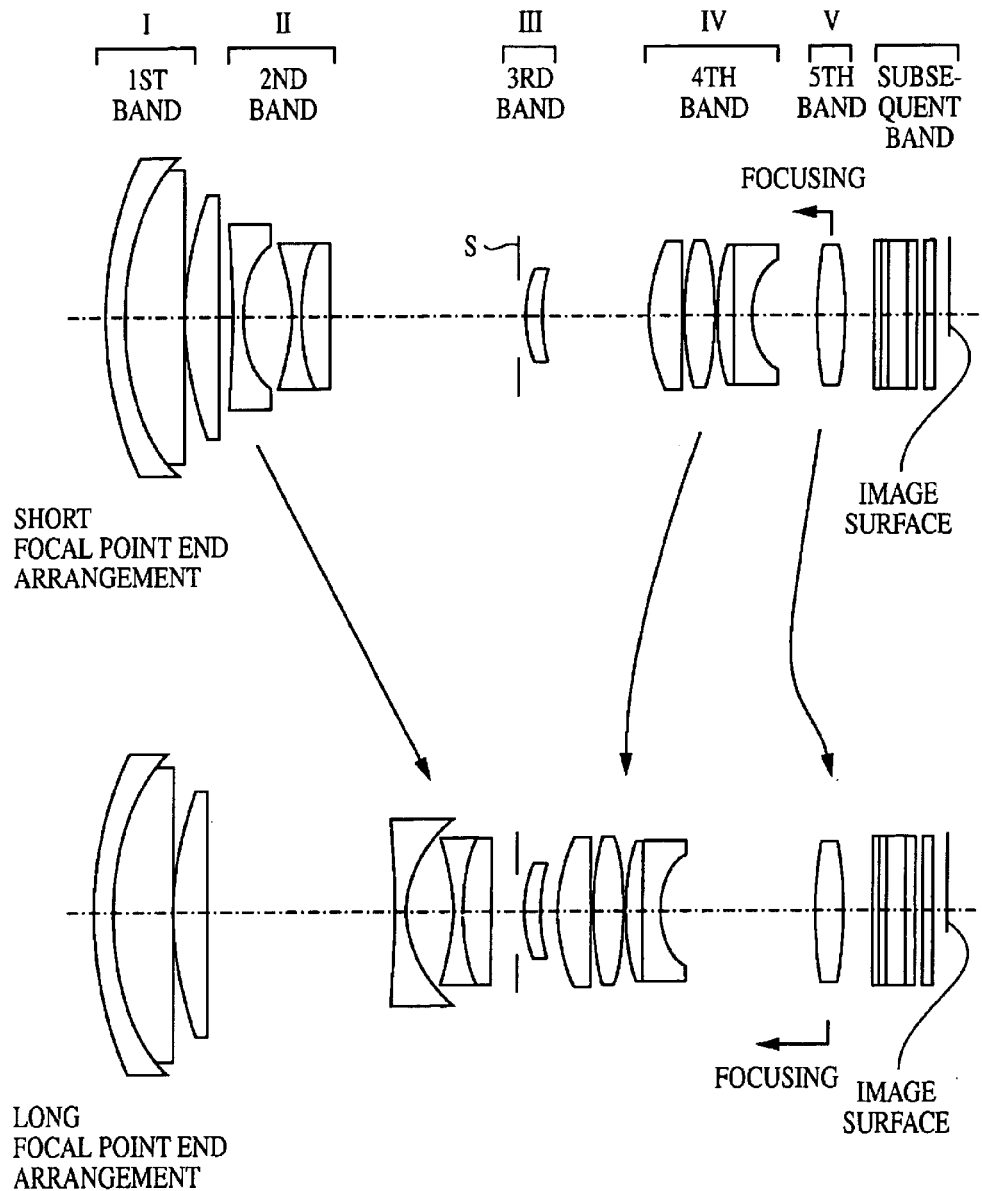
FIGS. 24A and 24B are schematic charts for illustrating lens arrangement during magnification and in a macro mode of the seventh example.
Figure 24B:
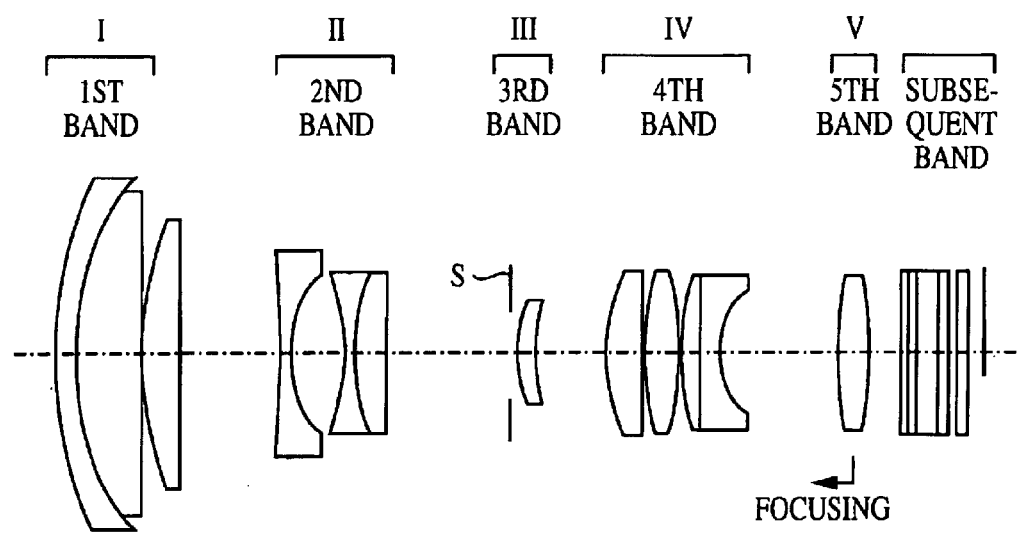

FIG. 23 illustrates a set of aberration curvatures of the third example at the short focal point end when the photographing distance is 0.3 meters. FIG. 24 also illustrates a set of aberration curvatures of the third example at a middle focal length when the photographing distance is 0.4 meters.

Figure 25B:
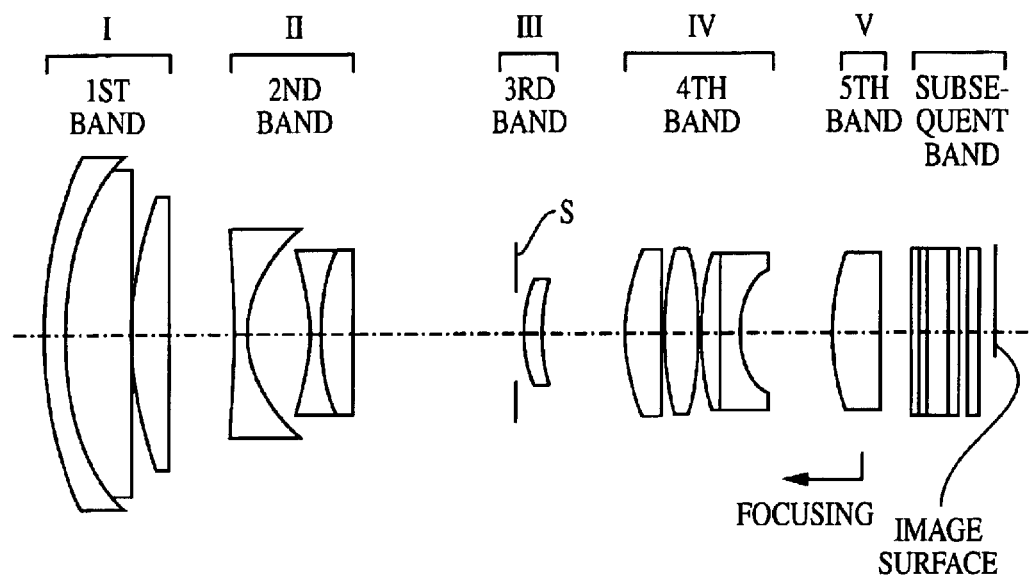
Figure 28:
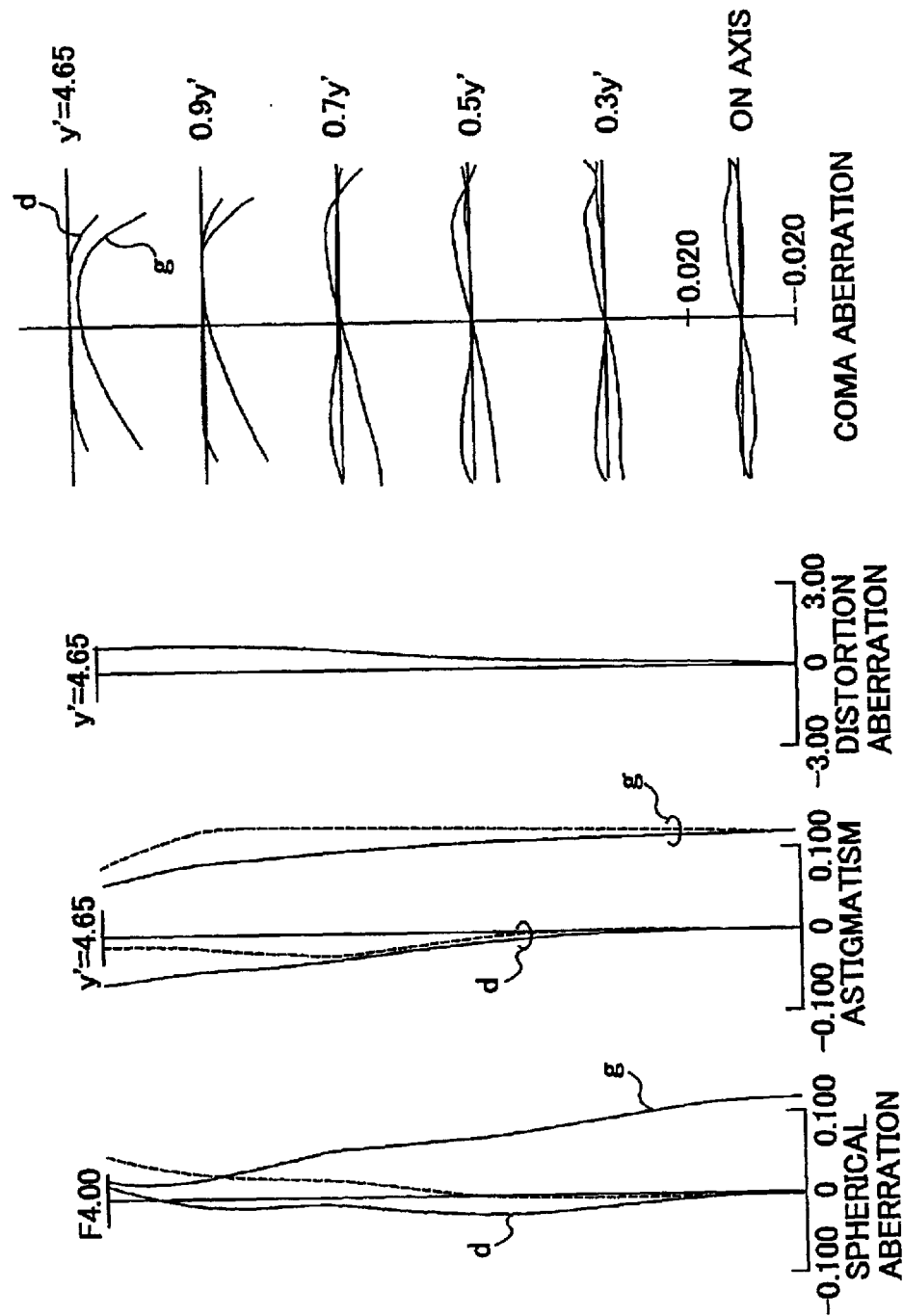
FIG. 28 is a schematic chart for illustrating a set of aberration curvatures of the sixth embodiment in a long focal point end when a photographing distance is infinity.
Figure 29:
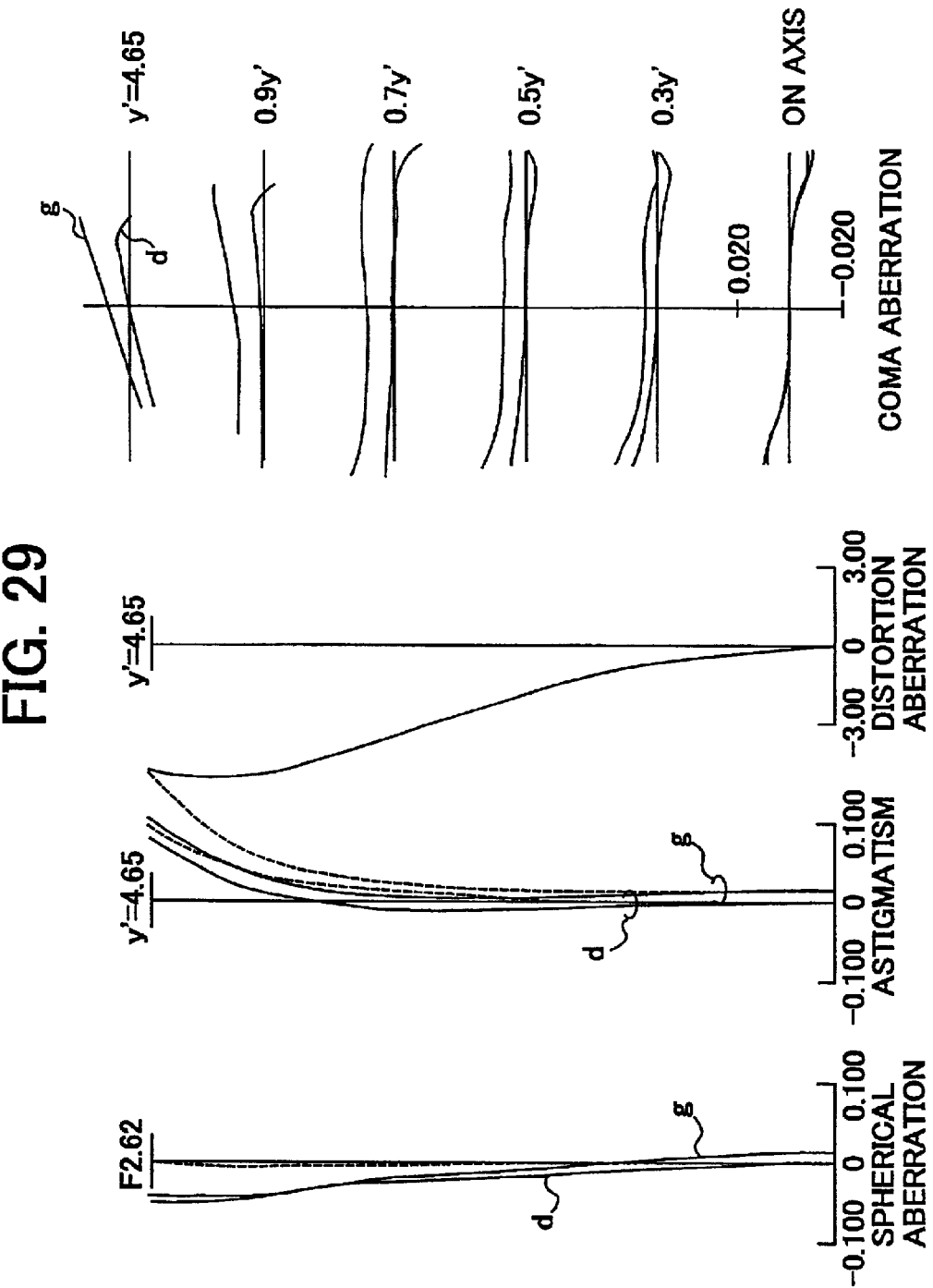
FIG. 29 is a schematic chart for illustrating a set of aberration curvatures of the sixth example at the short focal point end when a photographing distance is 0.3 millimeters.
Figure 31:
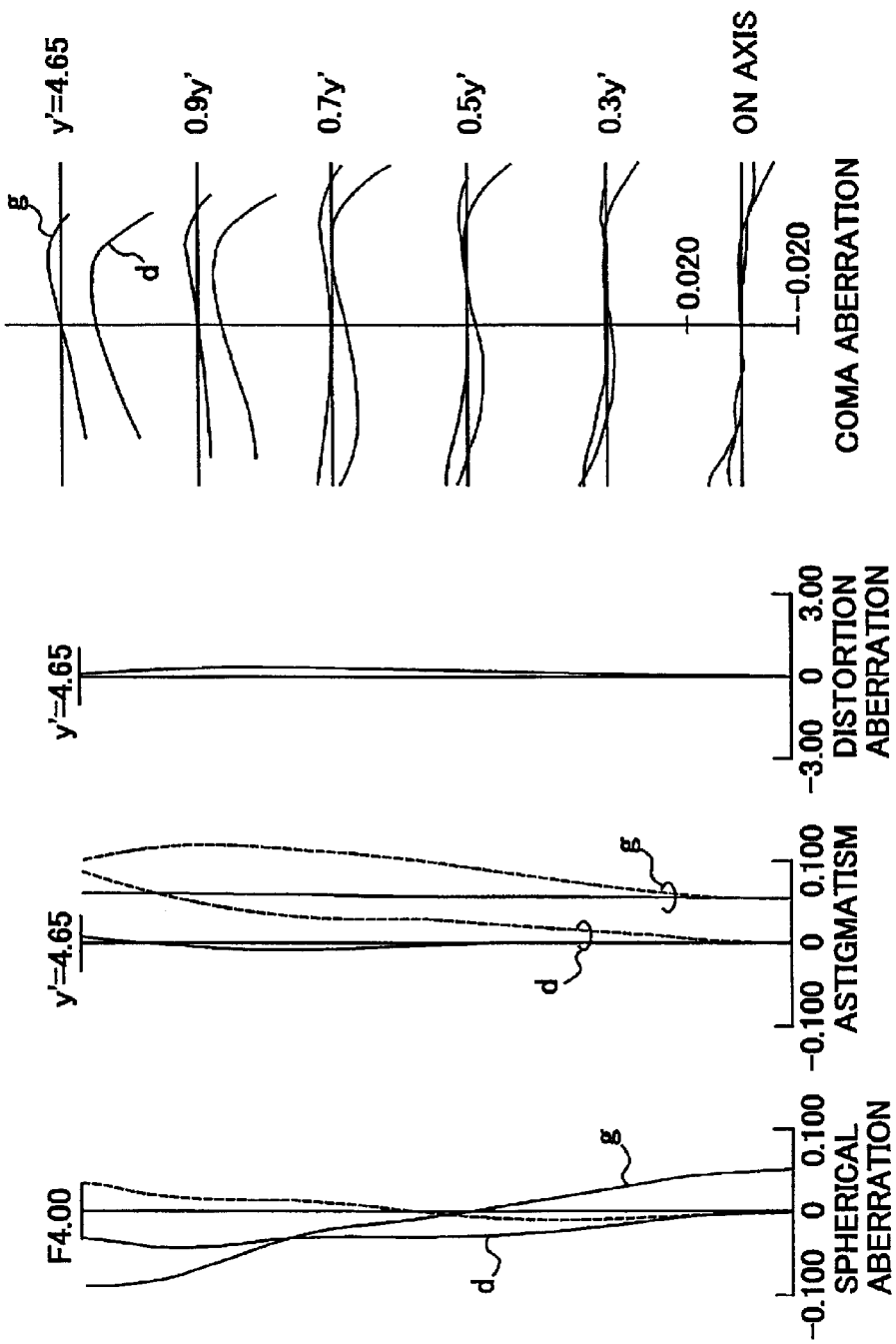
FIG. 31 is a schematic chart for illustrating a set of aberration curvatures of the sixth example at the long focal point end when a photographing distance is 0.5 millimeters.
Figure 32:
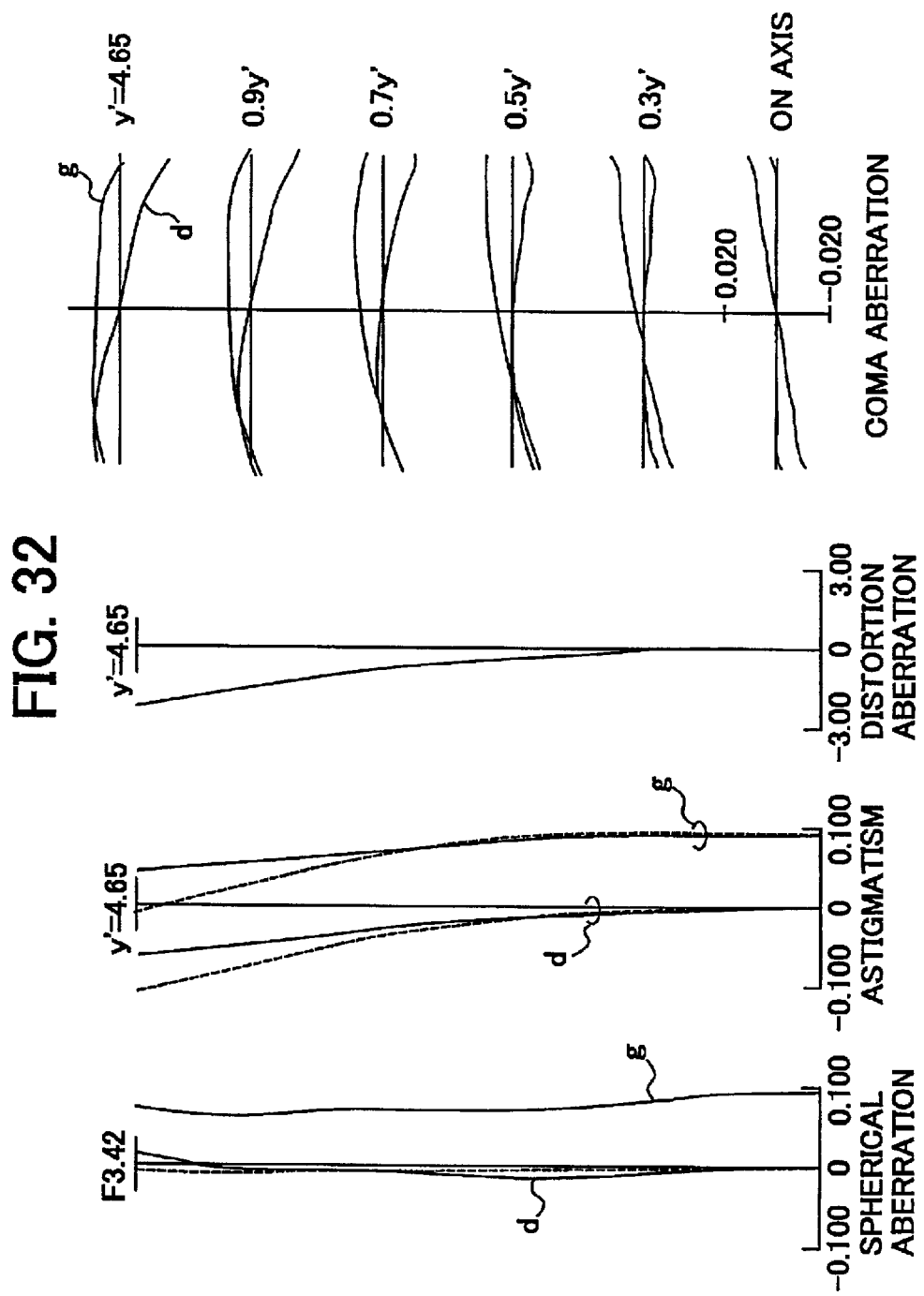
FIG. 32 is a schematic chart for illustrating a set of aberration curvatures of the sixth example in a macro mode when a photographing distance is 0.3 millimeters.
Figure 33:
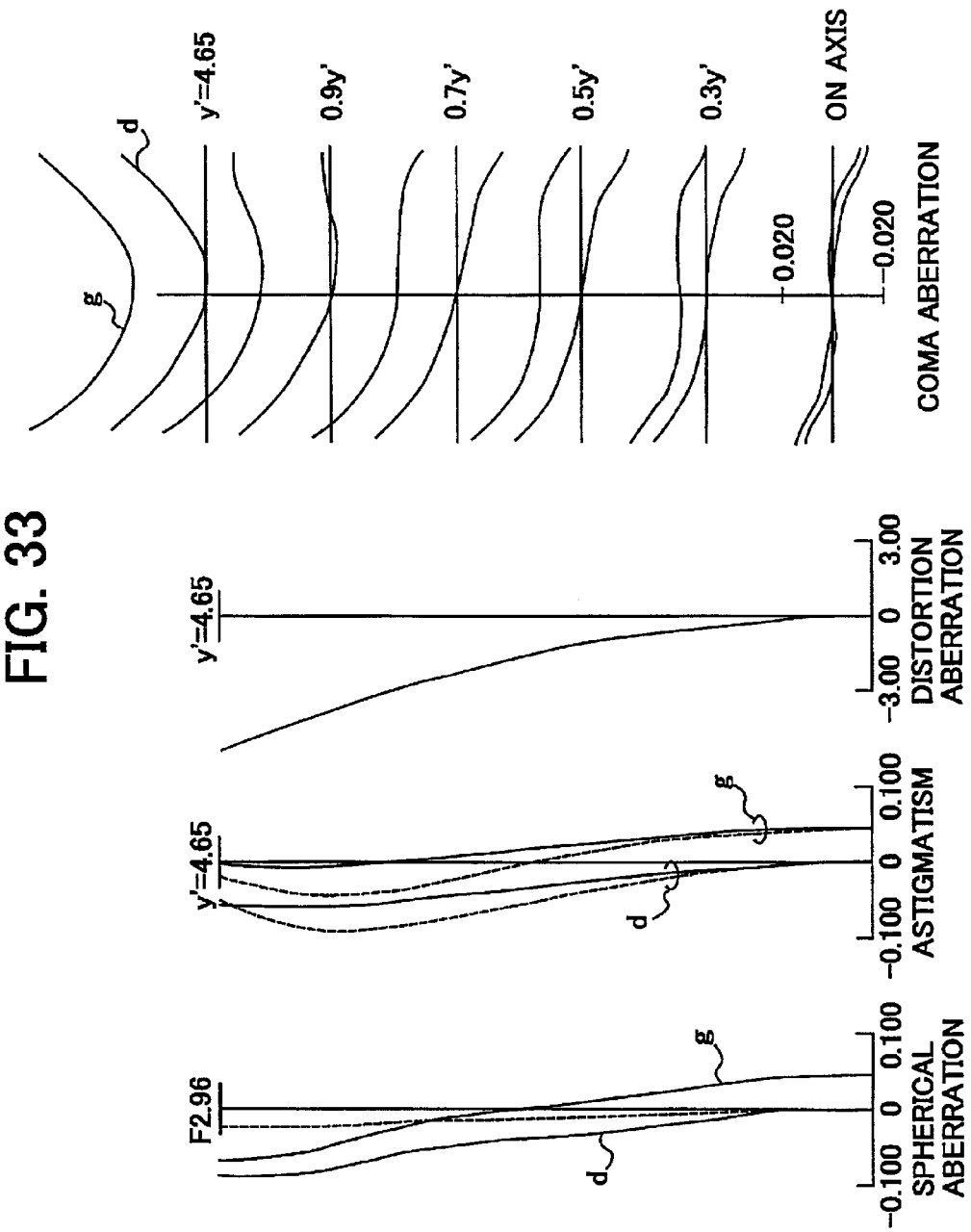
FIG. 33 is a schematic chart for illustrating a set of aberration curvatures of the sixth example in the macro mode when a photographing distance is 0.77 millimeters.
Figure 35:
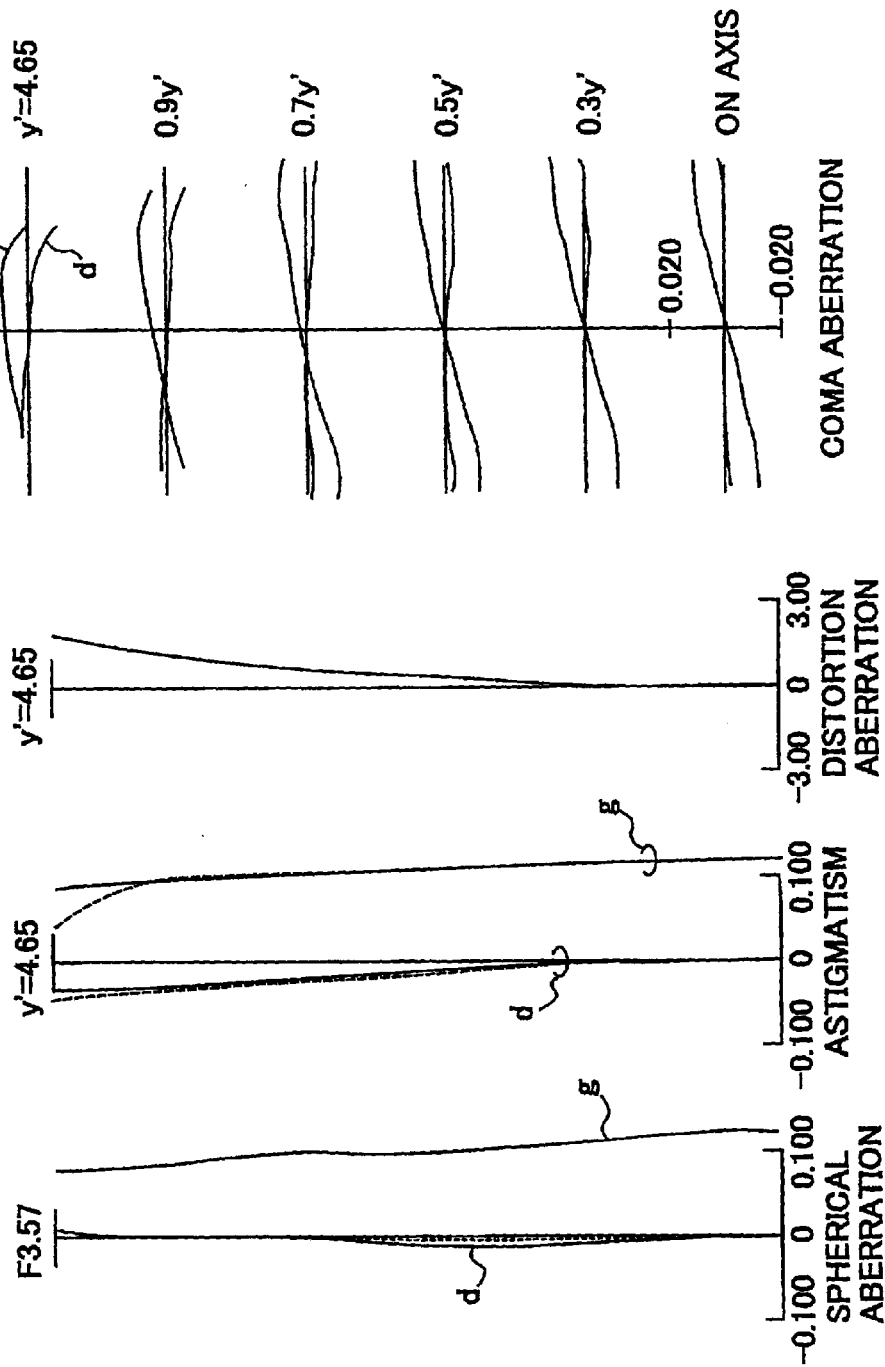
FIG. 35 is a schematic chart for illustrating a set of aberration curvatures of the seventh example at a middle focal length when a photographing distance is infinity.
Figure 36:
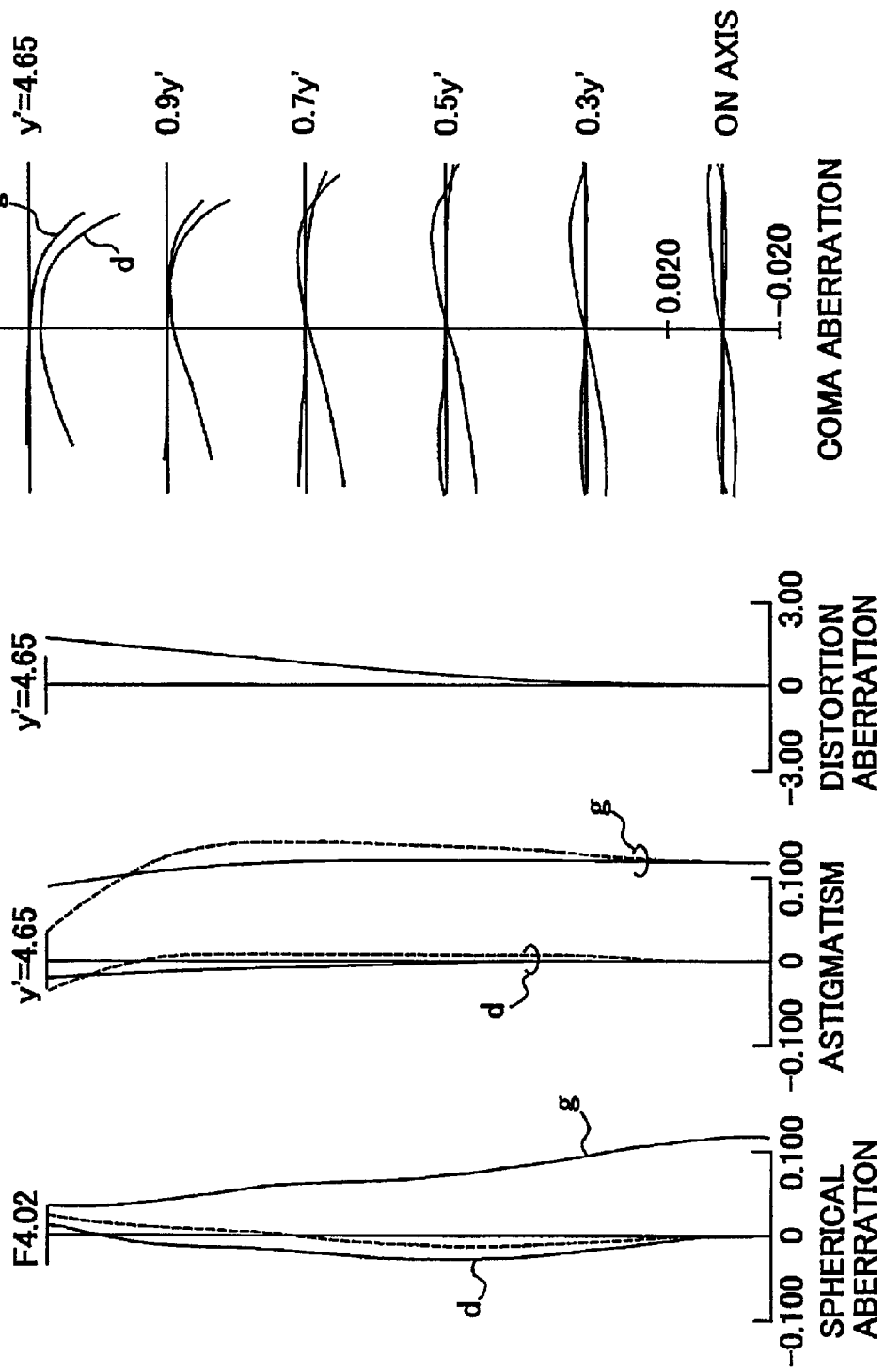
FIG. 36 is a schematic chart for illustrating a set of aberration curvatures of the seventh example at a long focal point end when a photographing distance is infinity.
Figure 37:
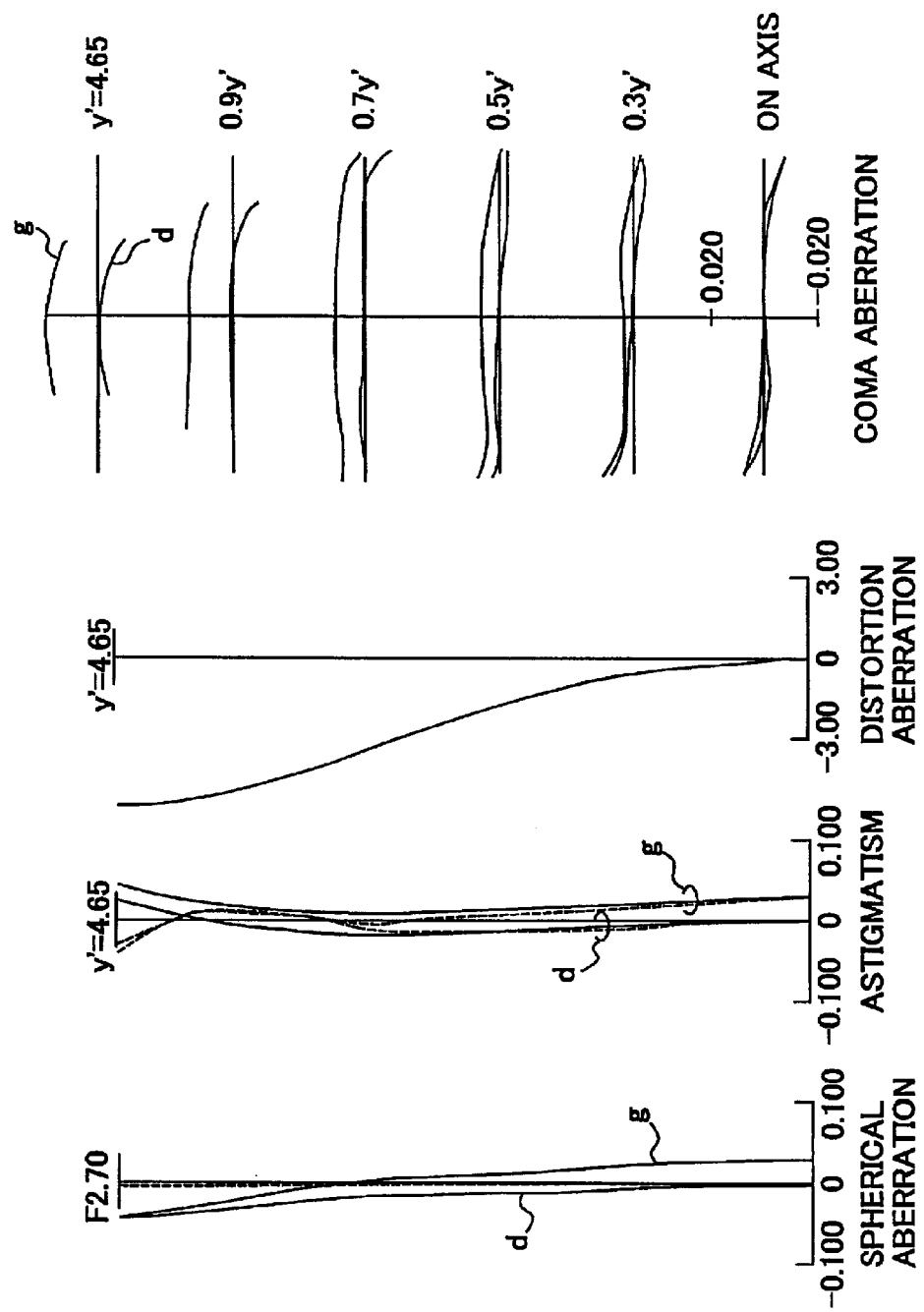
FIG. 37 is a schematic chart for illustrating a set of aberration curvatures of the seventh example at the short focal point end when a photographing distance is 0.3 millimeters.
Figure 38:
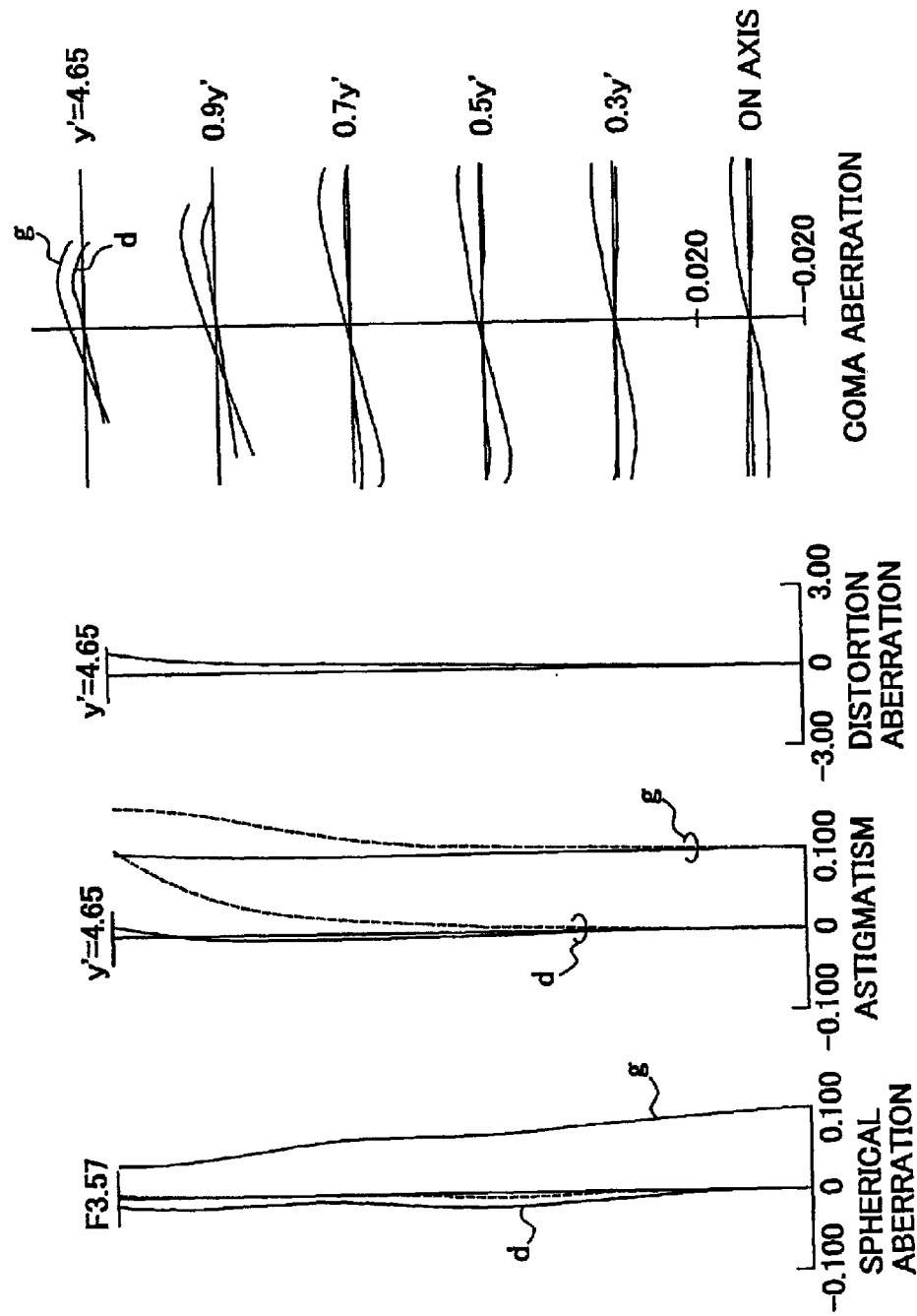
FIG. 38 is a schematic chart for illustrating a set of aberration curvatures of the seventh example at the middle focal length when a photographing distance is 0.4 millimeters.
Figure 39:
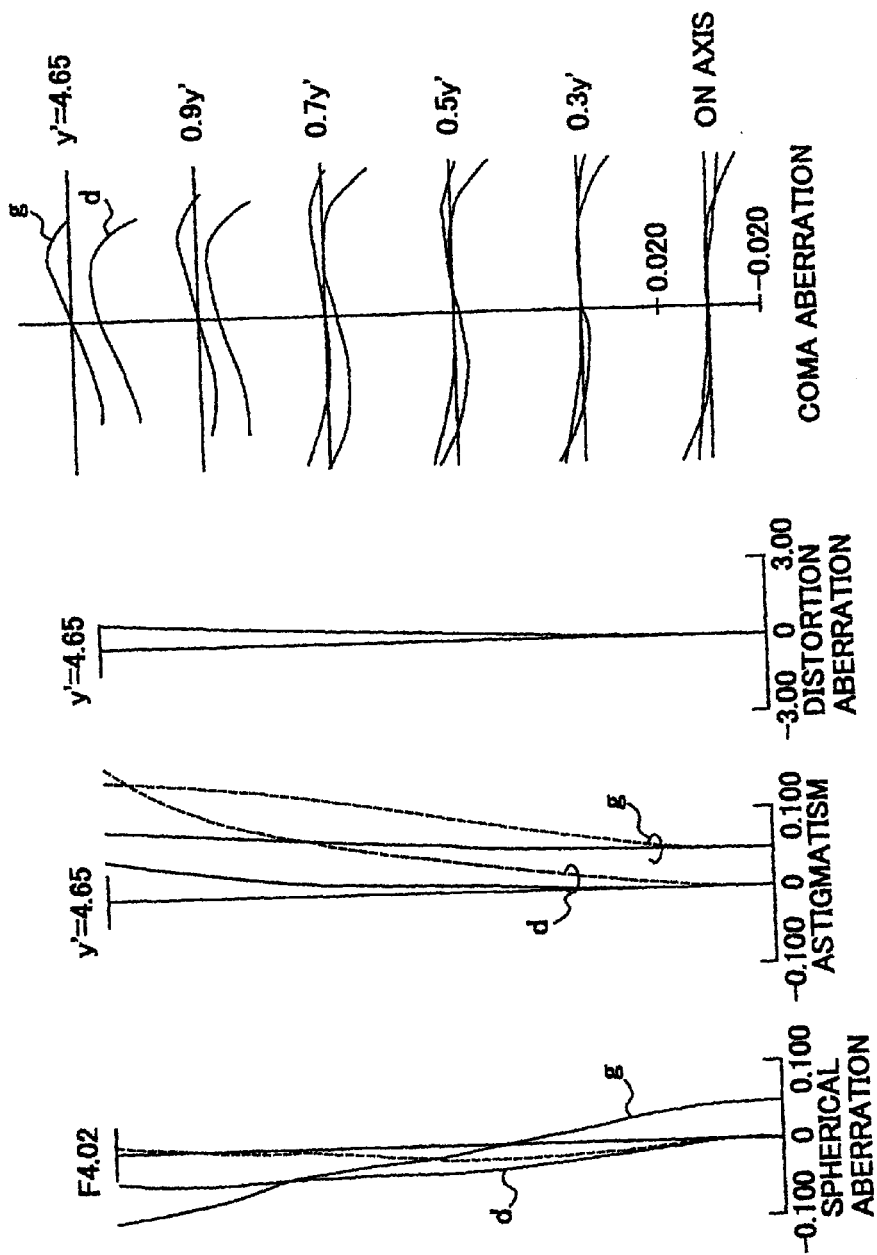
FIG. 39 is a schematic chart for illustrating a set of aberration curvatures of the seventh example at the long focal point end when a photographing distance is 0.5 millimeters.
Figure 40:
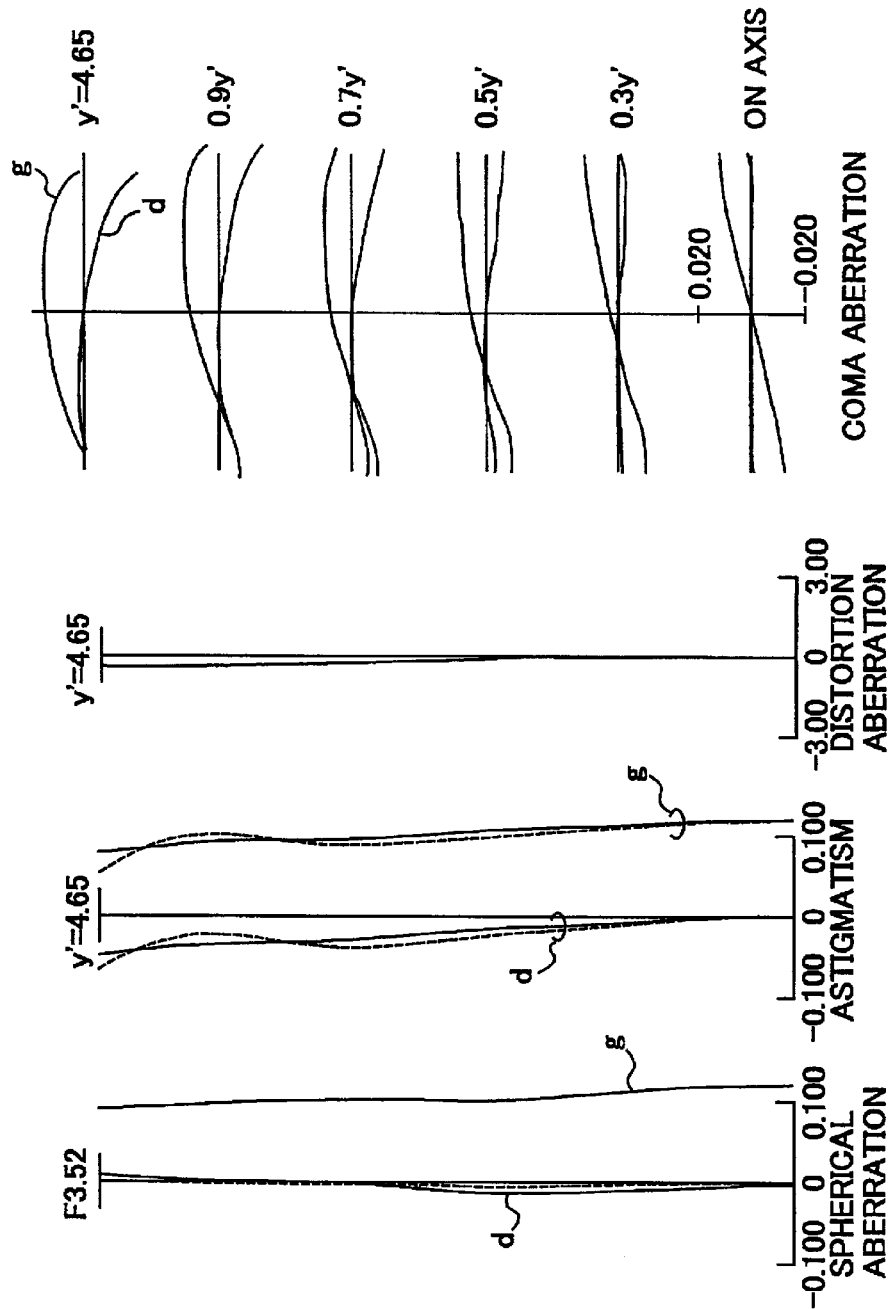
FIG. 40 is a schematic chart for illustrating a set of aberration curvatures of the seventh example in a macro mode when a photographing distance is 0.3 millimeters.
Figure 41:
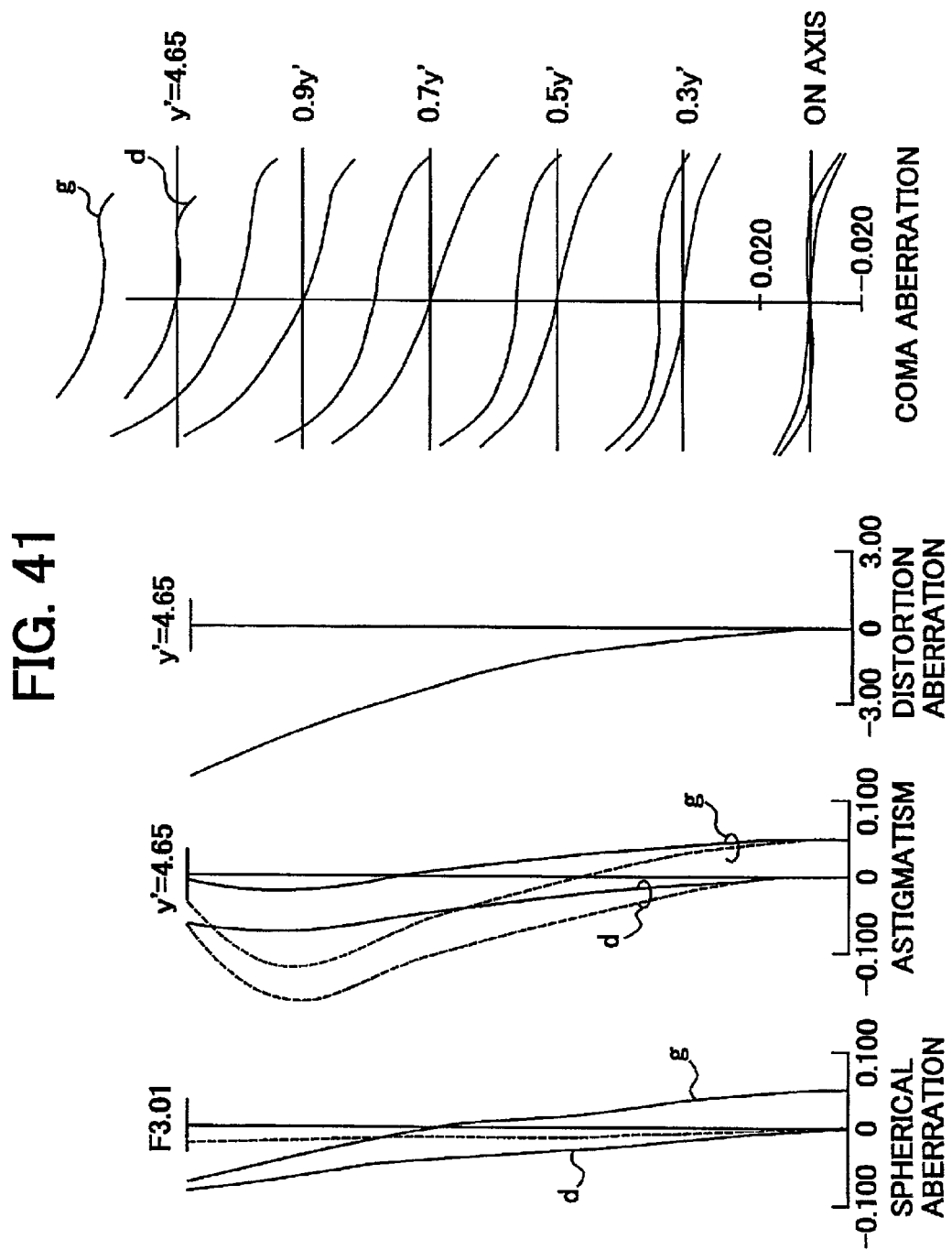
FIG. 41 is a schematic chart for illustrating a set of aberration curvatures of the seventh example in the macro mode when a photographing distance is 0.77 millimeters.
Figure 42:
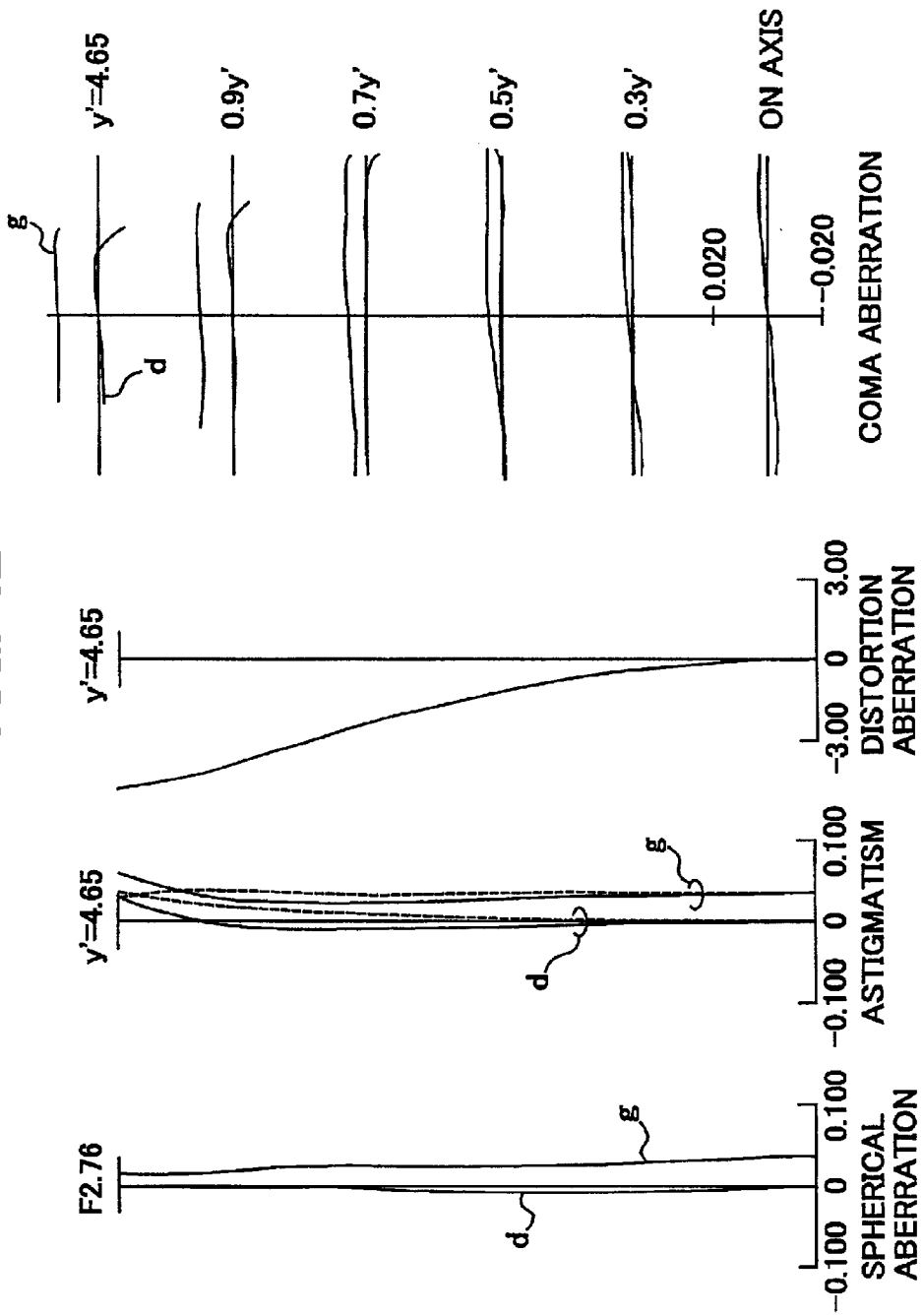
FIG. 42 is a schematic chart for illustrating a set of aberration curvatures of the eighth example in a short focal point end mode and a photographing distance is infinity.
Figure 43:
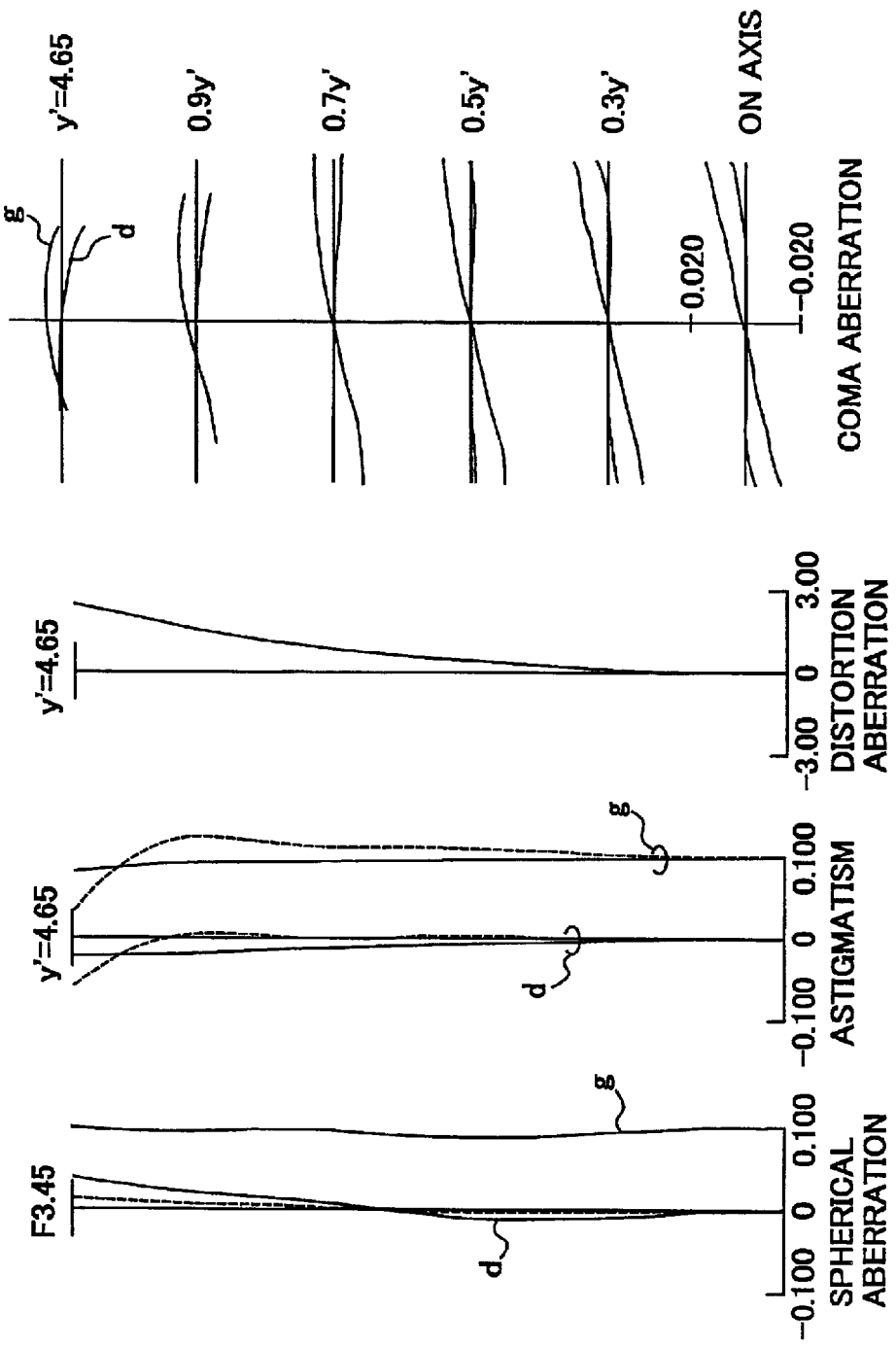
FIG. 43 is a schematic chart for illustrating a set of aberration curvatures of the eighth example at a middle focal length when a photographing distance is infinity.
Figure 44:
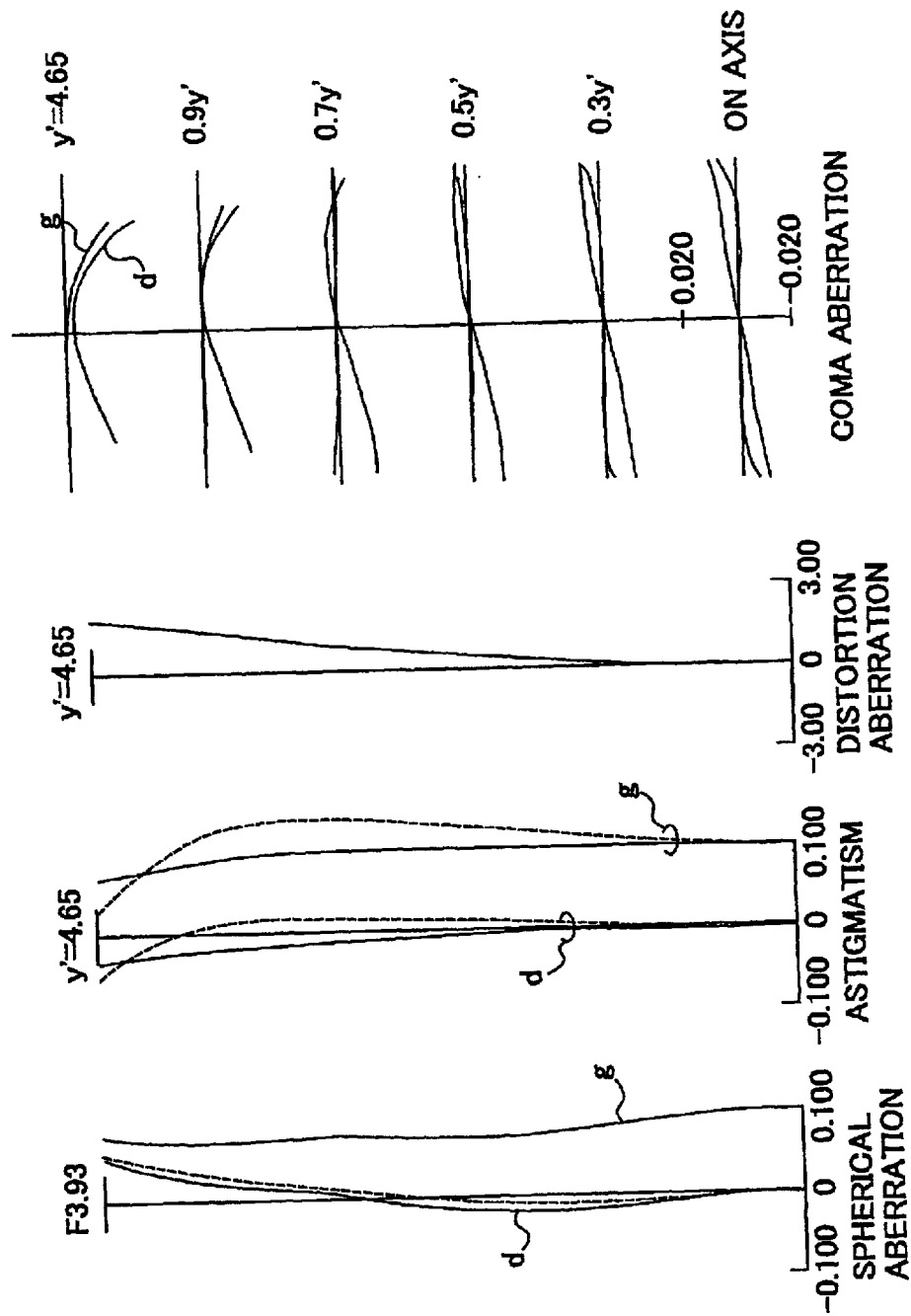
FIG. 44 is a schematic chart for illustrating a set of aberration curvatures of the eighth example at a long focal point end when a photographing distance is infinity.
Figure 47:
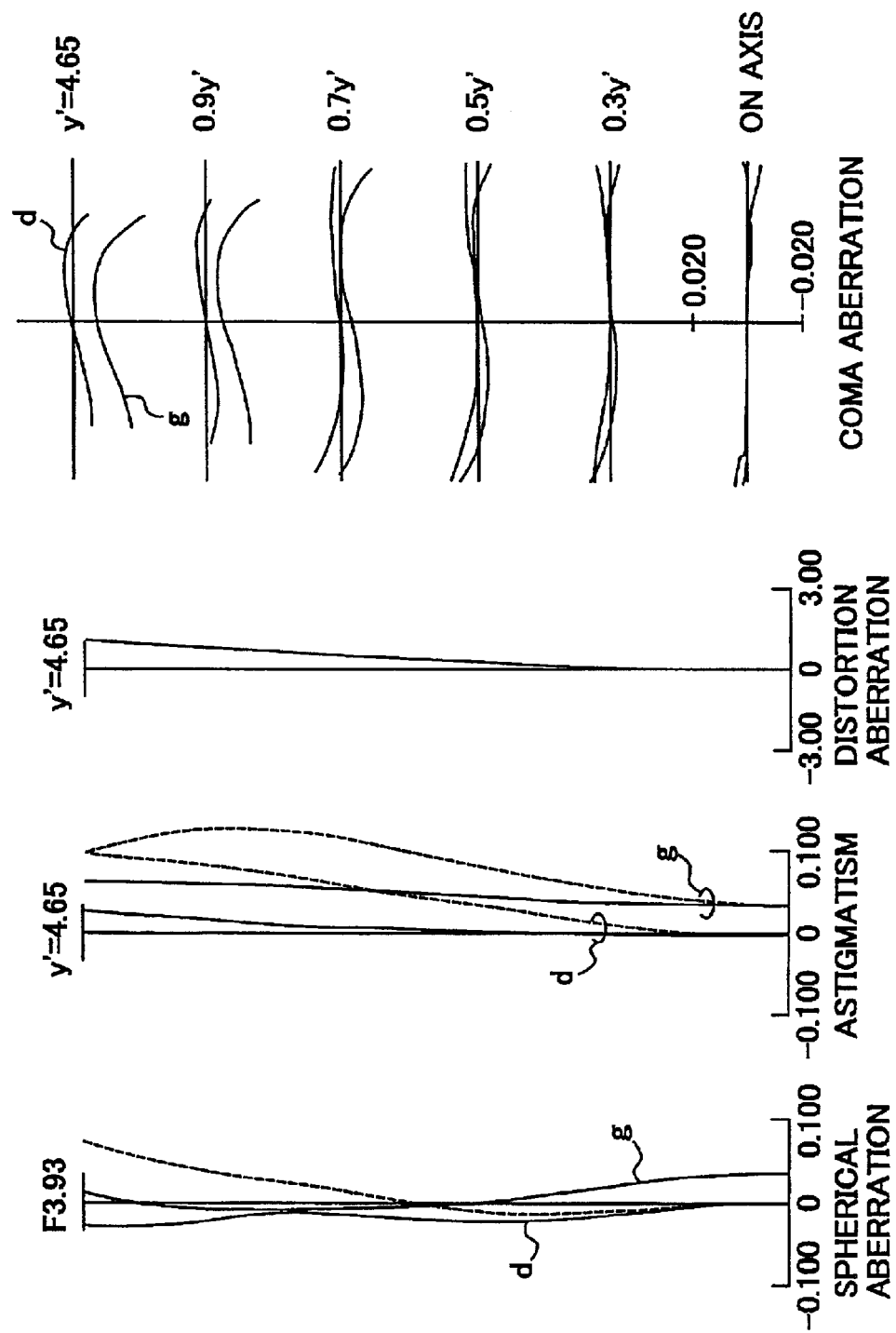
FIG. 47 is a schematic chart for illustrating a set of aberration curvatures of the eighth example at the long focal point end when a photographing distance is 0.5 millimeters.
Figure 48:
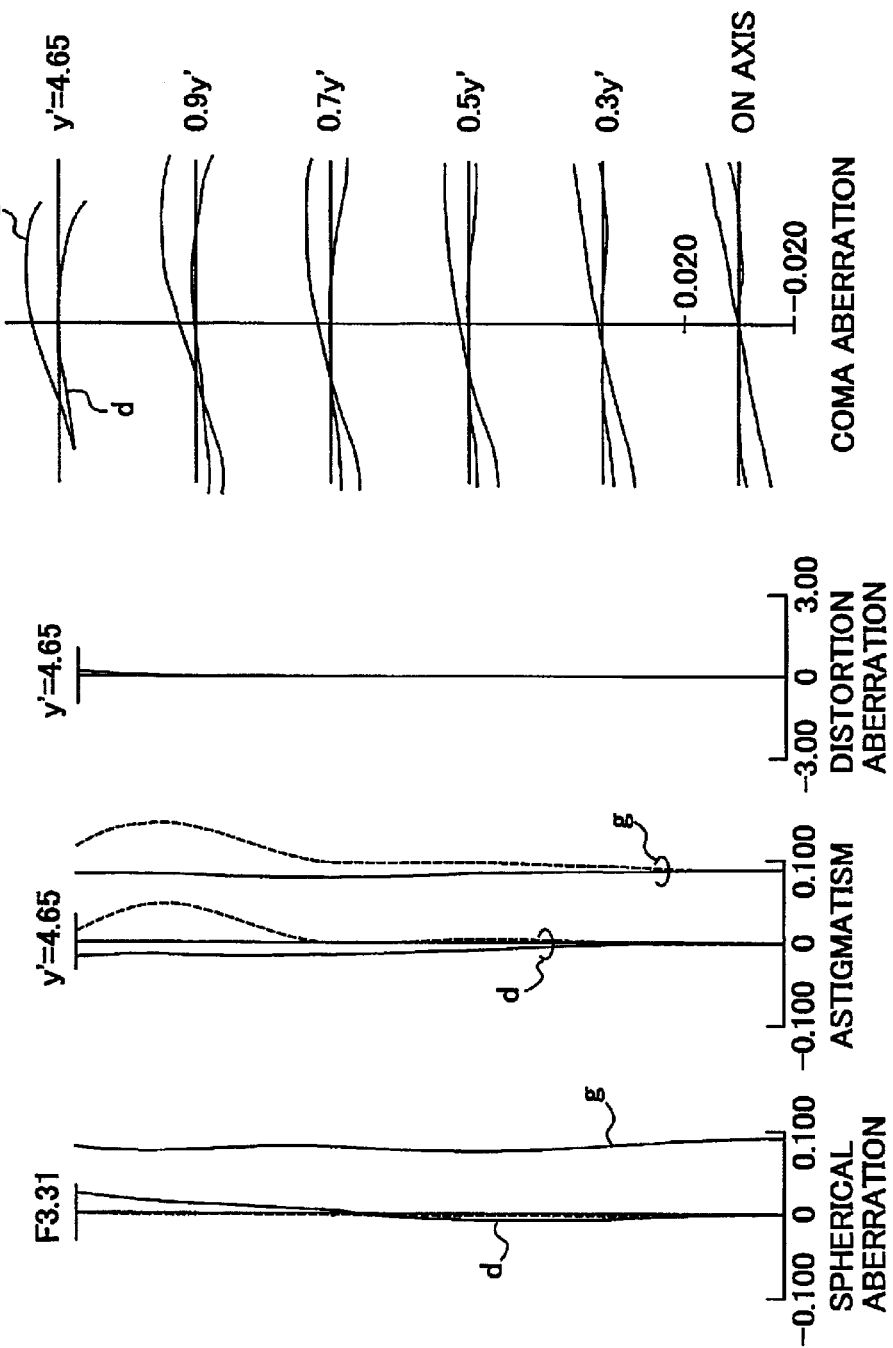
FIG. 48 is a schematic chart for illustrating a set of aberration curvatures of the eighth example in a macro mode when a photographing distance is 0.3 millimeters.
Figure 49:
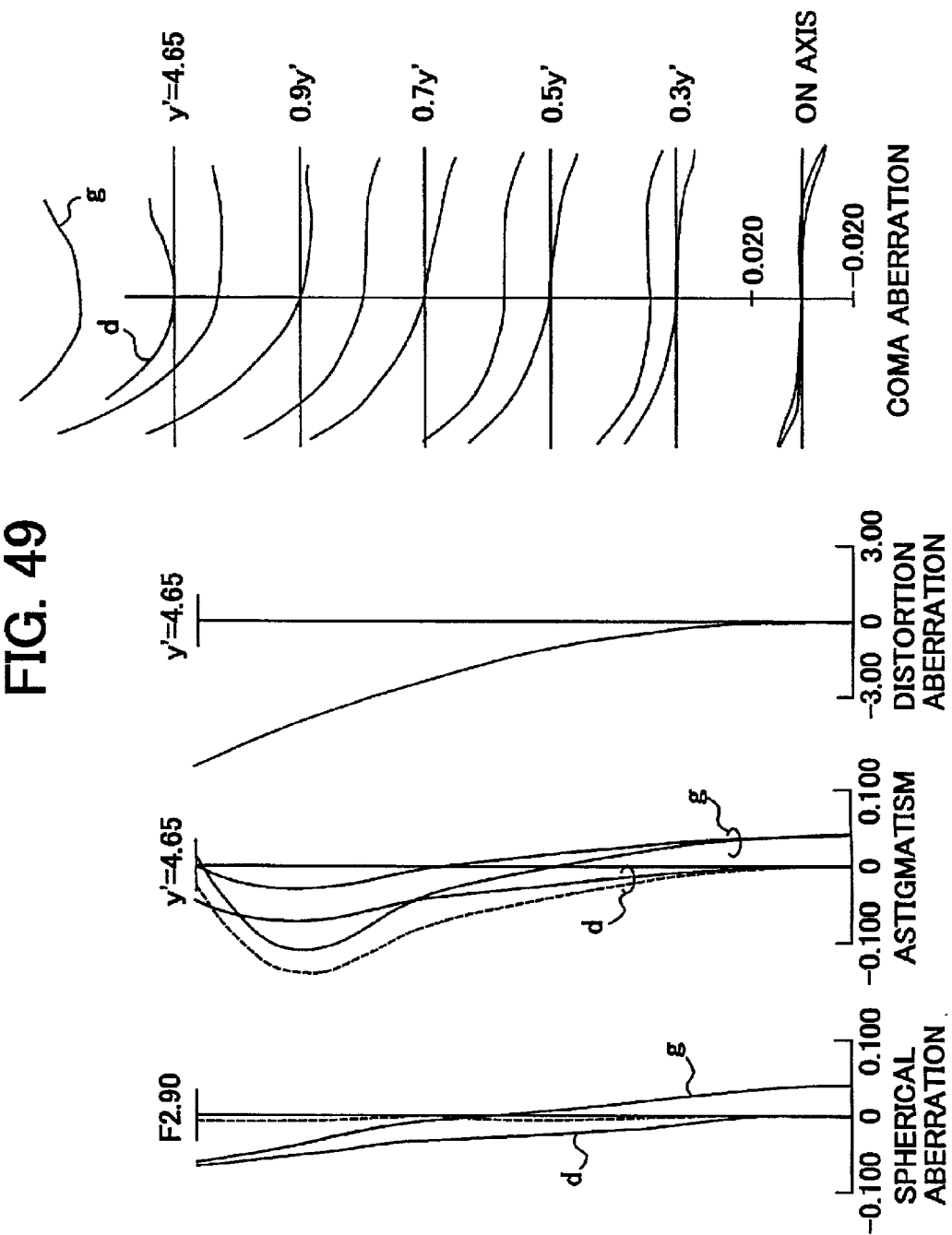
FIG. 49 is a schematic chart for illustrating a set of aberration curvatures of the eighth example in the macro mode when a photographing distance is 0.77 millimeters.

FIG. 25 also illustrates a set of aberration curvatures at the long focal point end when the photographing distance is 0.5 meters. FIG. 26 also illustrates a set of aberration curvatures of the third example when the photographing distance is 0.3 meters in a macro mode. FIG. 27 also illustrates a set of aberration curvatures when the photographing distance is 0.77 meters in a macro mode.

In each of the aberration curvatures, a dotted line in the spherical surface aberration may represent a sine condition. A rigid line in the diagram of the astigmatism may represent sagittal, and a dotted line may represent meridional. In addition, reference numerals (g) and (d) may represent a (g)-line and a (d)-line, respectively.

As apparent from these aberration diagrams, each of the examples may have an extremely fair performance, and is capable of accommodating a digital camera or the like employing a photo acceptance unit having more than three million pixels.

In any one of the above-stated zoom lenses, the first lens band I having a positive focal length, the second lens band II having a negative focal length, and the third to fifth lens bands III, IV, and V having the positive focal lengths may be arranged toward an image surface from the object. In addition, an aperture diaphragm "S" may be disposed in the vicinity of the third lens band III. When magnification from short to long focal point ends is performed, the second lens band II may smoothly move toward the third lens band III. Simultaneously, the fourth lens band IV may move from the fifth lens band V side toward a long focal point end in the vicinity of the third lens band III. Thus, the fourth lens band IV may share a magnifying function together with the second lens band II. In addition, a macro mode enabling focussing outside at a shorter distance than a typical photographing region for zooming may be employed. In addition, the focussing may be performed by movement of the fifth lens band V both in the typical photographing region and in the macro mode.

In addition, the fourth lens band III in a macro mode may be positioned close to the fourth lens band IV at the long focal point end. Further, the second lens band II in a macro mode may be positioned closer to the image surface than the second lens band II at the short focal point end.

One example of the first lens band I may be immobile with regard to the image surface. The third lens band III and the aperture diaphragm "S" may also be immobile with regard to the image surface.

The following inequality may be satisfied, if distances between the first and second lens bands at short and long focal point ends and in a macro mode are $L_{1W}$, $L_{1T}$, and $L_{1C}$, respectively:

$$0.15 < (L_{1C} - L_{1W})/(L_{1T} - L_{1W}) < 0.40$$

In addition, the following inequality may also be satisfied, if a plurality of distances between the third and fourth lens bands at short and long focal point ends and in a macro mode are $L_{3W}$, $L_{3T}$, and $L_{3C}$, respectively:

$$0.25 < (L_{3C} - L_{3W})/(L_{3W} - L_{3T}) < 0.50$$

Further, the following inequality may preferably be satisfied, wherein distances between the first and second lens bands at the short and long focal point ends are $D_{1W}$ and $D_{1T}$, and those between the third and fourth lens bands at the short and long focal point ends are $D_{3W}$ and $D_{3T}$:

$$(D_{3W} - D_{3T})/(D_{1T} - D_{1W}) > 0.3$$

In addition, the following inequality may preferably be satisfied if $f_1$ and $f_{12T}$ may be focal lengths of the first lens band and a combination focal length of the first and second lens bands at the long focal point end, respectively:

$$-1.4 < (f_{12T}/f_1) < -1.0$$

As illustrated in FIGS. 23 to 25, when magnification from short to long focal point ends is performed, the fourth lens band IV may smoothly move toward a long focal point end in the vicinity of the third lens band III from the fifth lens band V side. A positional variance of an image surface which is caused by the magnification performed by the smooth movement of the second and fourth lens bands may be compensated by the movement of the fifth lens band.

The first to third and fifth lens bands may be formed by less than three lenses. Four lens may constitute the fourth lens band. More than one non-spherical surface may be included in each of the second, third, and fifth lens bands. In addition, more than two non-spherical surfaces may be included in the fourth lens band.

In addition, one lens may constitute the fifth lens band V. The third lens band III may be constituted by a positive lens. The aperture diaphragm "S" may be arranged in the object side of the third lens band III.

Any of the above-described zoom lenses may be employed in the earlier described camera apparatus.

The mechanisms and processes set forth in the present invention may be implemented using one or more conventional general purpose microprocessors and/or signal processors programmed according to the teachings in the present specification as will be appreciated by those skilled in the relevant arts. Appropriate software coding can readily be prepared by skilled programmers based on the teachings of the present disclosure, as will also be apparent to those skilled in the relevant arts. However, as will be readily apparent to those skilled in the art, the present invention also may be implemented by the preparation of application-specific integrated circuits by interconnecting an appropriate network of conventional component circuits or by a combination thereof with one or more conventional general purpose microprocessors and/or signal processors programmed accordingly. The present invention thus also includes a computer-based product which may be hosted on a storage medium and include, but is not limited to, any type of disk including floppy disks, optical disks, CD-ROMs, magnet-optical disks, ROMs, RAMs, EPROMs, EEPROMs, flash memory, magnetic or optical cards, or any type of media suitable for storing electronic instructions.

Numerous additional modifications and variations of the present invention are possible in light of the above teachings. It is therefore to be understood that within the scope of the appended claims, the present invention may be practiced otherwise than as specifically described herein.

This application claims priority under 35 USC §119 to Japanese Patent Application Nos. 2000-352498 filed on Nov. 20, 2000, and 2001-037445 filed on Feb. 14, 2001, the entire contents of which are herein incorporated by reference.

What is claimed as new and desired to be secured by Letter Patent of the United States is:

1. A camera apparatus comprising a zoom lens, said zoom lens comprising:
   a first lens band having a positive focal length;
   a second lens band having a negative focal length;
   at least third to fifth lens bands having positive focal lengths; and
   an aperture diaphragm located in the vicinity of the third lens band;
   wherein, said second lens band smoothly moves toward the third lens band and said fourth lens band moves from the fifth lens band side toward a long focal point end so as to share a magnifying function together with the second lens band, when magnification is performed from short to long focal point ends; and
   wherein a distance ($D_{1W}$) between the first and second lens bands in the short focal point end arrangement, a distance ($D_{1T}$) between the first and second lens bands in the long focal point end arrangement, a distance ($D_{3W}$) between the third and fourth lens bands in the short focal point end arrangement, and a distance ($D_{3T}$) between the third and fourth lens bands in the long focal point end arrangement substantially meet the following inequality:

$(D_{3W}-D_{3T})/(D_{1T}-D_{1W})>0.3.$

2. The apparatus according to claim 1 wherein the first lens band faces an object to be photographed.

3. The apparatus according to claim 1 wherein said fourth lens band comes closest to the third lens band at a focal length slightly before the long focal point end.

4. A camera apparatus comprising a zoom lens, said zoom lens comprising:
   a first lens band having, a positive focal length;
   a second lens band having a negative focal length;
   at least third to fifth lens bands having positive focal lengths; and
   an aperture diaphragm located in the vicinity of the third lens band;
   wherein, said second lens band smoothly moves toward the third lens band and said fourth lens band moves from the fifth lens band side toward a long focal point end so as to share a magnifying function together with the second lens band, when magnification is performed from short to long focal point ends; and
   wherein a variance of an image surface caused by the smooth movements of said second and fourth lens bands is compensated by movement of the fifth lens band in a predetermined direction.

5. The apparatus according to claim 4, wherein said first lens band is immobile.

6. The apparatus according to claim 4, wherein said third lens band and aperture diaphragm are immobile.

7. The apparatus according to claim 4, wherein the fifth lens band performs focussing.

8. The apparatus according to claim 4, wherein a focal length ($f_1$) of the first lens band, and a composite focal length ($f_{12T}$) of the first and second lens bands at the long focal point end substantially meet the following inequality:

$-1.4<(f_{12T}/f_1)<-1.0.$

9. The apparatus according to claim 4, wherein a composite focal length ($f_{12W}$) of the first and second lens bands at the short focal point end, a composite focal length ($f_{12T}$) of the first and second lens bands at the long focal point end, a focal length ($f_T$) of the entire lens unit at the long focal point end, and a focal length ($f_W$) of the entire lens unit at the short focal point end substantially meet the following inequality:

$0.4<(f_{12T}/f_{12W})/(f_T/f_W)<0.7.$

10. The apparatus according to claim 4, wherein each of said lens bands includes less than three lenses, said second and third lens bands include at least one non-spherical surface, and at least one of said fourth and fifth lens band includes more than one non-spherical surface.

11. The apparatus according to claim 4, wherein said first to third and fifth lens bands include less than three lenses, said fourth lens band includes four lenses, each of said second and third lens bands includes at least one non-spherical surface, and at least one of said fourth and fifth lens band includes more than one non-spherical surface.

12. The apparatus according to claim 4, wherein said fifth lens band includes only one lens.

13. The apparatus claimed in claim 12, said zoom lens further comprising a macro mode capable of focussing at a shorter distance than an ordinal photographing region, wherein said focussing is performed by movement of the fifth lens band in a predetermined direction in any one of the ordinal photographing region and the macro mode.

14. The apparatus according to claim 13, wherein said fourth lens band in the macro mode is substantially close to the fourth lens band in the long focal point end arrangement.

15. The apparatus according to claim 13, wherein said second lens band in the macro mode is substantially closer to the image surface than when it is in the short focal point end arrangement.

16. The apparatus according to claim 13, wherein said fourth lens band in the macro mode is close to the fourth lens band in the long focal point end arrangement, and wherein said second lens band in the macro mode is closer to the imaging surface than when it is in the short focal point end arrangement.

17. The apparatus according to claim 13, wherein the first and third lens bands and the aperture diaphragm are immobile with regard to the image surface.

18. The apparatus according to claim 13, wherein a distance ($L_{1W}$) between the first and second lens bands in the short focal point end arrangement, a distance ($L_{1T}$) between the first and second lens bands in the long focal point end arrangement, a distance ($L_{1C}$) between the first and second lens bands in the macro mode substantially meet the following inequality:

$0.15<(L_{1C}-L_{1W})/(L_{1T}-L_{1W})<0.40.$

19. The apparatus according to claim 13, wherein a distance ($L_{3W}$) between the third and fourth lens, bands in the short focal point end arrangement, a distance ($L_{3T}$) between the third and fourth lens bands in the long focal point end arrangement, a distance ($L_{3C}$) between the third and fourth lens bands in the macro mode substantially meet the following inequality:

$$0.25 < (L_{3C} - L_{3W})/(L_{3W} - L_{3T}) < 0.50.$$

20. The apparatus according to claim 13, wherein a distance ($L_{1W}$) between the first and second lens bands in the short focal point end arrangement, a distance ($L_{1T}$) between the first and second lens bands in the long focal point end arrangement, a distance ($L_{1C}$) between the first and second lens bands in the macro mode substantially meet the following inequality:

$$0.15 < (L_{1C} - L_{1W})/(L_{1T} - L_{1W}) < 0.40$$

and wherein a distance ($L_{3W}$) between the third and fourth lens bands in the short focal point end arrangement, a distance ($L_{3T}$) between the third and fourth lens bands in the long focal point end, a distance ($L_{3C}$) between the third and fourth lens bands in the macro mode substantially meet the following inequality:

$$0.25 < (L_{3C} - L_{3W})/(L_{3W} - L_{3T}) < 0.50.$$

21. The apparatus according to claim 13, wherein said first to third and fifth lens bands include less than three lenses, said fourth lens band includes four lenses, each of said second, third and fifth lens bands includes at least one non-spherical surface, and the fourth lens band includes more than two non-spherical surfaces.

22. The apparatus according to claim 13, wherein said third lens band includes one lens, and said aperture diaphragm is located at the object side of the third lens band.

23. The apparatus according to claim 4, wherein said aperture diaphragm is located at the object side of the third lens band.

24. The apparatus according to claim 4, further comprising a function of digitizing a photographed image into digital information.

25. The apparatus according to claim 4, further comprising a photo acceptance unit configured to receive an image from the zoom lens, said photo acceptance unit having almost three million pixels.

26. A method for zooming, comprising the steps of:
providing a first lens band having a positive focal length;
providing a second lens band having a negative focal length;
providing at least third to fifth lens bands having positive focal lengths; and
providing an aperture diaphragm located in the vicinity of the third lens band;
smoothly moving said second lens band toward the third lens band;
substantially simultaneously moving said fourth lens band from the fifth lens band side toward a long focal point end so as to share a magnifying function together with the second lens band when magnification is performed from short to long focal point ends;
further comprising the step of compensating a variance of an image surface caused by the smooth movements of said second and fourth lens bands with movement of the fifth lens band in a predetermined direction.

27. The method according to claim 26, further comprising the step of fixing said first lens band when said magnification is performed.

28. The method according to claim 26, further comprising the step of performing focusing with the fifth lens band when said magnification is performed.

29. The method according to claim 26, further comprising the step of focusing at a shorter distance than an ordinal photographing region by moving the fifth lens band in a predetermined direction in any one of the ordinal photographing region and the macro mode.

30. The method according to claim 26, further comprising the step of positioning said fourth lens band in a macro mode substantially close to the fourth lens band in the long focal point end arrangement for the macro mode.

31. The method according to claim 26, further comprising the step of positioning said second lens band substantially closer to the image surface than when it is in the short focal point end arrangement for the macro mode.

32. A camera apparatus comprising zoom means for performing zooming, said zoom means comprising:
first means for deflecting a light, said first means having a positive focal length;
second means for deflecting the light, said second means having a negative focal length;
at least third to fifth means for deflecting the lights, said at least third to fifth means having positive focal lengths; and
means for narrowing the light in the vicinity of the third means;
wherein, said second means smoothly move toward the third means and said fourth means move from the fifth means side toward a long focal point end so as to share a magnifying function together with the second means when magnification is performed from short to long focal point ends; and
wherein said fifth means perform focusing during zooming.

33. A mobile information terminal, comprising a camera apparatus having a zoom lens, said zoom lens comprising:
a first lens band having a positive focal length;
a second lens band having a negative focal length;
at least third to fifth lens bands having positive focal lengths; and
an aperture diaphragm located in the vicinity of the third lens band;
wherein, said second lens band smoothly moves toward the third lens band and said fourth lens band moves from the fifth lens band side toward a long focal point end, when magnification is performed from short to long focal point ends; and
wherein a variance of an image surface caused by the smooth movements of said second and fourth lens bands is compensated by movement of the fifth lens band in a predetermined direction.

34. The apparatus according to claim 33, wherein said first lens band is immobile.

35. The apparatus according to claim 33, wherein said third lens band and aperture diaphragm are immobile.

36. The apparatus according to claim 33, wherein the fifth lens band performs focusing.

37. The apparatus according to claim 33, wherein a focal length ($f_1$) of the first lens band, and a composite focal length ($f_{12T}$) of the first and second lens bands at the long focal point end substantially meet the following inequality:

$$-1.4 < (f_{12T}/f_1) < -1.0.$$

38. The apparatus according to claim 33, wherein a composite focal length ($f_{12W}$) of the first and second lens bands at the short focal point end, a composite focal length ($f_{12T}$) of the first and second lens bands at the long focal point end, a focal length ($f_T$) of the entire lens unit at the long focal point end, and a focal length ($f_W$) of the entire lens unit at the short focal point end substantially meet the following inequality:

$$0.4 < (f_{12T}/f_{12W})/(f_T/f_W) < 0.7.$$

39. The apparatus according to claim 33, wherein each of said lens bands includes less than three lenses, said second and third lens bands include at least one non-spherical surface, and at least one of said fourth and fifth lens band includes more than one non-spherical surface.

40. The apparatus according to claim 33, wherein said first to third and fifth lens bands include less than three lenses, said fourth lens band includes four lenses, each of said second and third lens bands includes at least one non-spherical surface, and at least one of said fourth and fifth lens band includes more than one non-spherical surface.

41. The apparatus according to claim 33, wherein said fifth lens band includes only one lens.

42. The apparatus claimed in claim 41, said zoom lens further comprising a macro mode capable of focusing at a shorter distance than an ordinal photographing region, wherein said focusing is performed by movement of the fifth lens band in a predetermined direction in any one of the ordinal photographing region and the macro mode.

43. The apparatus according to claim 42, wherein said fourth tens band in the macro mode is substantially close to the fourth lens band in the long focal point end arrangement.

44. The apparatus according to claim 42, wherein said second lens band in the macro mode is substantially closer to the image surface than when it is in the short focal point end arrangement.

45. The apparatus according to claim 42, wherein said fourth lens band in the macro mode is close to the fourth lens band in the long focal point end arrangement, and wherein said second lens band in the macro mode is closer to the imaging surface than when it is in the short focal point end arrangement.

46. The apparatus according to claim 42, wherein the first and third lens bands and the aperture diaphragm are immobile with regard to the image surface.

47. The apparatus according to claim 42, wherein a distance ($L_{1W}$) between the first and second lens bands in the short focal point end arrangement, a distance ($L_{1T}$) between the first and second lens bands in the long focal point end arrangement, a distance ($L_{1C}$) between the first and second lens bands in the macro mode substantially meet the following inequality:

$$0.15 < (L_{1C}-L_{1W})/(L_{1T}-L_{1W}) < 0.40.$$

48. The apparatus according to claim 42, wherein a distance ($L_{3W}$) between the third and fourth lens bands in the short focal point end arrangement, a distance ($L_{3T}$) between the third and fourth lens bands in the long focal point end arrangement, a distance ($L_{3C}$) between the third and fourth lens bands in the macro mode substantially meet the following inequality:

$$0.25 < (L_{3C}-L_{3W})/(L_{3W}-L_{3T}) < 0.50.$$

49. The apparatus according to claim 42, wherein a distance ($L_{1W}$) between the first and second lens bands in the short focal point end arrangement, a distance ($L_{1T}$) between the first and second lens bands in the long focal point end arrangement, a distance ($L_{1C}$) between the first and second lens bands in the macro mode substantially meet the following inequality:

$$0.15 < (L_{1C}-L_{1W})/(L_{1T}-L_{1W}) < 0.40$$

and wherein a distance ($L_{3W}$) between the third and fourth lens bands in the short focal point end arrangement, a distance ($L_{3T}$) between the third and fourth lens bands in the long focal point end, a distance ($L_{3C}$) between the third and fourth lens bands in the macro mode substantially meet the following inequality:

$$0.25 < (L_{1C}-L_{3W})/(L_{3W}-L_{3T}) < 0.50.$$

50. The apparatus according to claim 42, wherein said first to third and fifth lens bands include less than three lenses, said fourth lens band includes four lenses, each of said second, third and fifth lens bands includes at least one non-spherical surface, and the fourth lens band includes more than two non-spherical surfaces.

51. The apparatus according to claim 42, wherein said third lens band includes one lens, and said aperture diaphragm is located at the object side of the third lens band.

52. The apparatus according to claim 33, wherein said aperture diaphragm is located at the object side of the third lens band.

53. The apparatus according to claim 33, further comprising a function of digitizing a photographed image into digital information.

54. The apparatus according to claim 53, further comprising a photo acceptance unit configured to receive an image from the zoom lens, said photo acceptance unit having almost three million pixels.

55. A zoom lens, comprising:
 a first lens band having a positive focal length;
 a second lens band having a negative focal length;
 at least third to fifth lens bands having positive focal lengths; and
 an aperture diaphragm located in the vicinity of the third lens band;
 wherein, said second lens band smoothly moves toward the third lens band and said fourth lens band moves from the fifth lens band side toward a long focal point end, when magnification is performed from short to long focal point ends; and
 wherein a variance of an image surface caused by the smooth movements of said second and fourth lens bands is compensated by movement of the fifth lens band in a predetermined direction.

56. The apparatus according to claim 55, wherein said first lens band is immobile.

57. The apparatus according to claim 55, wherein said third lens band and aperture diaphragm are immobile.

58. The apparatus according to claim 55, wherein the fifth lens band performs focusing.

59. The apparatus according to claim 55, wherein a focal length ($f_1$) of the first lens band, and a composite focal length ($f_{12T}$) of the first and second lens bands at the long focal point end substantially meet the following inequality:

$$-1.4 < (f_{12T}/f_1) < -1.0.$$

60. The apparatus according to claim 55, wherein a composite focal length ($f_{12W}$) of the first and second lens bands at the short focal point end, a composite focal length ($f_{12T}$) of the first and second lens bands at the long focal point end, a focal length ($f_T$) of the entire lens unit at the long focal point end, and a focal length ($f_W$) of the entire lens unit at the short focal point end substantially meet the following inequality:

$$0.4<(f_{12T}/f_{12W})/(f_T/f_W)<0.7.$$

61. The apparatus according to claim 55, wherein each of said lens bands includes less than three lenses, said second and third lens bands include at least one non-spherical surface, and at least one of said fourth and fifth lens band includes more than one non-spherical surface.

62. The apparatus according to claim 55, wherein said first to third and fifth lens bands include less than three lenses, said fourth lens band includes four lenses, each of said second and third lens bands includes at least one non-spherical surface, and at least one of said fourth and fifth lens band includes more than one non-spherical surface.

63. The apparatus according to claim 55, wherein said fifth lens band includes only one lens.

64. The apparatus claimed in claim 63, said zoom lens further comprising a macro mode capable of focusing at a shorter distance than an ordinal photographing region, wherein said focusing is performed by movement of the fifth lens band in a predetermined direction in any one of the ordinal photographing region and the macro mode.

65. The apparatus according to claim 64, wherein said fourth lens band in the macro mode is substantially close to the fourth lens band in the long focal point end arrangement.

66. The apparatus according to claim 64, wherein said second lens band in the macro mode is substantially closer to the image surface than when it is in the short focal point end arrangement.

67. The apparatus according to claim 64, wherein said fourth lens band in the macro mode is close to the fourth lens band in the long focal point end arrangement, and wherein said second lens band in the macro mode is closer to the imaging surface than when it is in the short focal point end arrangement.

68. The apparatus according to claim 64, wherein the first and third lens bands and the aperture diaphragm are immobile with regard to the image surface.

69. The apparatus according to claim 64, wherein a distance ($L_{1W}$) between the first and second lens bands in the short focal point end arrangement, a distance ($L_{1T}$) between the first and second lens bands in the long focal point end arrangement, a distance ($L_{1C}$) between the first and second lens bands in the macro mode substantially meet the following inequality:

$$0.15<(L_{1C}-L_{1W})/(L_{1T}-L_{1W})<0.40.$$

70. The apparatus according to claim 64, wherein a distance ($L_{3W}$) between the third and fourth lens bands in the short focal point end arrangement, a distance ($L_{3T}$) between the third and fourth lens bands in the long focal point end arrangement, a distance ($L_{3C}$) between the third and fourth lens bands in the macro mode substantially meet the following inequality:

$$0.25<(L_{3C}-L_{3W})/(L_{3W}-L_{3T})<0.50.$$

71. The apparatus according to claim 64, wherein a distance ($L_{1W}$) between the first and second lens bands in the short focal point end arrangement, a distance ($L_{1T}$) between the first and second lens bands in the long focal point end arrangement, a distance ($L_{1C}$) between the first and second lens bands in the macro mode substantially meet the following inequality:

$$0.15<(L_{1C}-L_{1W})/(L_{1T}-L_{1W})<0.40$$

and wherein a distance ($L_{3W}$) between the third and fourth lens bands in the short focal point end arrangement, a distance ($L_{3T}$) between the third and fourth lens bands in the long focal point end, a distance ($L_{3C}$) between the third and fourth lens bands in the macro mode substantially meet the following inequality:

$$0.25<(L_{3C}-L_{3W})/(L_{3W}-L_{3T})<0.50.$$

72. The apparatus according to claim 64, wherein said first to third and fifth lens bands include less than three lenses, said fourth lens band includes four lenses, each of said second, third and fifth lens bands includes at least one non-spherical surface, and the fourth lens band includes more than two non-spherical surfaces.

73. The apparatus according to claim 64, wherein said third lens band includes one lens, and said aperture diaphragm is located at the object side of the third lens band.

74. The apparatus according to claim 55, wherein said aperture diaphragm is located at the object side of the third lens band.

75. The apparatus according to claim 55, further comprising a function of digitizing a photographed image into digital information.

76. The apparatus according to claim 75, further comprising a photo acceptance unit configured to receive an image from the zoom lens, said photo acceptance unit having almost three million pixels.

* * * * *